(12) United States Patent
McKenney et al.

(10) Patent No.: US 7,765,161 B2
(45) Date of Patent: Jul. 27, 2010

(54) SYSTEM AND METHOD FOR PROVIDING PAYMENT SERVICES IN ELECTRONIC COMMERCE

(75) Inventors: Mary Keenan McKenney, West Chester, PA (US); Markus Walch, Kronberg (DE); Walter Baker, III, Winnetka, IL (US); Oliver Storch, Kelkheim (DE); Peter Josef Eduard Landsmann, Kranzberg (DE); William John Jetter, Piedmont, CA (US); Margaret Miu-Ling Wong, Unionville (CA); William Isaac Cameron, Toronto (CA)

(73) Assignee: Identrust, Inc., San Francisco, CA (US)

( * ) Notice: Subject to any disclaimer, the term of this patent is extended or adjusted under 35 U.S.C. 154(b) by 449 days.

(21) Appl. No.: 10/839,728

(22) Filed: May 4, 2004

(65) Prior Publication Data
US 2006/0004670 A1 Jan. 5, 2006

Related U.S. Application Data

(63) Continuation of application No. 09/657,622, filed on Sep. 8, 2000, now abandoned.

(60) Provisional application No. 60/155,841, filed on Sep. 24, 1999.

(51) Int. Cl.
*G06Q 20/00* (2006.01)
(52) U.S. Cl. .............................. 705/64; 705/50; 705/51
(58) Field of Classification Search ................... 705/64, 705/50, 51
See application file for complete search history.

(56) References Cited

U.S. PATENT DOCUMENTS 4,304,990 A 12/1981 Atalla (Continued)

FOREIGN PATENT DOCUMENTS

EP 0 784 282 A2 7/1997

(Continued)

OTHER PUBLICATIONS

Aslam, Taimur, "Protocols for e-commerce", including related article on BlueMoney commerce model, *Dr. Dobb's Journal* (Dec. 1998) http://www.sxlist.com/techref/article/ddj/no292p58.htm.

(Continued)

*Primary Examiner*—Pierre E Elisca
(74) *Attorney, Agent, or Firm*—Sonnenschein Nath & Rosenthal LLP

(57) ABSTRACT

A system and method are disclosed for providing a plurality of payment services to facilitate electronic commerce. In one embodiment, services are provided within the context of a four-corner trust model comprising a buyer and a seller that engage in an on-line transaction. The buyer is a customer of a first financial institution. The first financial institution acts as a certificate authority for the buyer and issues the seller a hardware token including a private key and a digital certificate signed by the first financial institution. The seller is a customer of a second financial institution. The buyer uses its private key to sign payment instructions that are forwarded to the first or second financial institution for execution. The message may be forwarded to the first financial institution indirectly via the seller and the second financial institution. Payment instruments supported by the present system may include a payment order, a payment obligation, a certified payment obligation, and conditional payments.

21 Claims, 8 Drawing Sheets

U.S. PATENT DOCUMENTS

| | | |
|---|---|---|
| 5,048,085 A | 9/1991 | Abraham et al. |
| 5,191,193 A | 3/1993 | LeRoux |
| 5,353,350 A | 10/1994 | Unsworth et al. |
| 5,389,738 A | 2/1995 | Piosenka et al. |
| 5,406,630 A | 4/1995 | Piosenka et al. |
| 5,448,045 A | 9/1995 | Clark |
| 5,453,601 A | 9/1995 | Rosen |
| 5,511,121 A | 4/1996 | Yacobi |
| 5,557,518 A | 9/1996 | Rosen |
| 5,604,801 A | 2/1997 | Dolan et al. |
| 5,615,269 A | 3/1997 | Micali |
| 5,623,637 A | 4/1997 | Jones et al. |
| 5,638,446 A | 6/1997 | Rubin |
| 5,659,616 A | 8/1997 | Sudia |
| 5,668,878 A | 9/1997 | Brands |
| 5,671,279 A | 9/1997 | Elgamal |
| 5,677,955 A | 10/1997 | Doggett et al. |
| 5,680,455 A | 10/1997 | Linkser et al. |
| 5,689,565 A | 11/1997 | Spies et al. |
| 5,694,471 A | 12/1997 | Chen et al. |
| 5,703,949 A | 12/1997 | Rosen |
| 5,706,427 A | 1/1998 | Tabuki |
| 5,717,989 A | 2/1998 | Tozzoli et al. |
| 5,721,781 A | 2/1998 | Deo et al. |
| 5,745,571 A | 4/1998 | Zuk |
| 5,745,574 A | 4/1998 | Muftic |
| 5,754,772 A | 5/1998 | Leaf |
| 5,784,612 A | 7/1998 | Crane et al. |
| 5,790,677 A | 8/1998 | Fox et al. |
| 5,809,144 A | 9/1998 | Sirbu et al. |
| 5,815,657 A | 9/1998 | Williams et al. |
| 5,841,866 A | 11/1998 | Bruwer et al. |
| 5,842,211 A | 11/1998 | Horadan et al. |
| 5,845,260 A | 12/1998 | Nakano et al. |
| 5,847,374 A | 12/1998 | Menconi |
| 5,850,442 A | 12/1998 | Muftic |
| 5,861,662 A | 1/1999 | Candelore |
| 5,870,473 A | 2/1999 | Boesch et al. |
| 5,889,863 A | 3/1999 | Weber |
| 5,892,900 A | 4/1999 | Ginter et al. |
| 5,903,882 A | 5/1999 | Asay et al. |
| 5,909,492 A | 6/1999 | Payne et al. |
| 5,913,210 A | 6/1999 | Call |
| 5,920,629 A | 7/1999 | Rosen |
| 5,920,847 A | 7/1999 | Kolling et al. |
| 5,937,068 A | 8/1999 | Audebert |
| 5,943,424 A | 8/1999 | Berger |
| 5,944,789 A | 8/1999 | Tzelnic et al. |
| 5,956,404 A | 9/1999 | Schneier et al. |
| 5,958,051 A | 9/1999 | Renaud et al. |
| 5,970,475 A | 10/1999 | Barnes et al. |
| 5,987,440 A | 11/1999 | O'Neil et al. |
| 5,991,750 A | 11/1999 | Watson |
| 6,003,007 A | 12/1999 | DiRienzo |
| 6,003,765 A | 12/1999 | Okamoto |
| 6,014,646 A | 1/2000 | Valee et al. |
| 6,029,150 A | 2/2000 | Kravitz |
| 6,035,402 A | 3/2000 | Vaeth et al. |
| 6,038,551 A | 3/2000 | Barlow et al. |
| 6,039,248 A * | 3/2000 | Park et al. .................. 235/379 |
| 6,044,350 A | 3/2000 | Weiant, Jr. et al. |
| 6,044,462 A | 3/2000 | Zubeldia et al. |
| 6,052,785 A | 4/2000 | Lin et al. |
| 6,067,621 A | 5/2000 | Barlow et al. |
| 6,072,870 A | 6/2000 | Nguyen et al. |
| 6,081,790 A | 6/2000 | Rosen |
| 6,085,168 A | 7/2000 | Mori et al. |
| 6,085,321 A | 7/2000 | Gibbs et al. |
| 6,092,196 A | 7/2000 | Reiche |
| 6,092,201 A | 7/2000 | Turnbull et al. |
| 6,105,012 A | 8/2000 | Chang et al. |
| 6,115,642 A | 9/2000 | Brown et al. |
| 6,125,349 A | 9/2000 | Maher |
| 6,134,327 A | 10/2000 | Van Oorachot et al. |
| 6,134,550 A | 10/2000 | Van Oorachot et al. |
| 6,138,107 A | 10/2000 | Elgamal |
| 6,141,679 A | 10/2000 | Schaefer et al. |
| 6,154,844 A | 11/2000 | Touboul et al. |
| 6,157,721 A | 12/2000 | Shear et al. |
| 6,157,917 A | 12/2000 | Barber |
| 6,157,920 A | 12/2000 | Jakobsson et al. |
| 6,157,927 A | 12/2000 | Schaefer et al. |
| 6,170,058 B1 | 1/2001 | Kausik |
| 6,175,921 B1 | 1/2001 | Rosen |
| 6,182,052 B1 | 1/2001 | Fulton et al. |
| 6,185,683 B1 | 2/2001 | Ginter et al. |
| 6,209,091 B1 | 3/2001 | Sudia et al. |
| 6,223,291 B1 | 4/2001 | Puhl et al. |
| 6,233,339 B1 | 5/2001 | Kawano et al. |
| 6,236,972 B1 | 5/2001 | Shkedy |
| 6,272,675 B1 | 8/2001 | Schrab et al. |
| 6,285,991 B1 | 9/2001 | Powar |
| 6,292,569 B1 | 9/2001 | Shear et al. |
| 6,301,658 B1 | 10/2001 | Koehler |
| 6,304,658 B1 | 10/2001 | Kocher et al. |
| 6,314,517 B1 | 11/2001 | Moses et al. |
| 6,324,525 B1 | 11/2001 | Kramer et al. |
| 6,327,578 B1 * | 12/2001 | Linehan ...................... 705/65 |
| 6,330,551 B1 | 12/2001 | Burchetta et al. |
| 6,341,353 B1 | 1/2002 | Herman et al. |
| 6,353,812 B2 | 3/2002 | Frankel et al. |
| 6,356,878 B1 | 3/2002 | Walker et al. |
| 6,363,365 B1 | 3/2002 | Kou |
| 6,363,479 B1 | 3/2002 | Godfrey et al. |
| 6,370,249 B1 | 4/2002 | Van Oorachot |
| 6,373,950 B1 | 4/2002 | Rowney |
| 6,385,651 B2 | 5/2002 | Dancs et al. |
| 6,449,598 B1 | 9/2002 | Green et al. |
| 6,477,513 B1 | 11/2002 | Walker et al. |
| 6,490,358 B1 | 12/2002 | Geer, Jr. et al. |
| 6,490,367 B1 | 12/2002 | Carlsson et al. |
| 6,496,858 B1 | 12/2002 | Frailong et al. |
| 6,510,513 B1 | 1/2003 | Danieli |
| 6,510,518 B1 | 1/2003 | Jaffe et al. |
| 6,523,027 B1 | 2/2003 | Underwood |
| RE38,070 E | 4/2003 | Spies et al. |
| 6,560,581 B1 | 5/2003 | Fox et al. |
| 6,598,027 B1 | 7/2003 | Breen, Jr. et al. |
| 6,601,233 B1 | 7/2003 | Underwood |
| 6,601,759 B2 | 8/2003 | Fife et al. |
| 6,609,128 B1 | 8/2003 | Underwood |
| 6,633,878 B1 | 10/2003 | Underwood |
| 6,643,701 B1 | 11/2003 | Aziz et al. |
| 6,658,568 B1 | 12/2003 | Ginter et al. |
| 6,675,153 B1 | 1/2004 | Cook et al. |
| 6,704,873 B1 | 3/2004 | Underwood |
| 6,711,679 B1 | 3/2004 | Guski et al. |
| 6,715,080 B1 | 3/2004 | Starkovich et al. |
| 6,718,470 B1 | 4/2004 | Adams et al. |
| 6,718,535 B1 | 4/2004 | Underwood |
| 6,763,459 B1 | 7/2004 | Corella |
| 6,766,454 B1 | 7/2004 | Riggins |
| 6,853,988 B1 | 2/2005 | Dickenson et al. |
| 6,865,674 B1 | 3/2005 | Mancini et al. |
| 6,889,325 B1 | 5/2005 | Sipman et al. |
| 6,973,571 B2 | 12/2005 | Lee et al. |
| 7,000,105 B2 | 2/2006 | Tallent, Jr. et al. |
| 7,072,870 B2 | 7/2006 | Tallent, Jr. et al. |
| 7,076,784 B1 | 7/2006 | Russell et al. |
| 7,080,251 B2 | 7/2006 | Fujishiro et al. |
| 7,080,409 B2 | 7/2006 | Eigeles |
| 7,100,195 B1 | 8/2006 | Underwood |
| 7,130,998 B2 | 10/2006 | Balfanz et al. |
| 7,165,178 B2 | 1/2007 | Gein et al. |

| | | | |
|---|---|---|---|
| 7,167,985 | B2 | 1/2007 | Ahmed |
| 7,177,839 | B1 | 2/2007 | Claxton |
| 7,200,573 | B2 | 4/2007 | Miller et al. |
| 7,206,805 | B1 | 4/2007 | McLaughlin, Jr. |
| 7,424,616 | B1 | 9/2008 | Brandenberg et al. |
| 2001/0011255 | A1 | 8/2001 | Asay et al. |
| 2001/0020228 | A1 | 9/2001 | Cantu et al. |
| 2001/0034724 | A1 | 10/2001 | Thieme |
| 2002/0029194 | A1 | 3/2002 | Lewis et al. |
| 2002/0029200 | A1 | 3/2002 | Dulin et al. |
| 2002/0029337 | A1 | 3/2002 | Sudia |
| 2002/0029350 | A1 | 3/2002 | Cooper et al. |
| 2002/0046188 | A1 | 4/2002 | Burges et al. |
| 2002/0059143 | A1 | 5/2002 | Frankel |
| 2002/0065695 | A1 | 5/2002 | Francoeur et al. |
| 2002/0095579 | A1 | 7/2002 | Yoshiura et al. |
| 2002/0112156 | A1 | 8/2002 | Gien et al. |
| 2002/0124172 | A1 | 9/2002 | Manahan |
| 2002/0128940 | A1 | 9/2002 | Orrin et al. |
| 2002/0129248 | A1 | 9/2002 | Wheeler et al. |
| 2003/0130958 | A1* | 7/2003 | Narayanan et al. ............ 705/73 |
| 2004/0111379 | A1* | 6/2004 | Hicks et al. ................... 705/76 |
| 2004/0148505 | A1* | 7/2004 | Qiu ............................ 713/175 |
| 2004/0187031 | A1 | 9/2004 | Liddle |
| 2005/0114666 | A1 | 5/2005 | Sudia |
| 2005/0132229 | A1 | 6/2005 | Zhang et al. |
| 2006/0004670 | A1 | 1/2006 | McKenny et al. |
| 2007/0073621 | A1* | 3/2007 | Dulin et al. ................... 705/50 |
| 2007/0165208 | A1* | 7/2007 | Cowburn et al. .............. 356/71 |
| 2008/0010665 | A1 | 1/2008 | Hinton et al. |

FOREIGN PATENT DOCUMENTS

| | | |
|---|---|---|
| WO | WO 96/31965 A1 | 10/1996 |
| WO | WO 98/26386 A1 | 6/1998 |
| WO | 98/26385 A3 | 8/1998 |
| WO | WO 99/22291 | 5/1999 |
| WO | WO 00/45564 | 8/2000 |
| WO | WO 00/67143 | 11/2000 |
| WO | WO 01/18717 A1 | 3/2001 |

OTHER PUBLICATIONS

E-mail from Robert R. Jeuneman, GTE Laboratories, to Phill Hallam, W3C, re: Nonrepudiation and CA Liabilities (Oct. 16, 1995), 15:54 EDT) (ftp://ftp.tis.com/pub/pem-dev/archive).

E-mail from Robert R. Jueneman, GTE Laboratories, to Hal Finney, re: Nonrepudiation and CA liabilities (Oct. 19, 1995, 15:31 EDT) (ftp://ftp.tis.com/pub/pem-dev/archive).

E-mail from Robert R. Jueneman, GTE Laboratories, to Mike Roe and Warwick Ford, re: User Key Materal Proposal (Sep. 8, 1994, 5:49 EDT) (ftp://ftp.tis.com/pub/pem-dev/archive).

E-mail from Robert R. Jueneman, GTE Laboratories, to Peter Williams, Verisign, re: Certificate hierarchies and SEPP/STT concepts, part 2 (Oct. 13, 1995, 17:49 EDT) (ftp://ftp.tis.com/pub/pem-dev/archive).

Hallam-Baker, Phillip M., Micro Payment Transfer Protocol (MPTP) Ver. 0.1, W3C Working Draft, at http://www.w3.org/pub/WWW/TR/WD-mptp-951122 (Nov. 22, 1995).

Linehan, Mark et al., Internet Keyed Payments Protocol (iKP), at http://www.zurichibm.com/Technolo.../ecommerce/draft-tsudik-ikp-00.txt (Jul. 1995).

MasterCard Int'l Inc. Operations Manual §§ 5.11-5.14 (Nov. 1993).

"Acceptance of Signature Guarantees From Eligible Guarantor Institutions", 56 Fed. Reg. 18380, (Apr. 22, 1991).

"Acceptance of Signature Guarantees From Eligible Guarantor Institutions", 56 Fed. Reg. 46748, (Sep. 16, 1991) (to be codified at 17 CFR pt. 240).

Aiken, Peter et al., Microsoft Computer Dictionary, Micrsoft Press, 5th Edition, p. 290.

"Baltimore Announces Support for Identrus, the Global Trust Organization", Business Wire, New York: Apr. 12, 1999, p. 1, Proquest #40459204, 3 pages.

Banking Bulletin from Christopher M. Cross, Deputy Comptroller for Compliance, Comptroller of the Currency Administrator of National Banks, to national Banks Registered as a Transfer Agent, District Deputy Comptrollers, Department and Division Heads, and all Examining Personnel, Re: Adoption of New Transfer Agent (Feb. 12, 1992).

Biddle, C. Bradford, "Comment, Misplaced Priorities: The Utah Digital Signature Act and Liability Allocation in a Public Key Infrastructure", San Diego Law Review 33, 1143, 1996.

Breedon, Richard C., Chairman, U.S. Securities and Exchange Commission, Letter to The Honorable Jake Gam, Senate Banking, Housing, and Urban Affairs Committee (Mar. 6, 1990).

Brown-Humes, Christopher, and Graham, George, "Banks join forces to provide guarantees on internet trading", Financial Times, London, UK: Apr. 12, 1999, p. 20, Proquest #40448447, 3 pages.

Brown, Mark R., "Special Edition Using Netscape 2" 1995. 2nd Edition, p. 287,288, 876-879.

Elley, Yassir et al., "Building Certification Paths: Forward vs. Reverse", Proc. 2001 Network and Distributed System Security Symposium, Feb. 8-9, 2001, San Diego, CA.

"Entrust Technologies Supports Newly Formed Identrus Organization", Business Wire, New York: Apr. 12, 1999, p. 1, Proquest #40463049, 3 pages.

Guttman, Egon, Professor of Law, The American University, Washington College of Law, letter to Jonathan G. Katz, Esq., Secretary to the Securities and Exchange Commission, Re: Securities Exchange Act Release No. 34-29663 Notice of Proposed Rule Making, new Rule 17 Ad-15 File No. 57-27-91 (Oct. 28, 1991).

Hallerman, David, "Will Banks Become E-Commerce Authorities?", Bank Technology News, New York: Jun. 1999, vol. 12, Issue 6, p. 1; Proquest 42664468, 8 pages.

Hesse, Peter & David P. Lemire, "Managing Interoperability in Non-Hierarchical Public Key Infrastructures", Proc. 2001 Network and Distributed System Security Symposium, Feb. 8-9, 2001, San Diego, CA.

"Identrus begins pilot, Bits Opens Doors to Lab", Corporate EFT Report, Potomac, Jul. 21, 1999, vol. 19, Issue 14;p. 1; Proquest #43335701, 2 pages.

Kaner, Cem, "The Insecurity of the Digital Signature", at http://www.badsoftware.com/digsig.htm (Sep. 1997).

Kutler, Jeffrey, "ABA's Certificate Venture Aims to Give Banks the Lead in Secure Net Payments," American Banker, New York, NY: May 14, 1999, vol. 164, Issue 92; p. 1; Proquest #41354786, 3 pages.

Marketing Brochure, Securities Transfer Agent Medallion Program (1991).

Merrill, Charles R., "An Attorney's Roadmap to the Digital Signature Guideline", in 1318 Lecture Notes in Computer Science 291, 291-297 (Rafael Hirschfield ed. 1997).

Mitchell, C.J. et al., Contemporary Cryptology: The science of Information Integrity pp. 325-378 (Simmons ed., IEEE Press, 1992).

Pamatatau, Richard, "CA anticipates a secure e-commerce infrastructure", Dominion, Wellington, New Zealand, Jul. 26, 1999, P.IT. 8, Proquest #43762280, 3 pages.

Pfitzmann, Birgit, "Digital Signatures Schemes", 1100 Lecture Notes in Computer Science (Goss et al. eds. 1996).

Schapiro, Mary L., "Clarifying Elimination of Stock Certificates", Wall Street Journal, Jan. 17, 1991.

SET: Secure Electronic Transaction Specification, May 31, 1997, Version 1, pp. 1-619.

Solomon, Howard, "Canadian banks vault into e-com identity service", Computing Canada, Jun. 4, 1999, v25i22pg23; Proquest #42244579, 3 pgs.

STAMP Initiative Receives Support from SEC, STA Newsletter (The Securities Transfer Association, Inc.), Jun. 30, 1990, at 1, 4.

"ValiCert Selected as Validation Technology for Identrus' Global Business to Business E-Commerce Pilot", PR Newswire, New York: Jul. 12, 1999, p. 1; Proquest #43079343, 3 pages.

Patent Cooperation Treaty, "PCT International Search Report", issued for PCT/US00/24661, mailed Jan. 25, 2001.

Patent Cooperation Treaty, "PCT International Search Report", issued for PCT/US00/24607, mailed Jan. 9, 2001.
Patent Cooperation Treaty, "PCT International Search Report", issued for PCT/US02/12947, mailed Jun. 21, 2002.
Patent Cooperation Treaty, "PCT International Search Report", issued for PCT/US01/25389, mailed Nov. 23, 2001.
Patent Cooperation Treaty, "PCT International Search Report", issued for PCT/US01/28275, mailed Dec. 31, 2001.
Patent Cooperation Treaty, "PCT International Search Report", issued for PCT/US01/28277, mailed Dec. 14, 2001.
Patent Cooperation Treaty, "PCT International Search Report", issued for PCT/US01/28278, mailed Dec. 3, 2001.
Patent Cooperation Treaty, "PCT International Search Report", issued for PCT/US00/24662, mailed Jan. 23, 2001.
Patent Cooperation Treaty, "PCT International Search Report", issued for PCT/US00/24663, mailed Dec. 29, 2000.
Patent Cooperation Treaty, "PCT International Search Report", issued for PCT/US01/25388, mailed Nov. 19, 2001.
Patent Cooperation Treaty, "PCT International Search Report", issued for PCT/US00/03552, mailed Jun. 13, 2000.
Patent Cooperation Treaty, "PCT International Search Report", issued for PCT/US00/03550, mailed May 2, 2000.
Patent Cooperation Treaty, "PCT International Search Report", issued for PCT/US00/24606, mailed Jan. 17, 2001.
Patent Cooperation Treaty, "PCT International Search Report", issued for PCT/US00/24608, mailed Dec. 8, 2000.
Patent Cooperation Treaty, "PCT International Search Report", issued for PCT/US09/00357, mailed Mar. 24, 2009.
European Patent Office, Supplementary European Search Report for EP 00961672, Munich Germany, Jun. 12, 2009.
Sugiyama, "Investigation in the USA on Authentication Business in Financial Institution", The Center for Financial Industry Information Systems (FISC), No. 205, pp. 50-62, Sep. 1, 1998.
Japanese Patent Office, Office Action issued in Patent Application JP 2001-526778, on Feb. 10, 2010.

* cited by examiner 6.1.2 Message Flow 6.1.2 Message Flow

SYSTEM AND METHOD FOR PROVIDING PAYMENT SERVICES IN ELECTRONIC COMMERCE

This application is a continuation of, claims priority from, and incorporates by reference in its entirety U.S. patent application Ser. No. 09/657,622 filed Sep. 8, 2000(now abandoned); and said application Ser. No. 09/657,622 claims priority from U.S. provisional patent application 60/155,841, filed Sep. 24, 1999, entitled System and Process for Payment Services, which provisional application is also hereby incorporated by reference in its entirety into the present patent application.

FIELD OF THE INVENTION

The present invention relates generally to the field of facilitating electronic commerce by providing services via a public key infrastructure.

BACKGROUND OF THE INVENTION

The world of electronic commerce has created new challenges to establishing relationships between contracting parties. One of those challenges springs from the fact that the parties to the transaction cannot see or hear each other, and cannot otherwise easily confirm each other's identity and authority to act.

One remedy for this problem is to provide each contracting party with a private key for signing transmitted messages. The signing party makes available an associated public key that decrypts messages signed with the party's private key, and thus enables a receiving party to confirm the identity of the sender.

But the sender's public key may not be known a priori to the recipient. In that event, the sender may transmit with its signed message a digital certificate issued by a certificate authority. The certificate is itself a signed electronic document (signed with the private key of the certificate authority) certifying that a particular public key is the public key of the sender.

In some cases, the recipient may be unfamiliar with the public key of the certificate authority or may not know whether the certificate is still valid. In that event, the recipient may wish to check the authenticity and validity of the certificate with an entity that it trusts. One known protocol for checking certificate status is the on-line certificate status protocol (OCSP).

Another challenge facing electronic commerce relates to payments and the establishment of payment systems. In some cases, purchasers pay for goods purchased over the Internet by transmitting a credit card number to a merchant. Security risks and other drawbacks associated with this practice make it undesirable even for business-to-consumer transactions, and unacceptable for most business-to-business ones.

Several electronic payment systems have also been proposed, including ones that employ digital certificates to authenticate the identity of a payor. These systems, however, do not provide the array of payment instruments required for modern electronic commerce, especially business-to-business electronic commerce, and often fail to provide an adequate infrastructure to securely and verifiably effect electronic payments.

SUMMARY OF THE INVENTION

A system and method are disclosed for providing a plurality of payment services to facilitate electronic commerce. In a preferred embodiment, these services are provided within the context of a four-corner trust model. The four-corner model comprises a buyer, also referred to as the subscribing customer, and a seller, also referred to as the relying customer, who engage in an on-line transaction. The buyer is a customer of a first financial institution, referred to as an issuing participant. The issuing participant acts as a certificate authority for the buyer and issues the buyer a hardware token including a private key and a digital certificate signed by the issuing participant. The seller is a customer of a second financial institution, referred to as the relying participant. The relying participant acts as a certificate authority for the seller and issues the seller a hardware token including a private key and a digital certificate signed by the relying participant. The system also includes a root certificate authority that issues digital certificates to the issuing and relying participants.

One benefit of the four-corner model is that trust between a buyer and seller does not depend on each party using the same certifying authority to validate digital certificates, or identity, to each other. Rather, the buyer and seller each look, in the first instance, to their respective banks for such validations. In turn, the buyer's and seller's banks look to the root entity to provide the necessary bridge that enables them to confidently validate the identity of one party to another and the integrity of the messages they exchange.

The present system and method leverage this trust model to provide enhanced payment services to buyers and sellers. The four-corner trust model and pre-established banking relationships between the parties and their respective banks enable the parties to complete an on-line purchase or trade and simultaneously arrange for a secure, efficient and, optionally, guaranteed payment. Moreover, use in the present system of digitally signed payment instructions provides authentication, message integrity, non-repudiation, and confidentiality.

In a preferred embodiment, payment messaging in the present system proceeds from buyer to seller to seller's bank to buyer's bank. Thus, for example, a buyer may execute a payment instruction and forward it to the seller who in turn forwards it to the seller's bank for ultimate delivery to, and payment by, the buyer's bank.

The present system and method operate efficiently in part because parties have pre-established payment authorization, routing, and settlement instructions with their banks, which enable the parties to initiate an on-line payment that is simultaneous with the transaction, rather than through a separate, off-line step. Additional efficiencies are created through standardized payment processing procedures at the banks.

The present system and method provide numerous benefits to buyers. In particular, the present system and method provide a buyer with access to a variety of payment options to satisfy a seller's requirements. The buyer is also provided with improved timing and knowledge of cash flows. In addition, the present system and method enable a buyer to cover trade-inherent risks by using a conditional payment instrument. Moreover, the buyer enjoys efficient work flows, as payment and purchasing are bundled into one process. Interfacing of the present system and method with existing legacy systems also enables full electronic processing of the entire transaction.

The present system and method also provide numerous benefits to sellers. In particular, the present system and method provide a seller with the ability to offer payment terms tailored to valued clients. The seller also reduces his or her credit risk through the use of assured payments. In addition, the present system and method improve a seller's timing and knowledge of cash flows. Moreover, the seller enjoys efficient work flows, as payment and purchasing are bundled into one process. Also, if the seller is holding a payment obligation, it may ask its bank to discount the obligation, providing a source of financing to the seller. Interfacing of the present system and method with existing legacy systems also enables full electronic processing of the entire transaction.

In a preferred embodiment, the present system and method facilitate a plurality of payment instruments. These include a payment order, a payment obligation, a certified payment obligation, and conditional payments. Each of these payment instruments is described in more detail below in the detailed description.

In a preferred embodiment, the present system facilitates the creation and transfer of negotiable electronic payment instruments. For example, the present system includes a payment obligation that may preferably be sold in the secondary market. Change in the holder of these obligations may preferably be performed through use of a holder registry service.

BRIEF DESCRIPTION OF THE DRAWINGS

The above summary of the invention will be better understood when taken in conjunction with the following detailed description and accompanying drawings, in which.

DETAILED DESCRIPTION OF THE PREFERRED EMBODIMENTS

System Architecture and Technical Characteristics

The present disclosure relates to a system that allows financial institutions to securely provide payment services to their customers. In a preferred embodiment, these services may be provided within the context of a four-corner trust model. A preferred embodiment of the four-corner model employed by the present system is shown in FIG. 1.

Figure 1:
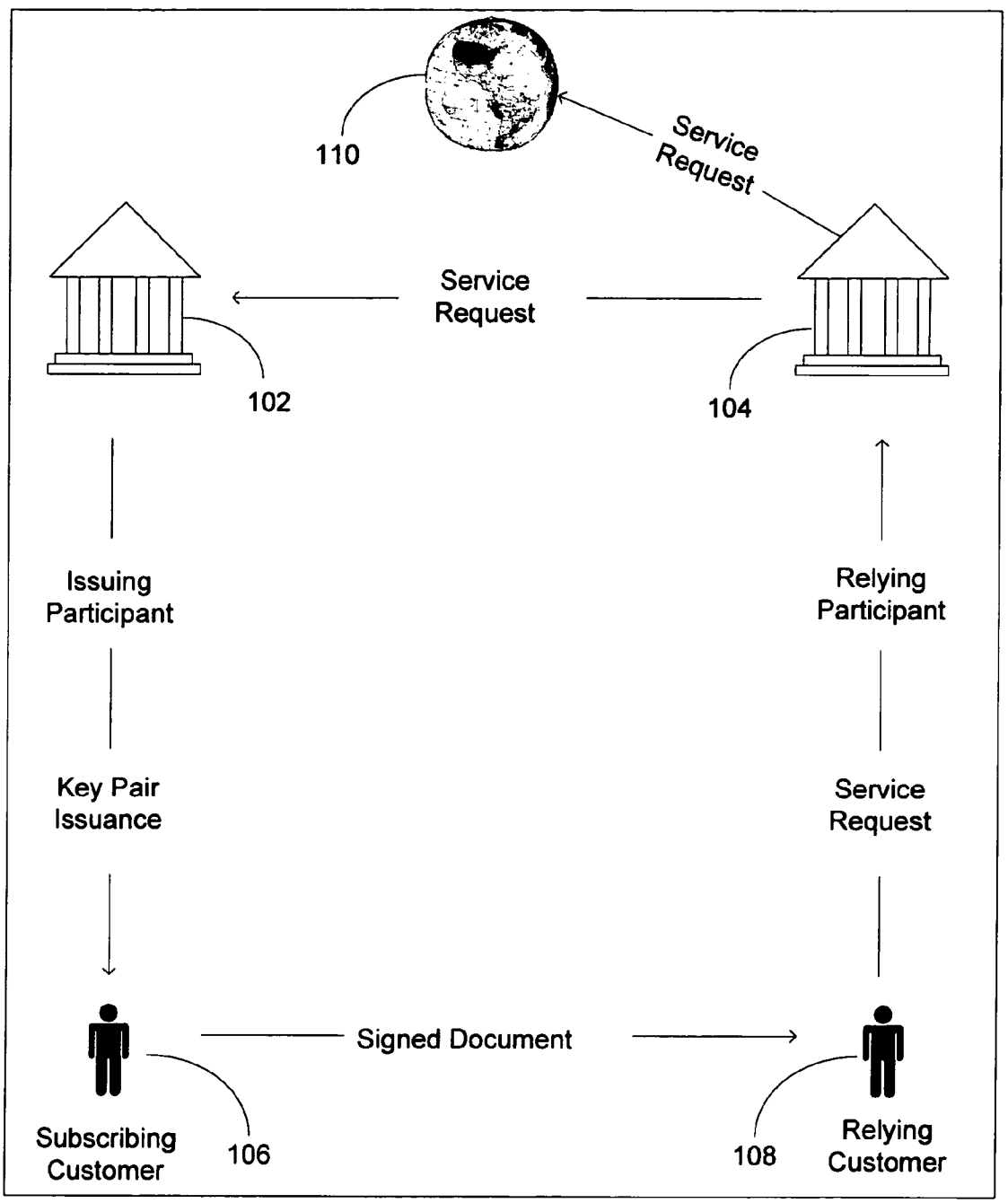
FIG. 1 is a block diagram of a preferred embodiment of the four-corner model employed by the present system.

As shown in FIG. 1, the four-corner model comprises a first institution 102 and a second institution 104. First institution 102 is referred to as the "issuing participant" because it is a participant in the present system and issues digital certificates to its customers, as described below. Second institution 104 is referred to as the "relying participant" because it is a participant in the present system and its customers rely on representations made by issuing participant 102 and issuing participant 102's customers, as described below. Participants 102, 104 are typically banks or other financial institutions.

Also shown in FIG. 1 are a first customer 106, and a second customer 108. First customer 106 and second customer 108 are preferably customers of issuing participant 102 and relying participant 104, respectively.

First customer 106 is sometimes referred to as the "subscribing customer" because it subscribes to services provided by participant 102. First customer 106 is also sometimes referred to as the "buyer" because that is the role it typically plays in transactions in the four-corner models.

Second customer 108 is sometimes referred to as the "relying customer" because it relies on representations made by both issuing participant 102 and subscribing customer 106. Second customer 108 is also sometimes referred to as the "seller" because that is the role it typically plays in transactions in the four-corner model. It should be recognized, however, that although the description below speaks primarily in terms of a buyer 106 and a seller 108, first customer 106 and second customer 108 may instead have different roles in a given transaction. For example, first customer 106 may be a borrower repaying a loan to second customer 108.

Also shown in FIG. 1 is a root entity 110. Root entity 110 is typically an organization that establishes and enforces a common set of operating rules for facilitating electronic commerce and electronic communications. Root entity 110 may be owned jointly by a plurality of banks and/or other financial institutions that have agreed to adhere to these operating rules. One exemplary embodiment of such a root entity is described in copending application Ser. No. 09/502,450, filed Feb. 11, 2000, entitled System and Method for Providing Certification-Related and Other Services, which is hereby incorporated by reference.

Figure 2:
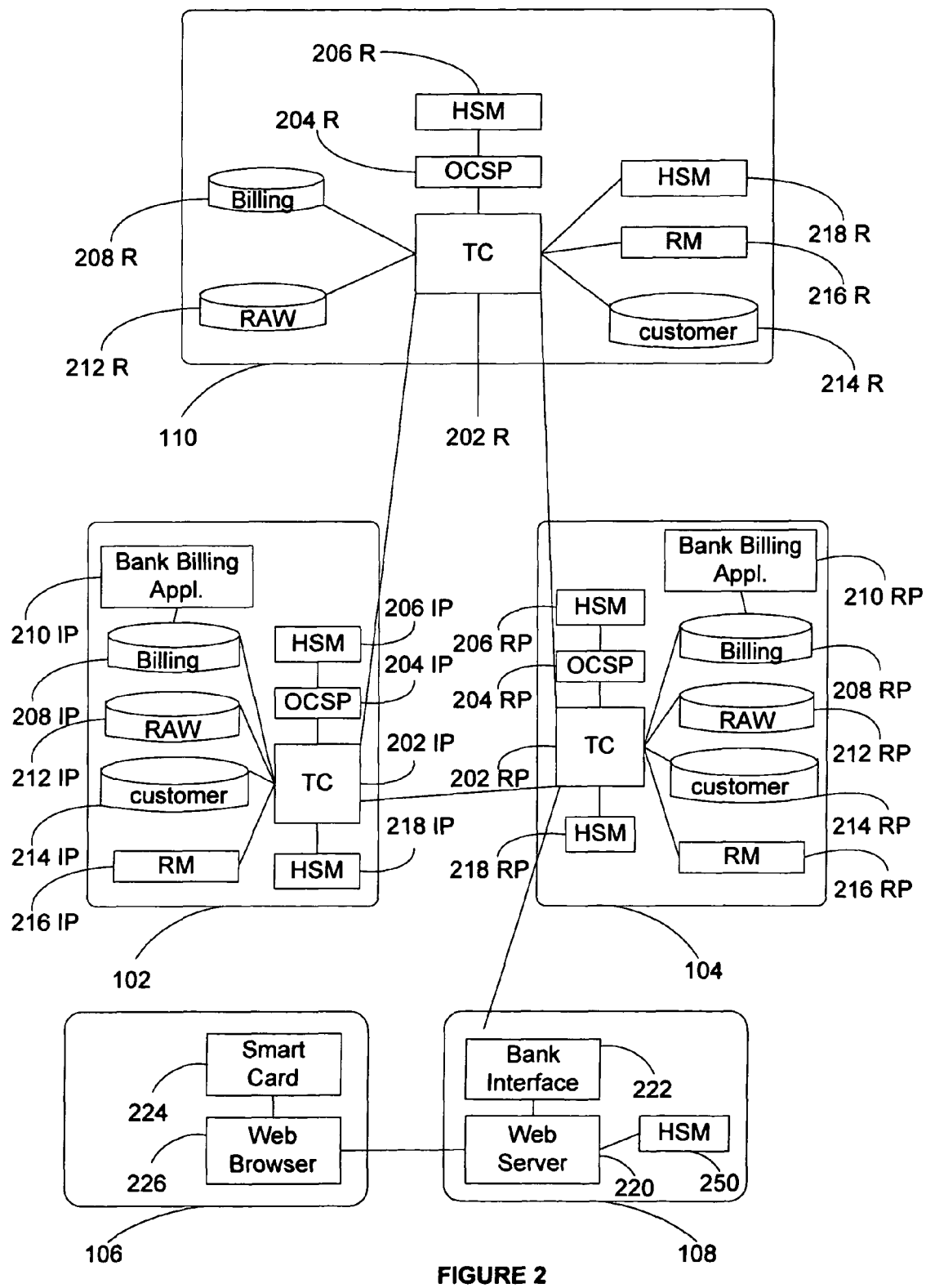
FIG. 2 is a block diagram depicting components preferably provided at entities in the four-corner model.

FIG. 2 is a block diagram depicting components preferably provided at each entity in the four-corner model. As shown in FIG. 2, participants 102, 104 and root entity 110 are each preferably provided with a transaction coordinator 202 that serves as a gateway for transmitting and receiving all inter-entity messages related to services provided by the present system. Transaction coordinators 202 provide a single interface to issuing participant 102's and relying participant 104's on-line services and implement safeguards necessary to ensure secure electronic communications between transaction coordinators 202 and other entities in the four-corner model. A preferred embodiment of a transaction coordinator 202 suitable for use in the present system is described in U.S. patent application Ser. No. 09/657,605, filed on Sep. 8, 2000, entitled System and Method for Providing Certificate Validation and Other Services, which is hereby incorporated by reference in its entirety into the present patent application.

Participants 102, 104 and root entity 110 are each further preferably provided with an OCSP responder 204 and hardware security module (HSM) 206. HSM 206 is adapted to sign messages and verify signatures on messages.

In addition, each participant 102, 104 and root entity 110 is further preferably provided with a billing data database 208 (connected to a bank billing application 210 in the case of participants 102, 104), a raw transaction log, 212, a customer data database 214, a risk manager 216 (connected to customer data database 214), and a hardware security module 218, each of which is connected to transaction coordinator 202.

As further shown in FIG. 2, relying customer 108 is preferably provided with a Web server 220 that is adapted to receive and transmit information via the Internet. Relying customer 108 is further preferably provided with a bank interface 222 for communicating with relying participant 104. One preferred embodiment of bank interface 222 (as well as additional components preferably provided at relying customer 108) is described in copending U.S. patent application Ser. No. 09/657,604, filed on Sep. 8, 2000, entitled System and Method for Facilitating Access By Sellers to Certificate-Related and Other Services, which is hereby incorporated by reference in its entirety into the present patent application.

Relying customer 108 is preferably further provided with a hardware security module 230 for signing and verifying system messages.

As further shown in FIG. 2, subscribing customer 106 is preferably provided with a Web browser 224 for browsing the Internet, and a smart card 226 (and associated reader) for signing messages, as described below.

In a preferred embodiment, each system entity is provided with two digital certificates (and corresponding private keys) to facilitate authentication: An identity certificate (also referred to, in some cases, as a warranty certificate) and a utility certificate. In addition, in a preferred embodiment, each transaction coordinator 202 is preferably provided with its own identity certificate and utility certificate and associated private keys.

The identity private key is used to produce digital signatures that are required by root entity 110 as evidence of an entity's contractual commitment to the contents of an electronic transaction. A certificate chain is needed to support operations using this key. The status of the identity certificate may be obtained by authorized entities as described, for example, in U.S. patent application Ser. No. 09/657,605, filed on Sep. 8, 2000, entitled System and Method for Providing Certificate Validation and Other Services, which is hereby incorporated by reference in its entirety into the present patent application.

The utility private key is used to produce digital signatures that allow additional transactional security. Typically, utility certificates are used to support secure socket layer sessions, to sign S/MIME messages, and for other utility applications. A certificate chain is also needed to support operations using the utility key. The status of the utility certificate, however, may not be available to a requester. Throughout this document, the term "certificate" refers to an identity certificate unless otherwise stated.

In a preferred embodiment, subscribing customer 106's digital certificates and associated private keys are provided to it by issuing participant 102. Issuing participant 102 preferably issues smart cards or other suitable instruments to subscribing customer 106 that include at least the private key associated with the subscribing customer's identity certificate. If desired, the smart card may also include the subscribing customer's identity certificate. Preferred specifications for the smart card, its manufacture, and contents are described in U.S. provisional patent application Ser. No. 60/224,944, filed Aug. 14, 2000, entitled Signing Interface Requirements, Smart Card Compliance Requirements, Warranty Service, Functional Requirements, and Additional Disclosure, which is hereby incorporated by reference in its entirety into the present patent application.

In a preferred embodiment, the present system supports at least the following Internet transport protocols: Hyper Text Transport Protocol (HTTP), Multipurpose Internet Mail Extensions (MIME), Simple Mail Transport Protocol (SMTP), and Internet Inter-ORB Protocol (IIOP). In addition, the present system preferably supports at least the following Internet transport security protocols: Secure Sockets Layer (SSL), Secure/Multipurpose Internet Mail Extensions (S/MIME), Transport Layer Security (TLS), and Secure Internet Inter-ORB Protocol (S-IIOP).

In a preferred embodiment, payment instruments in the present system are encrypted to protect confidential financial information. Due to the confidential nature of the information exchanged between all parties strong encryption is preferred. The encryption should preferably be at the message-level, in addition to any transport-level encryption.

To enable automated processing, payment messages in the present system are preferably structured to optimize fast on-line processing with certificate management services provided by the present system (e.g., certificate validation) as well as with other systems such as legacy systems that are external to the present system. Integration with the present system may include a set of MIME-based messages. Integration with other systems may include EDIFACT, XML/BizTalk and Enterprise Java Beans. These are preferred because they enable straightforward conversion into existing payment message formats.

Payment services messages in the present system are preferably signed by system entities using the private keys associated with their identity certificates. The payment services messages may be enveloped or referenced, or both, in the content of certificate management service messages.

Many of the payment messages described below require contributions from more than one party before the completed message is transmitted to the final recipient. Messages in the present system are therefore preferably structured to support signed additions to the contents while preserving non-repudiation for each signer and the final recipient.

At the very low end, a buyer 106 may typically employ a standard Internet browser such as Netscape Navigator™ or Internet Explorer™ along with some method to support applications related to the present system. Such methods may include a browser plug-in, the use of Java applets or some other technology. Technology options such as XML may also be used.

One potential implementation is to load an HTML page into browser 224 from a seller-side server containing the results of the negotiation of terms and conditions between buyer 106 and seller 108. Using a signed JAVA applet as part of the downloaded HTML page, the information can be structured and digitally signed using smart card 226. The resulting message can then be forwarded to the server for further processing. An alternative implementation approach is the use of plug-ins or helper applications, which compose and sign the payment service messages. Preferred embodiments for these implementations are described in U.S. provisional patent application Ser. No. 60/224,994, filed Aug. 14, 2000, entitled Signing Interface Requirements, Smart Card Compliance Requirements, Warranty Service, Functional Requirements, and Additional Disclosure, which is hereby incorporated by reference in its entirety into the present patent application.

Besides this synchronous communication model, other models of information exchange between buyer 106 and seller 108 may be supported. For example, asynchronous e-mail exchange may be supported by the system.

Typically, the seller uses a standard HTTP web server (e.g., Apache) to serve HTML pages and runs an application server to provide specific business functionality to buyers (e.g., a shopping system). Integrated with this application are other software components that facilitate access to system services including the validation and warranty services described, for example, in U.S. patent application Ser. No. 09/657,605, filed on Sep. 8, 2000, entitled System and Method for Providing Certificate Validation and Other Services, which is hereby incorporated by reference in its entirety into the present patent application, and the payment services described herein. In a preferred embodiment, this integration may be the active integration described in U.S. patent application Ser. No. 09/657,604, filed on Sep. 8, 2000, entitled System and Method for Facilitating Access By Sellers to Certificate-Related and Other Services, which is hereby incorporated by reference in its entirety into the present patent application. A seller 108's decision about payment instruments to offer buyer 106 and the resulting terms of a purchase are an integral part of the seller's application.

As an example, seller 108's application may use the buyer 106's certificate to identify a customer and apply special terms and conditions to that customer. In addition, the use of the payment services might be dependent on the merchandise as well as a customer's history with seller 108. For example for an order above a specific limit seller 108 may only be willing to accept certified payment obligations provided by a bank. In contrast, below a certain threshold seller 108 may decide to accept payment orders. In addition, a seller may use third party services like a Dun and Bradstreet rating service to decide which payment instruments are acceptable for a given transaction.

Applications running at seller 108 are preferably adapted to sign messages, verify signatures on messages, and check the status of a certificate as described, for example, in U.S. patent application Ser. No. 09/657,604, filed on Sep. 8, 2000, entitled System and Method for Facilitating Access By Sellers to Certificate-Related and Other Services, which is incorporated herein by reference in its entirety into the present patent application, and to provide the payment services described herein.

In addition to Web based implementations, server-to-server communication or an automated email-processing tool may also be employed at the seller's side.

Each participant in the present system may act as either a relying participant or an issuing participant depending on the situation. Thus, for example, in a case where a customer of a first participant is the buyer in a given transaction and a customer of a second participant is a seller in the same transaction, then the first participant is the issuing participant with respect to that transaction, and the second participant is the relying participant with respect to that transaction. Each participant preferably offers a number of services, including the following: acting as a certification authority for its customers (supporting issuance, renewal and revocation of certificates), providing validation and warranty services to its customers, responding to OCSP requests from other system participants (supporting certificate validation), and providing and supporting payment services for its customers (e.g., the payment services discussed herein).

In a preferred embodiment, transaction coordinator 202 is the primary interface to certificate based services provided by a participant. As described in U.S. patent application Ser. No. 09/657,605, filed on Sep. 8, 2000, entitled System and Method for Providing Certificate Validation and Other Services, which is incorporated herein by reference in its entirety into the present patent application, transaction coordinator 202 facilitates system functions like message verification, logging, billing, and authorization to all certificate based services.

Each customer certificate is preferably linked to an end-user authorization system at issuing participant 102 and relying participant 104. The components of the authorization system may be determined by each participant, but typically include information on transaction types, amount limits, overrides and approvals permitted to each customer certificate. A preferred authorization approach is described in U.S. provisional patent application Ser. No. 60/231,313, filed on Sep. 8, 2000, entitled Authorization/Credential Service and Authorization/Credential Service Proposal, which is incorporated herein by reference in its entirety into the present patent application.

Each customer certificate is preferably linked to a payment template system at buyer's bank 102 and seller's bank 104. The payment template stores default payment instructions for buyer 106, seller 108, and seller's bank 104 that are used by buyer's bank 102 to execute payment authorization messages. The design of the payment authorization message may permit some of the instructions to be overridden by a duly authorized buyer or seller end-user.

In a preferred embodiment, each bank may, at its discretion, provide its customers with additional functionality. This additional functionality may include maintenance of limits for a buying company or provision of aggregated management information about the use of payment services by a specific customer.

In a preferred embodiment, the payment services disclosed herein use existing bank networks for actual payment. They may also use existing functionality already available at banks like a payment warehousing system for future dated payments. Some of the connections to these existing systems are preferably real-time and on-line. These systems may include: a real-time, on-line interface to a payment initiation system to create, warehouse, and release payment orders; a real-time, on-line interface to a payment risk system that monitors daylight and overnight limits; a real-time, on-line component for generating payment initiation acknowledgments; a real-time, on-line interface to system identity servers to process digital signatures and identity assurance; a real-time, on-line interface to an application authorization system; and a real-time, on-line interface to a warehouse of payment order cancellation requests sent by a buyer 106 before buyer's bank 102 receives a payment order (payment revocation list).

Payment Instruments and Scenarios

Payment instruments provided by the present system include a payment order, a payment obligation, a certified payment obligation, and conditional payments. A brief description of each payment instrument is now provided. Each payment instrument is described in more detail below.

Payment Order

A payment order (POr) is a revocable, unconditional electronic instruction from a buyer 106 requesting buyer's bank 102 to initiate a credit payment to seller 108 on a specific date for a specified amount. The payment order is typically used when the buyer and seller have an established business relationship.

Payment Obligation and Certified Payment Obligation

A payment obligation (POb) is an irrevocable, unconditional undertaking of a buyer 106 to pay a seller 108, or holder, of the obligation on a specific date for a specified amount at buyer's bank 102. It is evidence of debt of the buyer to the seller. Buyer 106 may request buyer's bank 102 to accept or certify the obligation to pay seller 108, in which case it becomes a certified payment obligation (Certified POb).

A payment obligation is typically used when seller 108 is unsure of buyer 106's intent to pay on time. A certified payment obligation is used when seller is unsure of buyer's ability to pay.

Conditional Payments

A conditional payment is a payment order or a payment obligation in favor of a named seller, payable at buyer's bank 102 upon presentation to buyer's bank 102 of specified electronic messages, signed by specified parties, to evidence fulfillment of pre-agreed conditions. Buyer 106 may request buyer's bank 102 to accept or certify the obligation to pay seller 108, in which case it becomes a certified conditional payment obligation (Certified CPOb).

A conditional payment is used when either buyer 106 or seller 108, or both, agree that the payment will be effected only after certain provisions have been met. It is used to trigger the timing and occurrence of payment. A certified conditional payment obligation adds assurance that the payment will be effected once specified provisions have been met.

Payment Scenarios and Models

In a preferred embodiment, buyer 106, through various commercial and financial scenarios, can initiate payment orders and payment obligations. This is due to the ability of system 200 of FIG. 2 to identify parties at almost any stage of a commercial or financial transaction, which provides a great deal of flexibility as buyers initiate payments. The scenarios described below illustrate this flexibility.

Online Payment Initiation Through Seller Payment Server

Figure 3:
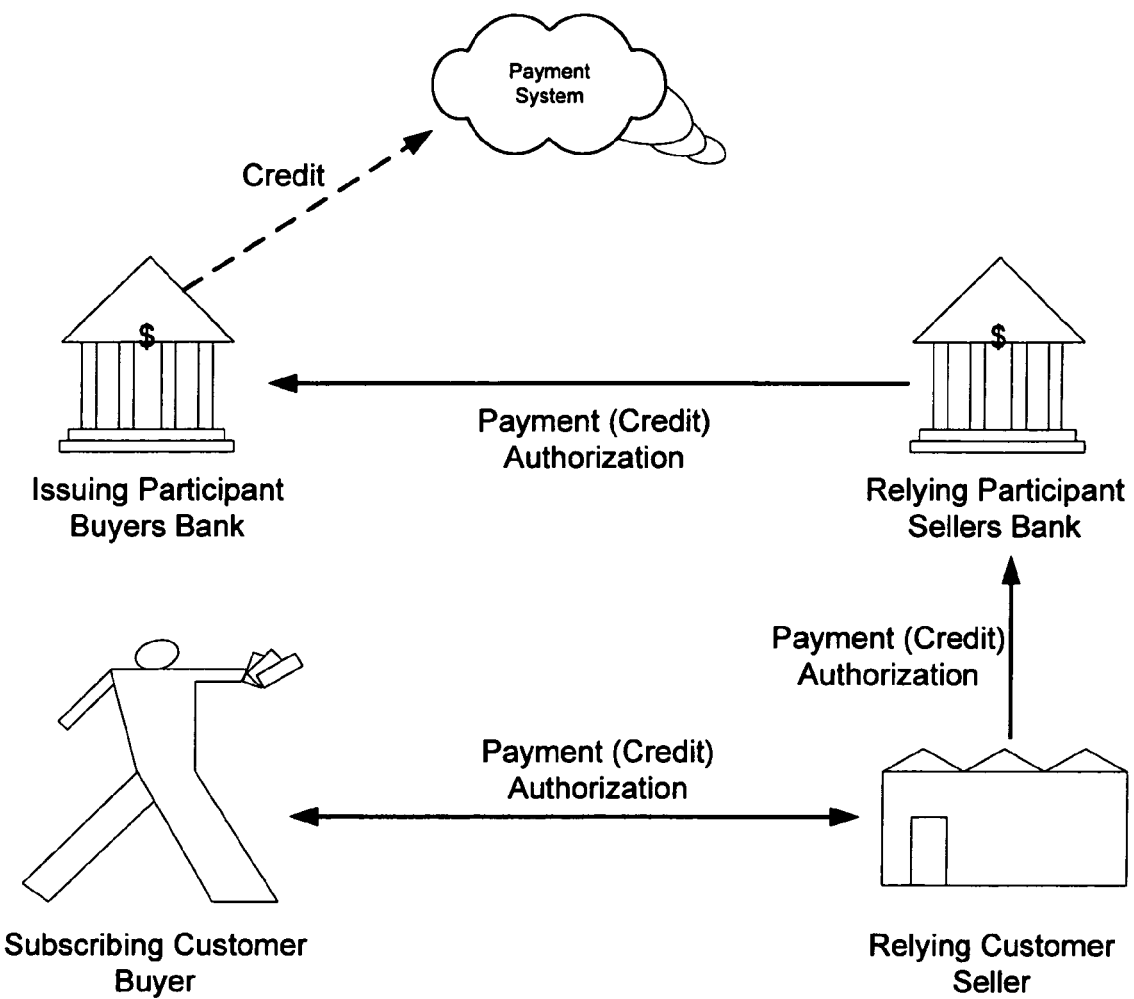
FIG. 3 is a composite block/flow diagram of a first payment scenario.

In a first payment scenario, seller 108's payment server offers payment order or payment obligation options to buyer 106. As shown in FIG. 3, in this first scenario, buyer 106 creates a payment order or payment obligation instruction and authorizes seller 108 to forward the instruction to buyer's bank 102 through seller's bank 104. Buyer 106, seller 108, and optionally, seller's bank 104, supply information needed to initiate the payment or create the obligation. In a preferred embodiment, using the four corner transaction model, buyer's bank 102 initiates payment or creates an obligation based on buyer 106's signature.

Online Debit Authorization Through Seller Payment Server

Figure 4:
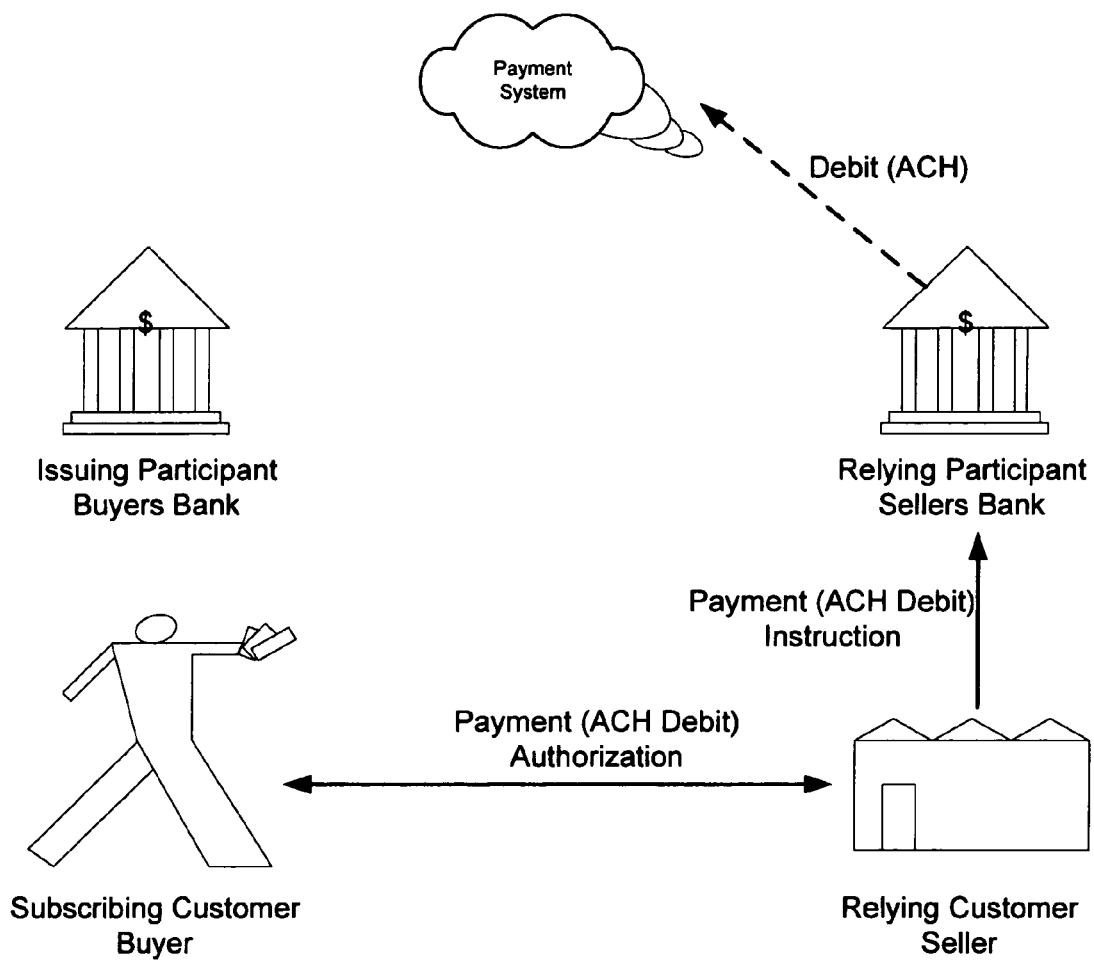
FIG. 4 is a composite block/flow diagram of a second payment scenario.

In a second payment scenario, seller 108's payment server offers a direct debit option to buyer 106 as depicted in FIG. 4. As shown in FIG. 4, in this second scenario, buyer 106 authorizes seller 108 to forward to seller's bank 104 an instruction for direct debit from buyer 106's account. In a preferred embodiment, buyer 106 and seller 108 supply information needed to initiate the payment. Seller's bank 104 initiates direct debit, based on seller 108's signature. This is referred to as a direct debit transaction model. It should be noted that this scenario may not work if buyer 106 and seller 108 operate in different countries.

Payment Initiation Through Buyer Payment Server

Figure 5:
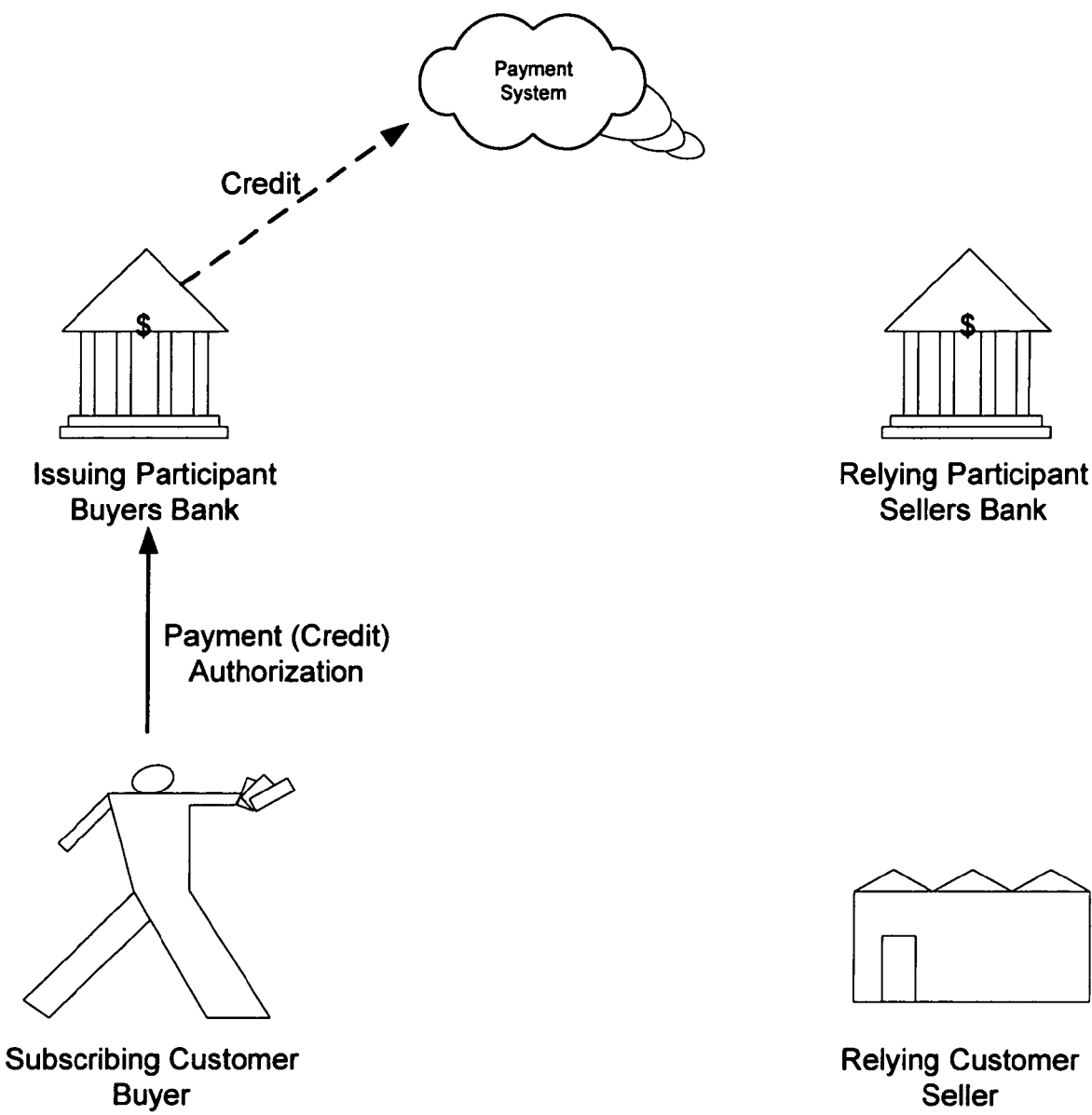
FIG. 5 is a composite block/flow diagram of a third payment scenario.

In a third payment scenario, buyer 106's payment server sends a payment order or obligation instructions directly to buyer's bank 102 as depicted in FIG. 5. As shown in FIG. 5, in this third payment scenario, buyer 106 supplies information needed to initiate the payment or obligation. Buyer's bank 102 initiates payment or creates the obligation based on buyer 106's signature. This is referred to as a buyer to buyer's bank transaction model.

Legal Relationships Between System Entities

In a preferred embodiment, contractual agreements bind banks and their customers. In particular, the use of system services is preferably defined by a set of operating rules and one or more contracts derived from these rules that are binding on system entities, as described in more detail below.

In a preferred embodiment, operating procedures and rules for the payment services disclosed herein define the rights and responsibilities of the participants. The rules of various electronic payment associations (including those of foreign jurisdictions) may serve as a helpful guide when creating these rules. Moreover, those association rules might even impose certain requirements on the new rules. For example, special attention is preferably given to association rules regarding issues of reversal of transaction and finality of payment.

Alternatively, to the extent that the payment order or obligation cannot be reconciled with existing payment rules, or in the event that such rules need to be supplemented (outside their existing framework) to take account of the unique nature of on-line payment initiation, the various parties involved in a transaction may be bound by an additional set of rules imposed by root entity 110.

In a preferred embodiment, the operating rules for the present system incorporate the Uniform Rules for Electronic Trade and Settlement (URETS), once approved by the International Chamber of Commerce (ICC).

In a preferred embodiment, payment obligations and certified payment obligations in the present system are created and recorded entirely in book entry form. As in the case of the bill of exchange, the payment obligation or the certified payment obligation may preferably be sold in the secondary market. Change in the holder of these obligations may preferably be performed through use of a holder registry service. Buyer's bank 102 is preferably made accountable for registering the correct holder of the obligation.

In a preferred embodiment, before payment services are used, buyer 106 and seller 108 each establish a relationship with their respective participants 102, 104. In a preferred embodiment, this includes the following steps:

Each customer and its respective participant sign a contract defining their roles and responsibilities in connection with payment services. This contract is typically in addition to other contracts between the parties covering other aspects of their customer-bank relationship. On signing of the contract, the customer accepts the operating rules for the payment services.

Each participant sets up the payment service for its respective customer. This may require a credit review process involving a number of bank departments. Establishing a payment guarantee account may take from hours to days and may be part of an existing credit relationship between the parties. It also preferably includes registration of the employees authorized to use payment services and establishing a line of credit for the customer. It also preferably encompasses set-up of standard settlement instructions for buyer 106 (e.g., account to be debited for each currency, payment system to be used). In addition, each bank may require additional set-up procedures dependent on the specific service the bank is offering its customers.

In a preferred embodiment, dispute resolution between system entities may be regulated by the operating rules, as described in U.S. patent application Ser. No. 09/502,450, filed Feb. 11, 2000, entitled System and Method for Providing Certification-Related and other Services, which is hereby incorporated by reference.

General Description of Payment Services Products

In a preferred embodiment, the combination of payment obligation, or revocability, and documentary conditions in the present system produce several instrument types that provide a range of payment instruments to meet the credit and risk management needs of business-to-business electronic commerce. These instrument types are summarized in the table below.

TABLE 1

| | Revocable | Whose Obligation | Negotiable | Payment on Condition | Recurring |
|---|---|---|---|---|---|
| PAYMENT ORDER | | | | | |
| Payment Order | Yes | Buyer | No | No | Yes |
| PAYMENT OBLIGATION | | | | | |
| Payment Obligation | No | Buyer | Yes | No | No |
| Certified Payment Obligation | No | Bank | Yes | No | No |
| CONDITIONAL PAYMENT | | | | | |
| Conditional Payment Order7 | Yes | Buyer | No | Yes | No |
| Conditional Payment Obligation | No | Buyer | Yes | Yes | No |
| Certified Conditional Payment Obligation | No | Bank | Yes | Yes | No |

In a preferred embodiment, a payment order provides automated, on-line payment initiation to buyers and sellers conducting electronic commerce over the World Wide Web. The payment order can be credit or debit. Debit can be originated by buyer 106 (thus serving as an authorization by the buyer), or it can be a collection (originated by seller 108, without authorization by the buyer; N.B. this may not be permitted in all countries).

Credit-enhanced payment services, where buyer's bank 102 is obligated to pay seller 108, may include a certified payment obligation. The certified payment obligation is preferably an unconditional undertaking of buyer's bank 102 to pay seller 108 for goods purchased.

In a preferred embodiment, a conditional payment order is similar to the payment order described above except that buyer's bank 102 does not release payment until it has received documents from seller 108 evidencing that seller 108 has shipped the goods that are the subject of the transaction. A certified conditional payment obligation is preferably an undertaking of buyer's bank 102 to pay seller 108, conditioned on seller 108 or a third party submitting documents specified in the documentary credit to buyer's bank 102 to evidence fulfillment of contractual obligations.

The present system and method employ a plurality of request messages and response messages to implement the above-identified payment instruments. Generally, these include:

1) Request Messages:

TABLE 2

| Acronym | Description |
|---|---|
| POr Inst | Payment Order Instruction |
| POb Inst | Payment Obligation Instruction |
| CPOr Inst | Conditional Payment Order Instruction |
| CPOb Inst | Conditional Payment Obligation Instruction |
| CePOb Inst | Certified Payment Obligation Instruction |
| CeCPOb Inst | Certified Conditional Payment Obligation Instruction |
| POr Cncl | Payment Order Cancellation |
| Cnd Adv | Condition Advice |
| Sts Inq | Status Inquiry |

2) Response Messages:

TABLE 3

| Acronym | Description |
|---|---|
| Srv Ack | Service Acknowledgement to request messages |
| Pay Conf | Confirmation of a Payment Execution |
| POb Acpt Conf | Confirmation of Payment Obligation Acceptance |
| CePOb Acpt Conf | Confirmation of Certified Payment Obligation Acceptance |
| POr Cncl Conf | Confirmation of a Payment Order Cancellation |
| Cnd Update | An intermediate update in response to the condition advice message |
| Cnd Decl | Condition Declaration in response to the condition advice message |
| Sts Inq Resp | Status Inquiry Response |

It should be noted that the categorization of the above messages is general, and that a more specific categorization and functional description of these and other related messages may vary depending on how the system of the present invention is specifically implemented. A preferred implementation of system messages using Extensible Markup Language (XML) is described in detail below.

In a preferred embodiment, each message is structured to support signed additions to its contents and attachments (including one or more signatures/certificates to each addition) while preserving non-repudiation for each signing party and the final recipient. In addition, in a preferred embodiment, the system adheres to the following requirements:

1. Each request message, when received by the intended final party, returns a service acknowledgment (Srv Ack) message.

2. When a financial institution executes a payment, it sends a confirmation (Pay Conf) message of this action to the appropriate parties.

3. When a financial institution receives a payment obligation instruction, it sends a confirmation message (POb Acpt Conf) to the sender of the message indicating whether the obligation will or will not be carried out. A CePOb Acpt Conf message is preferably sent in response to payment obligation messages that are requested to be certified.

4. When a financial institution receives a payment order cancellation message (POr Cncl), it responds with a message (POr Cncl Conf) confirming that this cancellation has been accepted or rejected.

5. When a third party service provider (TPSP) entity receives a condition advice message (Cnd Adv), it responds with a response message (Cnd Decl), when the condition has been met, or when it ascertains that the condition will never be met.

6. Payment instruction messages may be signed by multiple parties at buyer 106's organization.

7. All payment messages are signed by each relaying party.

8. Buyers 106 and sellers 108 use a bank's certificate to identify themselves in a payment message (except in the circumstance where the buyer and seller have the same bank, i.e., in the case of a three, rather than four, corner transaction).

Tables describing the content of each system message are provided below. In each table, the first column identifies the name of the message portion, the second column specifies whether, in a preferred embodiment, the message portion is mandatory, optional, or conditional (i.e., whether it is mandatory depends on the circumstances), the third column identifies the entity that provides the content for the message portion, and the fourth column contains additional comments concerning the message portion.

In a preferred embodiment, a payment order instruction comprises the following data:

TABLE 4

| Name | Use | Content Provider | Comments |
| --- | --- | --- | --- |
| Version | Mandatory | Buyer | To identify the version number. |
| Buyer Creation Date | Mandatory | Buyer | |
| Buyer Creation Time | Mandatory | Buyer | |
| Buyer Reference | Optional | Buyer | Buyer instruction reference |
| Related Transaction Reference | Optional | Buyer | Reference of underlying commercial or financial transaction |
| Payment Amount | Mandatory | Buyer | |
| Payment Currency | Mandatory | Buyer | Use ISO codes |
| Transaction Type | Mandatory | Buyer | Payment Order |
| Payment Type | Optional | Buyer | This is the payment type option for a specific payment method. Examples include CTX, CCD for US ACH payments. |
| Execution Date | Mandatory | Buyer | This is the date buyer's bank is requested to execute the transaction. |
| Fees | Mandatory | Buyer | Allowable values are: All fees borne by buyer All fees borne by seller Each pays own fees |
| Buyer Identification | Mandatory | Buyer | Buyer certificate |
| Buyer's Account at Buyer's Bank | Optional | Buyer | Field used to override account data associated with buyer certificate. |
| Seller Identifier | Mandatory | Buyer | Seller certificate |
| Seller Creation Date | Mandatory | Seller | |
| Seller Creation Time | Mandatory | Seller | |
| Seller Reference | Optional | Seller | Seller instruction reference |
| Seller's Account at Seller Bank | Optional | Seller | Field used to override account data associated with seller certificate. |
| Seller's Payment Identifier | Optional | Seller | Used to identify a sub-account relationship with seller's bank for cash application (i.e., lockbox) |
| Seller's Bank 104 Creation Date | Mandatory | Seller's Bank | Must use trusted time server |
| Seller's Bank 104 Creation Time | Mandatory | Seller's Bank | Must use trusted time server |
| Seller's Bank 104 Reference | Mandatory | Seller's Bank | |
| Seller Bank Fee Amount | Conditional | Seller's Bank | Mandatory if all fees borne by buyer Fee currency is same as payment currency. |
| Seller's Bank 104 Correspondent Bank | Optional | Seller's Bank | Field used to override settlement instructions associated with relying participant certificate. Corresponds to S.W.I.F.T. field 54. |

In a preferred embodiment, a payment obligation instruction contains the data listed above for a payment order instruction with the exception of the changes listed in the table below:

TABLE 5

| Name | Use | Content Provider | Comments |
| --- | --- | --- | --- |
| Transaction Type | Mandatory | Buyer | Payment Order |
| Payment Obligation Party | Mandatory | Buyer | Allowable values are: Buyer or buyer's bank |

In a preferred embodiment, a certified payment obligation instruction contains the same data as that listed above for a payment order instruction.

In a preferred embodiment, (1) a conditional payment order instruction contains the data described above for a payment order instruction with the exception of the changes listed in the table below; (2) a conditional payment obligation instruction contains the data described above for a payment obligation instruction with the exception of the changes listed in the table below; and (3) a certified conditional payment obligation instruction contains the data described above for a certified payment obligation instruction with the exception of the changes listed in the table below:

TABLE 6

| Name | Use | Content Provider | Comments |
| --- | --- | --- | --- |
| Payment Execution Date/Term | Mandatory | Buyer | This is the date buyer's bank is requested to execute the transaction or a payment term e.g., "upon conditions met"; "30 days after conditions met". |
| Payment Conditions | Mandatory | Buyer | Fields for: TPSP Identifier; merchandise description; message details; confirmation by date; others |

In a preferred embodiment, payment conditions are selected from a collection of condition templates. In addition, each condition is preferably structured to allow an unambiguous true/false confirmation.

In a preferred embodiment, the TPSP may attach or append to the confirming message additional purchase details or electronic documents/files for information purposes which may or may not be required under the condition.

In a preferred embodiment, payment order cancellation messages (POr Cncl) may be signed by multiple parties at buyer 106's organization.

In a preferred embodiment, payment order cancellation messages contain the following data:

TABLE 7

| Name | Use | Content Provider | Comments |
| --- | --- | --- | --- |
| Buyer Reference | Optional | Buyer | Buyer instruction reference |
| Related Transaction Reference | Optional | Buyer | Reference of underlying commercial or financial transaction |
| Buyer Identification | Mandatory | Buyer | Buyer certificate |
| Payment Order Instruction Reference | Mandatory | Buyer | This is a unique identifier that relates to the specific payment order instruction that is to be canceled by this message. |

In a preferred embodiment, condition advice (Cnd Adv) messages are sent from a trusted service supplier (TSS) organization, a role which may be played by buyer's bank 102. These messages are used to set conditions which must be met in order to facilitate payment execution. In a preferred embodiment, all condition advice messages (Cnd Adv) are sent to the TPSP and the TPSP sends a service acknowledgment (Srv Ack) message in response to this message. In a preferred embodiment, the condition advice message contains the following data:

response message preferably indicates whether it is returning a positive or negative response to the received request message.

In a preferred embodiment, service acknowledgment (Srv Ack) messages are sent in response to all request messages. The following messages are all preferably responded to with service acknowledgment (Srv Ack) messages:

POr Inst (payment order instruction)
POb Inst (payment obligation instruction)
CPOr Inst (conditional payment order instruction)
CPOb Inst (conditional payment obligation instruction)
CePOb Inst (certified payment obligation instruction)
CeCPOb Inst (certified conditional payment obligation instruction)
POr Cncl (payment order cancellation)
Cnd Adv (condition advice)
Cnd Update (an intermediate update in response to the condition advice message)
Cnd Decl (condition declaration in response to the condition advice message)

In a preferred embodiment, service acknowledgment (Srv Ack) messages are sent when the syntax, signature(s), certificate(s), and user authority contained within the message are verified by the final intended recipient. This final intended recipient may vary as a function of the payment scenario. For example, in the four-corner model, the intended final recipient of payment order/obligation request messages, is buyer's bank 102. In contrast, in the direct debit model, the intended final recipient of payment order/obligation request messages, is seller's bank 104. In a preferred embodiment, service acknowledgment (Srv Ack) messages are sent in response to any received payment instruction message within one minute

TABLE 8

| Name | Use | Content Provider | Comments |
| --- | --- | --- | --- |
| Version Number | Mandatory | | To identify version number |
| TSS (Buyer's Bank) Identifier | Mandatory | TSS | Buyer's bank certificate |
| Message Creation Date | Mandatory | TSS | Must use trusted time server |
| Message Creation Time | Mandatory | TSS | Must use trusted time server |
| Payment Instruction Reference | Mandatory | From Payment Inst | To identify payment instruction reference. |
| Payment Condition Confirmation | Mandatory | From Payment Inst | Defaults when payment instruction reference entered. Fields can be structured for: Merchandise Description Message Details Confirmation Date Etc. |
| Additional Details Append Code | Optional | TSS | For use when additional file or details are to be attached for information purposes: Allowable values: Y N (Defaults to N) |
| Additional Details Area | Conditional | TSS | Mandatory if "Additional Details Append Code" is Y. Area where text can be pasted or where files can be attached. |

In a preferred embodiment, parties obtain information relating to specific transactions from other parties in the payment initiation system using status enquiry messages.

In a preferred embodiment, a response message is produced on receipt of any type of request message. Each from receipt by the final intended recipient of the payment instruction message.

In a preferred embodiment, the service acknowledgment (Srv Ack) message contains the data listed in the following table:

TABLE 9

| Name | Use | Content Provider | Comments |
|---|---|---|---|
| Version Number | Mandatory | Buyer's Bank (BB)/Seller's Bank (SB) | To identify the version number |
| Message Creation Date | Mandatory | BB/SB | Must use trusted time server |
| Message Creation Time | Mandatory | BB/SB | Must use trusted time server |
| Message Status | Mandatory | BB/SB | Allowable types: Positive Negative |
| Srv Ack Message Reference | Mandatory | BB/SB | |
| Original Request Message Reference | Conditional | Buyer/Seller | Mandatory if present in the original request message. |
| Seller Identifier | Mandatory | BB/SB | Seller certificate |
| Reason Code | Conditional | BB/SB | Mandatory if Message Status is negative acknowledgment. |
| Reason Text | Optional | BB/SB | Reason for negative Acknowledgement |

In a preferred embodiment, whenever an entity that is not the final intended recipient receives a service acknowledgment (Srv Ack) message the entity envelopes this information, adds its service acknowledgment (Srv Ack) information, and passes the message onto the final intended recipient. For example, when a seller's bank 104 receives a service acknowledgment (Srv Ack) from a buyer's bank 102 when operating in the four-corner model, it passes this service acknowledgment (Srv Ack) onto its seller 108.

In a preferred embodiment, this service acknowledgment (Srv Ack) message contains the data listed in the previous table, as well as the data listed in the following table:

TABLE 10

| Name | Use | Content Provider | Comments |
|---|---|---|---|
| Original Srv Ack Message Data | Mandatory | Seller's Bank | Original signed Srv Ack message from buyer's bank |
| From Buyer's Bank | | | enveloped within this Srv Ack message |

In a preferred embodiment, payment execution confirmation (Pay Conf) messages are sent when a financial institution has executed the payment process specified in the related payment instruction. The payment execution confirmation (Pay Conf) message is preferably sent to the appropriate recipients no later than by the end of the following business day. This payment execution confirmation (Pay Conf) message preferably contains the following data:

TABLE 11

| Name | Use | Content Provider | Comments |
|---|---|---|---|
| Version number | Mandatory | BB/SB | To identify the version number |
| Message Creation Date | Mandatory | BB/SB | Must use trusted time server |
| Message Creation Time | Mandatory | BB/SB | Must use trusted time server |
| Transaction Type | Mandatory | BB/SB | Allowable values: POr, CPOr POb, CPOb, CePOb, CeCPOb |
| Message Status | Mandatory | BB/SB | Allowable values: Positive Negative |
| Pay Conf Message Reference | Mandatory | BB/SB | Reference for this message |
| Payment Instruction Reference | Conditional | BB/SB | Mandatory, if present in the original payment instruction message. |
| Seller Identifier | Mandatory | BB/SB | Seller certificate |
| Effective Date | Conditional | BB/SB | Mandatory for a positive Message Status. (This is the date that the bank has originated the payment) |
| Reason Code | Conditional | BB/SB | Mandatory if Message Status is negative. |
| Reason Text | Conditional | BB/SB | Reason for negative Message Status |
| Bank's Holder Registry Transfer Fee Amount | Conditional | BB/SB | Mandatory for a positive Message Status. Fee currency is the same as payment currency. |

In a preferred embodiment, when an entity receives a payment execution confirmation (Pay Conf) message, the entity envelopes this information, adds its payment execution confirmation (Pay Conf) information, and passes the message onto the final intended recipient. For example, when a seller's bank 104 receives a payment execution confirmation (Pay Conf) from buyer's bank 102 when operating in the four-corner model, it passes this payment execution confirmation (Pay Conf) message onto seller 108.

In a preferred embodiment, this payment execution confirmation (Pay Conf) message contains the data listed in the above table as well as the following data:

TABLE 12

| Name | Use | Content Provider | Comments |
| --- | --- | --- | --- |
| Original Pay Conf | Mandatory | Seller's Bank | Original signed Pay Conf message from buyer's bank enveloped within |
| Message Data from Buyer's Bank | | | its (seller's bank) Pay Conf message |

In a preferred embodiment, payment obligation acceptance confirmation (POb Acpt Conf) messages are sent in response to a payment obligation request message by the close of the following working day. The payment obligation acceptance confirmation (POb Acpt Conf) message preferably contains the data listed below:

TABLE 13

| Name | Use | Content Provider | Comments |
| --- | --- | --- | --- |
| Version Number | Mandatory | BB/SB | To identify the version number |
| Message Creation Date | Mandatory | BB/SB | Must use trusted time server |
| Message Creation Time | Mandatory | BB/SB | Must use trusted time server |
| Message Status | Mandatory | BB/SB | Allowable types: Positive Negative |
| POb Acpt Conf Message Reference | Mandatory | BB/SB | |
| Original Payment Obligation (POb) Message Reference | Conditional | Buyer/ Seller | Mandatory if present in the original request message. |
| Seller Identifier | Mandatory | BB/SB | Seller certificate |
| Reason Code | Conditional | BB/SB | Mandatory if Message Status is negative acknowledgment. |
| Reason Text | Optional | BB/SB | Reason for negative acknowledgment |

In a preferred embodiment, when an entity that is not the final intended recipient receives a payment obligation acceptance confirmation (POb Acpt Conf) message, the entity envelopes this information, adds its payment obligation acceptance confirmation (POb Acpt Conf) information, and passes the message onto the final intended recipient. For example, when a seller's bank 104 receives a payment obligation acceptance confirmation (POb Acpt Conf) from buyer's bank 102 when operating in the four-corner model, it passes this payment obligation acceptance confirmation (POb Acpt Conf) to its seller 108. This payment obligation acceptance confirmation (POb Acpt Conf) message preferably contains the data listed in the above table as well as the following data:

TABLE 14

| Name | Use | Content Provider | Comments |
| --- | --- | --- | --- |
| Original POb Acpt Conf Message Data from Buyer's Bank | Mandatory | Seller's Bank | Original signed Pay Conf message from buyer's bank enveloped within its (seller's bank) Pay Conf message |

In a preferred embodiment, certified payment obligation acceptance confirmation (CePOb Acpt Conf) messages are sent in response to a certified payment obligation request message by the close of the following working day. The certified payment obligation acceptance confirmation (CePOb Acpt Conf) message preferably contains the data in Table 13.

In a preferred embodiment, payment order cancellation confirmation (POr Cncl Conf) messages are sent in response to a payment order cancellation instruction message (POr Cncl Inst), by the close of the following working day. The payment order cancellation confirmation (POr Cncl Conf) message preferably contains the following data:

TABLE 15

| Name | Use | Content Provider | Comments |
| --- | --- | --- | --- |
| Version Number | Mandatory | Buyer's Bank/Seller's Bank | To identify the version |
| Message Creation Date | Mandatory | Buyer's Bank/Seller's Bank | Must use trusted time server |
| Message Creation Time | Mandatory | Buyer's Bank/Seller's Bank | Must use trusted time server |
| Message Status | Mandatory | Buyer's Bank/Seller's Bank | Allowable types: Positive Negative |
| POb Acpt Conf Message Reference | Mandatory | Buyer's Bank/Seller's Bank | |
| Original Payment Obligation (POb) Message Reference | Conditional | Buyer/Seller | Mandatory if present in the original request message. |
| Seller Identifier | Mandatory | Buyer's Bank/Seller's Bank | Seller certificate |
| Reason Code | Conditional | Buyer's Bank/Seller's Bank | Mandatory if Message Status is negative acknowledgement. |
| Reason Text | Optional | Buyer's Bank/Seller's Bank | Reason for positive/negative acknowledgement |

In a preferred embodiment, condition update (Cnd Update) messages may be sent in conjunction with condition advice messages. These messages are preferably sent from TPSP parties to provide updates on the progress that has been made in meeting the condition specified by the condition advice message.

In a preferred embodiment, condition declaration (Cnd Decl) messages are sent in response to a condition advice message by TPSP parties. Condition declaration (Cnd Decl) messages are preferably sent when either a condition outlined by an original condition advice (Cnd Adv) message has been met, or if the condition will never be met. For example, if a condition is that some goods will be shipped by a specific date, and the goods have yet to be shipped, and that specified date has passed, a negative response is sent.

The condition declaration (Cnd Decl) message preferably contains the following data:

TABLE 16

| Name | Use | Content Provider | Comments |
| --- | --- | --- | --- |
| Version Number | Mandatory | | To identify version number |
| TPSP Identifier | Mandatory | TPSP | TPSP certificate |
| Message Creation Date | Mandatory | TPSP | Must use trusted time server |
| Message Creation Time | Mandatory | TPSP | Must use trusted time server |
| Payment Instruction Reference | Mandatory | From Payment Inst. | To identify payment instruction reference. |
| TSS Condition Declaration Request Message Reference | Mandatory | TSS | From the original condition declaration request message. |

TABLE 16-continued

| Name | Use | Content Provider | Comments |
| --- | --- | --- | --- |
| Payment Condition Confirmation | Mandatory | From Payment Inst | Defaults when Payment Instruction reference entered. Fields can be structured for: Merchandise Description Message Details Confirmation Date Etc. |
| Condition Confirmation Code | Conditional | TPSP | Code that represents the status of this condition declaration response message: If this field is not included then the "Condition Confirmation Details" field must contain information. |
| Condition Confirmation Details | Conditional | TPSP | Descriptions of the possible responses that the TPSP can respond with. If this field is not included then the "Condition Confirmation Code" field must contain information. |
| Additional Details Append Code | Optional | TPSP | For use when additional file or details are to be attached for information purposes: Allowable values: Y N (Defaults to N) |
| Additional Details Area | Conditional | TPSP | Mandatory if "Additional Details Append Code" is Y. Area where text can be pasted or where files can be attached. |

In a preferred embodiment, a status inquiry response message (Sts Inq Resp) contains a history of the transaction specified in the status inquiry request.

Communication Protocols

In a preferred embodiment, the following protocols and formats are used in signing and formatting signed data:
1. XMLDSig (XML-Signature Syntax and Processing)— used for transaction coordinator and Merchant signing and formatting;
2. PKCS#7—used for browser based signing of data elements;
3. S/MIMEv3 (Secure/Multipurpose Internet Mail Extensions version 3)—used for asynchronous communication between parties; and
4. SSLv3(Secure Socket Layer version 3.0) or TLSv1.0 (Transport Layer Security version 1.0)—used for synchronous messages.

More particularly, the following rules preferably set out the formats for exchanges and signatures between payment parties in a transaction using the system and method of the present invention:

All synchronous exchanges preferably take place using the HTTP secured SSLv3.0 or the TLSv1.0 Internet security protocol in accordance with the system rules described below.

End Users may have no more sophisticated systems than browsers and mail clients that can sign in accepted formats. For example, the documents that are sent to buyer 106 and TPSP for acceptance may fall into this category. The browser is assumed to provide a PKCS#7 wrapped message. PKCS #7 is a cryptographic message syntax standard that describes general syntax for data that may have cryptography applied to it, such as digital signatures. The data that buyer 106 signs is indicated in the appropriate blocks, as indicated below.

The standard system XML messaging described below is preferably used to communicate between parties, and so the seller 108, seller's bank 104, and buyer's bank 102 should be capable of creating and receiving such messages.

Where buyer 106 and the TPSP also have server based systems that support the system messaging of the present invention, the banks or participants may use the XML DTDs provided below to support those organizations.

Preferably all acknowledgements are encrypted using the S/MIMEv3 protocol. Where the acknowledgement is being sent to a buyer or TPSP with no known server support, the signature is part of the S/MIME standard and not the XMLDSig signature described below.

Optionally, for ease of implementation, all asynchronous communications to buyers and to TPSPs may be sent as S/MIMEv3 messages with the signature of the financial institution issuing the asynchronous communication as part of the S/MIME standard.

Asynchronous communications, however wrapped, preferably include the NIB (Network Information Block) application block and Response from the XML messaging described below, but not necessarily the CertBundle or Signature blocks where these are replicated in the asynchronous wrapping structure.

Although, a system response message may be defined for TPSP to TSS communication, TPSP's may discharge conditions through a web interface. In the latter case, the TPSP will sign a message using a PKCS#7 signature to discharge the conditions.

Data Type Definitions

In a preferred embodiment, system messages are structured using Extensible Markup Language (XML) with corresponding date type definitions whenever appropriate, in order not to restrict technical implementation and integration options. A preferred implementation of several data type definitions (DTDs) is described below.

The system requires that all payment specific messages be uniquely distinguishable as payment messages and also that message identifiers (tags) are non-ambiguously defined. With XML documents, the system of the present invention preferably meets these requirements by using XML Namespaces. XML namespaces provide a simple means for qualifying element and attribute names used in XML documents by associating them with namespaces identified by URI (Uniform Resource Identifier) references. Each payment top level XML document specifies the XML namespace in which the data elements occur. The XML document may, for example, reference the namespace as described in Table 17 as follows:

TABLE 17

| Payment Document Outline | Meaning |
| --- | --- |
| <?xml version="1.0" encoding="UTF-8"?> | Standard XML header |
| <!DOCTYPE PaymentRequest PUBLIC "-//EP/DTD Payment Request//EN" "[URI]"> | Standard XML internal DTD with reference to external DTD comprising (a) XML public identifier and (b) URI defining location of DTD |
| <PaymentRequest xmlns=http://www.eleanorpayments.org/ep/> | xmlns [namespace] defines the location of the external DTD. |
| ... | Body of message |
| </PaymentRequest> | End of Message |

Payment Request DTD

The contents of the PaymentRequest DTD (Document Type Definition) in a preferred embodiment are given in Table 18 below (the PaymentRequest DTD may also import certain DTDs such as a ConditionSet and a CertificateStatusCheck, described below):

TABLE 18

| NIB | Network Information Block |
| --- | --- |
| Signature | XMLDSig Signature Block |
| CertBundle | Certificate Bundle Block |
| SystemPayRequest | Payment Request Transaction Block (see Table 19) |
| Request | (Optional Block) |

The system specifies a "Msggrpid" and a "MsgID" attribute in the NIB (Network Information Block) and requires that the value of this is specified to be unique for each message in the transaction. The Msggrpid is a unique ID that is common to all documents in any single exchange. Note that a number of exchanges may concern a single payment transaction. Each exchange (for instance the Payment Request—Service Acknowledgement exchange, or the Cancellation Request—Service Acknowledgement exchange) will have the same Msggrpid. Asynchronous communications are to be treated as atomic exchanges. The Msgid is used as a sequential counter for each document in an exchange. However, as exchanges may become complex, to ensure that the Msggrpid:Msgid combination can uniquely identify a document within an exchange, the role of the sender is preferably used in conjunction with a sequence number.

A preferred structure of the Msgid is: "xx:nn", where xx are the role identifiers and nn the sequence number for documents sent by that role in the current exchange. To enable a transaction coordinator to identify a system payment message, the HTTP content type should be specified appropriately.

The SystemPayRequest document may be used to specify the payment instruction messages described above and listed in Table 2, i.e. POr Inst, POb Inst, CPOr Inst, CPOb Inst, CePOB Inst, and CeCPOb Inst. The SystemPayRequest DTD in a preferred embodiment is described in Table 19 below:

TABLE 19

| Contains | Relationship Description |
| --- | --- |
| SystemHeader | Each request contains a single System Header which contains the Product and Message Type. |
| BuyerSignedData | The data signed by the buyer is contained in a single structure in the PayRequest. |
| BuyerSignatures | The BuyerSignatures block carries one or a number of BuyerSignature from the buyer to the buyer's bank. |
| SellerPrivateData | SellerPrivateData contains data elements provided exclusively by the Seller but only sent to the seller's bank. This may include requests for additional services. |
| SellerBankData | SellerBankData block contains data elements provided by the seller's bank to the buyer's bank. These include confirmed seller Account details and relevant correspondent bank details. |

The SystemHeader provides a unique transaction reference for all transactions, and with the Product attribute allows a specific payment product instruction message to be specified. The header is a component common to all messages and includes, in a preferred embodiment, the following attributes (Table 20):

TABLE 20

| Attribute | Type | Presence | Description | Provided By |
| --- | --- | --- | --- | --- |
| Product | CDATA | #REQUIRED | xxP - Payment Order<br>xxD - Direct Debit Instruction<br>xxO - Payment Obligation<br>xCO - Certified Payment Obligation<br>CxP - Conditional Payment Order<br>CxO - Conditional Payment Obligation<br>CCO - Certified Conditional Payment Obligation | Requestor. |

TABLE 20-continued

| Attribute | Type | Presence | Description | Provided By |
|---|---|---|---|---|
| MessageType | NOTATION | #REQUIRED | the message type may have the following structures:<br><Type> Request<br><Type> Response<br>Query<br>The Valid values for the PayRequest DTD are<br>Payment Request<br>Query | Requestor. |

In a preferred embodiment, the following validation rules in Table 21 apply to the SystemHeader attributes:

TABLE 21

| Attribute | Validation Rule | Must Validate | May Validate | Error Code |
|---|---|---|---|---|
| Product | Valid Product code and message type has been provided | Buyer's Bank | Seller's Bank | 00EH01 |
|  | The originator is authorized to issue the message. | Buyer's Bank; Seller's Bank |  | 00EH02 |
| MessageType | Valid message type has been provided | Buyer's Bank |  | 00EH03 |

The BuyerSignedData DTD of the SystemPayRequest DTD includes in a preferred embodiment the following data blocks (Table 22):

TABLE 22

| Contains | Relationship Description |
|---|---|
| NegotiatedData | Contains data negotiated between the buyer and seller as part of the commercial transaction. |
| BuyerData | Contains data provided by the buyer. |
| SellerPublicData | Contains data provided by the seller and revealed to the buyer and the buyer's bank. |
| Obligation | Contains data relevant to the provision of an obligation. |
| ConditionSet | Contains any conditions which are to attach to the Payment Request. |
| BuyerSignatureDetails | Contains information about the buyer's signature(s) attached to the Payment Request. |

The NegotiatedData block carries data elements negotiated during the transaction and preferably has the following attributes (Table 23):

TABLE 23

| Attribute | Type | Presence | Description | Provided By |
|---|---|---|---|---|
| Amt | CDATA | #REQUIRED | The Amount of the Transaction. | Negotiated |
| CurCode | CDATA | #REQUIRED | The CurCode is the three letter currency code as defined in ISO 4217 | Negotiated |
| ValueDate | CDATA | #IMPLIED | The ValueDate is the date on which the funds will be in the Seller's account. | Negotiated |
| ValueTerm | CDATA | #IMPLIED | The ValueTerm is provided only for conditional payments. The ValueTerm field contains the number of days after discharge of conditions on which funds will be in the Seller's Account. If a ValueTerm is provided, a ValueDate should not be provided. | Negotiated |
| Fees | NOTATION | #IMPLIED | The fees field contains an indication of which organisation will be liable for fees associated with the transaction. If the field is not present, the fees are assumed to be borne by the buyer. Valid values are BUYER or SELLER. | Negotiated |
| RecurringPaymentDuration | CDATA | #IMPLIED | available for the Payment Order product only. Contains an indication of the duration for a recurring payment. | Negotiated |

TABLE 23-continued

| Attribute | Type | Presence | Description | Provided By |
|---|---|---|---|---|
| RecurringPaymentModel | CDATA | #IMPLIED | available for the Payment Order product only. Contains a code string that describes the recurring payment model that has been agreed. | Negotiated |

The following validation rules in Table 24 preferably apply to the NegotiatedData attributes:

TABLE 24

| Attribute | Validation Rule | Must Validate | May Validate | Error Code |
|---|---|---|---|---|
| Amt | The amount does not contain a zero, negative or non numeric value | Buyer's Bank | | 00ND01 |
| | Amount does not exceed maximum for Payment Channel | | | 00ND02 |
| | Amount does not exceed buyer's Limit | | | 00ND03 |
| | Amount format valid for stated currency | | | 00ND04 |
| CurCode | CurCode is valid | Buyer's Bank | | 00ND05 |
| | CurCode is supported by the institution | | | 00ND06 |
| ValueDate | Value Date is an valid format | Buyer's Bank | Seller's Bank | 00ND07 |
| | Value Date is not in the past | Buyer's Bank | Seller's Bank | 00ND08 |
| | Value Date can be met | Buyer's Bank | — | 00ND09 |
| | Value Date is within XX days of current working date (where XX is the maximum number of days that an institution will allow instructions in the future). | Buyer's Bank | — | 00ND10 |
| ValueTerm | The Value Term provided falls inside the parameters allowed by the financial institution. | Buyer's Bank | | 00ND11 |
| Fees | Correct value provided. | Buyer's Bank, Seller's Bank | | 00ND12 |
| RecurringPaymentDuration | Valid Payment Duration Provided | Buyer's Bank (Seller's Bank for Direct Debit) | | 00ND13 |
| RecurringPaymentModel | Valid Payment Model Provided | Buyer's Bank (Seller's Bank for Direct Debit) | | 00ND14 |

The BuyerData block (in the BuyerSignedData DTD) contains information provided by buyer 106 in the transaction and carries data elements negotiated during the transaction. The BuyerData block preferably contains contact data (e.g., in a contact sub-block) that provides details for any issues with the transaction. The BuyerData block has the following attributes in a preferred embodiment (Table 25):

TABLE 25

| Attribute | Type | Presence | Description | Provided By |
|---|---|---|---|---|
| BuyerReference | CDATA | #IMPLIED | The buyer can provide a reference which is used in each of the messages and acknowledgements that comprise the transaction. | Buyer |
| BuyerRelatedTransactionReference | CDATA | #IMPLIED | The buyer can further provide a related TransactionReference which can be used by internal systems to identify the transaction. | Buyer |
| BuyerAccount | CDATA | #IMPLIED | The Buyer account is identified as a single string - which will identify the institution and the account itself. It is recommended (but not required) that institutions look to use IBAN numbers for system payments. | Buyer |
| BuyerInstruction | CDATA | #IMPLIED | The BuyerInstruction field allows the buyer to include additional instructions to the buyer's bank for execution of the payment instruction. | Buyer |
| Priority | NOTATION | #IMPLIED | The Priority field is used to override standing instructions between the buyer and the buyer's bank as to how the transaction is settled. If the priority flag is not provided in the document then the standing arrangement is assumed. Valid values are "URGENT" and "STANDARD". Interpretation should be agreed between buyer and buyer's bank. | Buyer |
| FXContract | CDATA | #IMPLIED | The FX Contract field allows the buyer to provide a reference to the FX Contract against which the payment will be made. | Buyer |

The following validation rules in Table 26 preferably apply to the BuyerData attributes:

TABLE 26

| Attribute | Validation Rule | Must Validate | May Validate | Error Code |
|---|---|---|---|---|
| BuyerReference | BuyerReference does not exceed allowed length for field. | Buyer's Bank | | 00BB01 |
| BuyerRelatedTransactionReference | BuyerReference does not exceed allowed length for field. | Buyer's Bank | | 00BB02 |
| BuyerAccount | BuyerAccount is a valid string | Buyer's Bank | | 00BB03 |
| | BuyerAccount provided is assigned to certificate presented | Buyer's Bank | | 00BB04 |
| | Bank Identifier is recognized | Buyer's Bank | | 00BB05 |
| | Bank Identifier is provided | Buyer's Bank | | 00BB06 |
| BuyerInstruction | BuyerInstruction exceeds allowed length for field. | Buyer's Bank | | 00BB07 |
| Priority | Invalid format | Buyer's Bank | | 00BB08 |

TABLE 26-continued

| Attribute | Validation Rule | Must Validate | May Validate | Error Code |
|---|---|---|---|---|
| FXContract | Valid format | Buyer's Bank | | 00BB09 |
| | FX Contract has not expired | | | 00BB10 |

The SellerPublicData block (in the BuyerSignedData DTD) contains information provided by the seller 108 in the transaction and preferably contains contact details for any issues that arise with respect to the transaction. The SellerPublicData block, in a preferred embodiment, has the following attributes, listed in Table 27:

TABLE 27

| Attribute | Type | Presence | Description | Provided By |
|---|---|---|---|---|
| TransactionReference | CDATA | #REQUIRED | Unique reference generated by the seller in the four corner and direct debit models and by the buyer's bank in the buyer's bank model. Note that cancellations and status inquiries retain the TransactionReference of the original instruction. The buyer signs this and this prevents replay attacks of the Buyer signed data. Buyer's bank must check the uniqueness of the TransactionReference provided to prevent these attacks. DATE + SEQNO is the recommended format. | Seller in four corner model; Buyer's bank in buyer to buyer's bank model |
| SellerReference | CDATA | #IMPLIED | The seller can provide a reference for the transaction | Seller in Four Corner Model; Buyer in Buyer to Buyer Bank model |
| SellerAccount | CDATA | #IMPLIED | In a buyer to buyer's bank transaction, | Seller in four corner model; Buyer in Buyer to Buyer's Bank model |
| SellerRelatedTransactionReference | CDATA | #IMPLIED | Contains a reference provided by the seller to a related transaction for reconciliation purposes within the seller's systems. | Seller in four corner model; Buyer in Buyer to Buyer's Bank model |
| PaymentDetails | CDATA | #IMPLIED | The PaymentDetails field provides a text description of the Transaction between the buyer and the seller (typically the product description from the Seller's Catalogue)/ | Seller in four corner model Buyer in Buyer to Buyer Bank model |
| DebitSchemeIdentifier | CDATA | #IMPLIED | The DebitSchemeIdentifier identifies the Direct Debit in direct debit transactions. | |

The following validation rules in Table 28 preferably apply to the SellerPublicData attributes:

TABLE 28

| Attribute | Validation Rule | Must Validate | May Validate | Error Code |
|---|---|---|---|---|
| SellerReference | Does not exceed maximum length | Buyer's Bank | Seller's Bank | 00SP01 |
| SellerAccount | SellerAccount is a valid string | Seller's Bank | Buyer's Bank | 00SP02 |
| | SellerAccount provided is assigned to certificate presented | Seller's Bank | Buyer's Bank | 00SP03 |
| | Bank Identifier is recognized | Seller's Bank | Buyer's Bank | 00SP04 |
| | Bank Identifier is provided | Seller's Bank | Buyer's Bank | 00SP05 |
| SellerRelatedTransactionReference | Does not exceed maximum length | Seller's Bank | | 00SP06 |
| PaymentDetails | Does not exceed maximum length | Seller's Bank | | 00SP07 |
| DirectDebitSchemeIdentifier | Is a valid Identifier | Seller's Bank | | 00SP08 |

The Obligation block (in the BuyerSignedData DTD) contains details of any obligation to be put in place as a result of the transaction. Note that if no obligation is to be undertaken, the block is included with ObligationType set to NONE. The Obligation block has the following attributes in a preferred embodiment (Table 29):

TABLE 29

| Attribute | Type | Presence | Description | Provided By |
|---|---|---|---|---|
| ObligationType | NOTATION | #REQUIRED | Valid values are NONE, BUYER or BANK. BUYER signifies a Payment Obligation. BANK signifies a Certified Payment Obligation is being requested. | Buyer in Buyer to Buyer Bank Model |
| ObligationEffectiveDate | CDATA | #IMPLIED | The date on which the obligation is to come into effect. This is assumed to be immediately if the ObligationEffective Date is not included in the Obligation block. | Buyer in Buyer to Buyer's Bank Model |

The following validation rules preferably apply to the Obligation block attributes (Table 30):

TABLE 30

| Attribute | Rule Reference | Validation Rule | Must Validate | May Validate |
|---|---|---|---|---|
| ObligationType | 00OB01 | The value provided is valid. | | |
| | 00OB02 | The NegotiatedData does not include recurring payment (Obligations preferably cannot be undertaken for recurring payments) | Buyer's Bank | Seller's Bank |

TABLE 30-continued

| Attribute | Rule Reference | Validation Rule | Must Validate | May Validate |
|---|---|---|---|---|
| ObligationEffectiveDate | 00OB03 | The date is not in the past. | Buyer's Bank | Seller's Bank |
| | 00OB04 | The date is on or after the ValueDate. | Buyer's Bank | Seller's Bank |
| | 00OB05 | Date Format is Valid | | |

The ConditionSet block (in the BuyerSignedData DTD) contains a description of the conditions that attach to a payment (this block corresponds to the Cnd Adv request message described above and listed in Table 2). The ConditionSet block is an imported element and used in a number of the Payment blocks in the system, as described elsewhere.

The BuyersSignatureDetails block (in the BuyerSignedData DTD) contains signatures created by actors in the buying organization. Approval cycles may require a number of signatures to be provided against any given instruction, as described in more detail below. The BuyersSignatureDetails block can contain one or more BuyerSignatureDetail blocks. A BuyerSignatureDetail block contains the information about a signature created by buyer 106, preferably as in Table 31 as follows:

TABLE 31

| Attribute | Type | Presence | Description | Provided By |
|---|---|---|---|---|
| Sequence | NMTOKEN | #REQUIRED | The sequence number of the signature within the transaction. The sequence starts at 1 and increases for each subsequent signature included in the BuyerSignatures Block. | Buyer System or Other System Supporting Dual Signatures |
| ReasonForSignature | CDATA | #IMPLIED | A text description of the reason for signature. | Buyer |
| SignedPreviousSignature | NOTATION | #IMPLIED | Indicates whether additional signatures have signed over BuyerSignature elements with lower sequence numbers. If not present, value is assumed to be false (by default) | Buyer |
| TimeStamp | CDATA | #IMPLIED | Reflects time signature made | Buyer |

The following validation rules preferably apply to the BuyersSignatureDetails attributes (Table 32):

TABLE 32

| Attribute | Validation Rule | Must Validate | May Validate | Error Code |
|---|---|---|---|---|
| Sequence | Format is valid | Buyer's Bank | | 00BE01 |
| | The sequence is incremental across BuyerSignature blocks in the BuyerSignatures entity | Buyer's Bank | | 00BE02 |
| ReasonForSignature | Format is valid | | Buyer's Bank | 00BE03 |
| SignedPreviousSignature | Format is valid | Buyer's Bank | | 00BE04 |

The SystemPayRequest DTD also includes a BuyersSignatures block that contains the signatures created by actors in the buying organization. Approval cycles may require a number of signatures to be provided against any given instruction. In a preferred embodiment, the BuyersSignatures block includes the following block in Table 33:

TABLE 33

| Contains | Relationship Description |
|---|---|
| PCDATA | The signature is included in the BuyerSignature element as PCDATA. Note that this element holds only the signature and not the entire PKCS#7 structure. |

The following validation rules, in Table 34, preferably apply to the BuyersSignature block:

TABLE 34

| Attribute | Validation Rule | Must Validate | May Validate | Error Code |
|---|---|---|---|---|
| Signature (as PCDATA) | The Buyer's Signature is invalid. | Buyer's Bank | | |
| | The Buyer's Signatures do not have the prerequisite level of authority. | Buyer's Bank | | |

The BuyersSignature block also preferably contains the following attribute in Table 35:

TABLE 35

| Attribute | Type | Presence | Description | Provided By |
|---|---|---|---|---|
| Sequence | NMTOKEN | #REQUIRED | The sequence number of the signature within the transaction. The sequence starts at 1 and increases for each subsequent signature included in the BuyerSignatures block. | Buyer System or Other System Supporting Dual Signatures |

The validation rules in Table 36 apply to the Sequence attribute in a preferred embodiment:

TABLE 36

| Attribute | Validation Rule | Must Validate | May Validate | Error Code |
|---|---|---|---|---|
| Sequence | Format is valid | Buyer's Bank | | |
| | The sequence is incremental across BuyerSignature blocks in the BuyerSignatures entity | Buyer's Bank | | |

The SellerPrivateData block of the SystemPayRequest DTD contains private data that is passed from seller 108 to seller's bank 104. The SellerPrivateData block is removed by seller's bank 104 and not included in the datablocks passed to buyer's bank 102. It contains the following attributes in a preferred embodiment (Table 37):

TABLE 37

| Attribute | Type | Presence | Description | Provided By |
|---|---|---|---|---|
| SellerAccount | CDATA | #IMPLIED | The seller's account details can be carried in the SellerPublicData or SellerPrivateData blocks or appended to the payment instruction by the seller's bank in the SellerBankData block. Preferably, financial institutions use IBAN numbers to identify bank and accounts. | Only the seller can provide the SellerAccount in this field. |
| SellerInstruction | CDATA | #IMPLIED | A private instruction that can be provided by the seller to the seller's bank for processing. | Seller |

The following validation rules in Table 38 preferably apply to the SellerPrivateData attributes:

TABLE 38

| Attribute | Rule Reference | Validation Rule | Must Validate | May Validate |
|---|---|---|---|---|
| SellerAccount | 00SD01 | SellerAccount is an invalid string | Seller's Bank | |
| | 00SD02 | SellerAccount provided is not assigned to certificate presented | Seller's Bank | |

TABLE 38-continued

| Attribute | Rule Reference | Validation Rule | Must Validate | May Validate |
|---|---|---|---|---|
| | 00SD03 | Bank Identifier not recognized | Seller's Bank | |
| | 00SD04 | Bank Identifier not provided | Seller's Bank | |
| SellerInstruction | 00SD05 | Format is valid | Seller's Bank | |

The SellerBankData block of the SystemPayRequest DTD carries information from seller's bank 104 to buyers bank 102 in the transaction. Seller's bank 104 can provide relevant contact details in the contact block (described below) if required. In a preferred embodiment, the SellerBankData block contains the attributes in Table 39:

TABLE 39

| Attribute | Type | Presence | Description | Provided By |
|---|---|---|---|---|
| SellerBankReference | CDATA | #REQUIRED | The seller's bank must provide a unique reference for the Transaction. | Seller's Bank |
| SellerCorrespondentBank | CDATA | #REQUIRED | The seller's bank must provide a correct correspondent banking relationship based on the currency of the transaction. | Seller's Bank |
| SellerAccount | CDATA | #REQUIRED | The Seller's Bank must attach the correct account details for the transaction to the document in this field. This is the field used by the buyer's bank in the four corner model. | Seller's Bank |
| SellerBankUndertaking | CDATA | #REQUIRED | A text string reserved for representations that the seller's bank will make to the buyer's bank. One example would be that the seller has assented to the cancellation of an "irrevocable" obligation to pay. | Seller's Bank |
| SellerBankFeeAmt | CDATA | #REQUIRED | Mandatory if all fees are borne by the buyer. Note that the currency is the same as the currency of the payment. | Seller's Bank |

The following validation rules preferably apply to the SellerBankData attributes (Table 40):

TABLE 40

| Attribute | Validation Rule | Must Validate | May Validate | Error Code |
|---|---|---|---|---|
| SellerBankReference | Format is Valid | Buyer's Bank | | 00SB01 |
| SellerCorrespondentBank | Format is a Valid SWIFT BIC | Buyer's Bank | | 00SB02 |
| SellerAccount | SellerAccount is a valid string | Buyer's Bank | | 00SB03 |
| | Bank Identifier is recognized | Buyer's Bank | | 00SB04 |
| | Bank Identifier is provided | Buyer's Bank | | 00SB05 |
| SellerBankUndertaking | Format is Valid | Buyer's Bank | | 00SB06 |
| SellerBankFeeAmt | The fee is a valid amount. | Buyer's Bank | | 00SB07 |

Payment Response

The contents of the PaymentResponse DTD, in a preferred embodiment, are given in Table 41 below (the PaymentResponse DTD may also import certain DTDs such as a CertificateStatusCheck and a Contact element):

TABLE 41

| | |
|---|---|
| NIB | Network Information Block |
| Signature | XMLDSig Signature Block |
| CertBundle | Certificate Bundle Block |
| SystemPayResponse | Payment Response Block (see Table 42) |
| Response | Response block must be included with any response containing signed certificate of the organization making the response. |

The SystemPayResponse DTD, in a preferred embodiment, is described in Table 42 below.

TABLE 42

| Contains | Relationship Description |
|---|---|
| SystemHeader | Each request contains a single system header which contains the product and message type for the document. |
| References | The References block contains the references being used by the various parties in the commercial transaction. The reference block includes the TransactionReference. |
| ChallengeAck | The ChallengeAck contains the positive or negative response to a PayChallenge. |

TABLE 42-continued

| Contains | Relationship Description |
| --- | --- |
| ServiceAck | The ServiceAck contains a negative or positive response based on the validation of the signing certificate, any carried certificate, the authority attached to that certificate and the validation of the syntax of the message against the DTD. |
| PayInstAck | The PayInstAck contains a positive or negative response if transaction details pass/fail validation prior to submission to the clearing and settlement network. |
| ObligationConf | ObligationConf contains a positive or negative acknowledgement to a request to create a payment obligation, whether bank certified or an obligation by a buyer. |
| PayConf | PayConf contains a positive or negative response based on the successful execution of the payment instruction. The PayConf block can be used (a) by the buyer's bank to inform the buyer and the seller's bank of the success or failure of the transaction execution (b) the buyer's bank to inform the buyer and the seller's bank of failures notified by the clearing and settlement and (c) the seller's bank to inform the seller that the payment has completed. |
| ConditionSetUpConf | The ConditionSetUpConf contains a positive or negative response to a request to place conditions on a payment transaction. |
| CancellationConf | The CancellationConf contains a positive or negative response to a request to cancel a transaction. |
| RelatedAcknowledgement | The RelatedAcknowledgement block is used to carry acknowledgements from other organizations involved in the commercial transaction. |

As indicated, the SystemHeader provides a unique transaction reference for all transactions and is a component common to all messages. The attributes of the SystemHeader are given in Table 20 and the associated validation rules in Table 21 in a preferred embodiment.

The References DTD of the SystemPayResponse DTD preferably includes the following attributes (Table 43):

TABLE 43

| Attribute | Type | Presence | Description | Provided By |
| --- | --- | --- | --- | --- |
| TransactionReference | CDATA | #REQUIRED | Unique system reference generated by the seller in the four corner and direct debit models and by the buyer's bank in the buyer's bank model. Note that cancellations and status inquiries retain the Transaction-Reference of the original payment instruction. | From Original Request |
| BuyerBankReference | CDATA | #IMPLIED | The reference provided by the buyer's bank. It is preferable that the buyer's bank uses the seller bank | Buyer's Bank |
| SellerBankReference | CDATA | #IMPLIED | Must be provided in all four corner and direct debit acknowledgements. Not available in the buyer to buyer bank model. | From Original Request |
| BuyerReference | CDATA | #IMPLIED | The reference provided by the buyer in the original request. | From Original Request |
| SellerReference | CDATA | #IMPLIED | The reference provided by the seller in the original request. | From Original Request |

TABLE 43-continued

| Attribute | Type | Presence | Description | Provided By |
|---|---|---|---|---|
| BuyerRelatedTransactionReference | CDATA | #IMPLIED | The reference to a related transaction provided by the Buyer in the original request. | From Original Request |
| SellerRelatedTransactionReference | CDATA | #IMPLIED | The reference to a related transaction provided by the Seller in the original request. | From Original Request |

The following validation rules, in Table 44, preferably apply to the References attributes:

TABLE 44

| Attribute | Validation Rule | Must Validate | May Validate | Error Code |
|---|---|---|---|---|
| TransactionReference | The Transaction Reference can be reconciled. | | | 00RE01 |
| BuyerBankReference | The BuyerBank Reference can be reconciled. | | | 00RE02 |
| SellerBankReference | The SellerBank Reference can be reconciled. | | | 00RE03 |
| BuyerReference | The BuyerReference can be reconciled | | | 00RE04 |
| SellerReference | The SellerReference can be reconciled | | | 00RE05 |
| BuyerRelatedTransactionReference | The BuyerRelatedTransactionReference can be reconciled | | | 00RE06 |
| SellerRelatedTransactionReference | The SellerRelatedTransactionReference can be reconciled | | | 00RE07 |

The ChallengeAck DTD is returned in response to a ChallengeRequest. The ChallengeRequest is optionally used by institutions to validate the identity of a corresponding institution before passing payment details to that institution. The ChallengeAck is successful if the acknowledging institution (a) can positively authenticate the identity of the sender and (b) supports the product being requested. contact information can be included by the responding financial institution within the ChallengeAck. ChallengeAck, in a preferred embodiment, includes the following attributes (Table 45):

TABLE 45

| Attribute | Type | Presence | Description |
|---|---|---|---|
| Status | CDATA | #REQUIRED | The status of the acknowledgement. The Status is either SUCCESS or FAIL. |
| ReasonCode | CDATA | #REQUIRED | Where STATUS is FAIL, a ReasonCode and associated ReasonText must be provided. (See Table 47.) |
| ReasonText | CDATA | #REQUIRED | Text associated with the ReasonCode above. (See Table 47.) |

The validation rules in Table 46 preferably apply to the ChallengeAck attributes:

TABLE 46

| Attribute | Validation Rule | Must Validate | May Validate | Error Code |
|---|---|---|---|---|
| Status | Status is a valid value | Seller's Bank | | |
| ReasonCode | A valid reason code is provided | Seller's Bank | | |
| ReasonText | A valid reason text is provided | Seller's Bank | | |

The following reason codes (Table 47) may be used with ChallengeAck:

TABLE 47

| Status | ReasonCode | ReasonText |
|---|---|---|
| SUCCESS | 00CH00 | Product Supported and Requesting Institution Authenticated |
| FAIL | 00EH04 | Product not supported by institution |
| FAIL | 00CH01 | Failed to authenticate requesting party |

The ServiceAck DTD (corresponding to the Srv Ack response message in Table 3 above) may include contact information by the responding financial institution within the ServiceAck. It preferably has the following attributes in Table 48:

TABLE 48

| Attribute | Type | Presence | Description |
| --- | --- | --- | --- |
| Status | CDATA | #REQUIRED | The status of the acknowledgement. The Status is either SUCCESS or FAIL. |
| CustomerServiceReference | CDATA | #REQUIRED | The field that the institution generating the ServiceAck requires be used in CustomerService inquiries. Valid values are TransactionReference, BuyerBankReference, SellerBankReference, BuyerReference, SellerReference |
| ReasonCode | CDATA | #REQUIRED | Where STATUS is FAIL, a ReasonCode and associated ReasonText must be provided. (See Table 50.) |
| ReasonText | CDATA | #REQUIRED | Text associated with the ReasonCode above. (See Table 50.) |

The following validation rules (Table 49) apply to the ServiceAck attributes:

TABLE 49

| Attribute | Validation Rule | Must Validate | May Validate | Error Code |
| --- | --- | --- | --- | --- |
| Status | Status has valid format | | | |
| CustomerServiceReference | Format is Valid | | | |
| ReasonCode | Reason Code is valid - (See Table 50.) | | | |
| ReasonText | Reason text is correct. | | | |

In a preferred embodiment, the following Reason Codes are used with ServiceAck (Table 50):

TABLE 50

| Status | ReasonCode | ReasonText |
| --- | --- | --- |
| SUCCESS | 00PR14 | Valid Request |
| FAIL | 00PR01 | Seller's Bank Certificate is Invalid |
| FAIL | 00PR02 | Seller's Bank Signature is Invalid |
| FAIL | 00PR03 | Seller's Bank is not Authorized to Request Service |
| FAIL | 00PR04 | Buyer's Bank Certificate is Invalid |
| FAIL | 00PR05 | Buyer's Bank Signature is Invalid |
| FAIL | 00PR06 | Buyer Mandate has Incorrect Authorization |
| FAIL | 00PR07 | Request has Incorrect Syntax |
| FAIL | 00PR11 | Seller's Certificate is Invalid |
| FAIL | 00PR12 | Seller's Signature is Invalid |
| FAIL | 00PR13 | Seller's is not Authorized to Request Service |

The PayInstAck DTD is a positive or negative acknowledgement sent as a result of the validation of transaction information in bank payment systems. PayInstAck preferably contains the NegotiatedData block to confirm the data that is being processed by buyer's bank 102 (seller's bank 104 in the direct debit transaction model) for processing. The NegotiatedData block includes the attributes listed above in Table 23. In the context of SystemPayResponse, the following validation rules, listed in Table 51, preferably apply to the attributes in the NegotiatedData block:

TABLE 51

| Attribute | Validation Rule | Must Validate | May Validate | Error Code |
| --- | --- | --- | --- | --- |
| Amt | Corresponds to Request | Buyer, Seller | Seller's Bank | |
| CurCode | Corresponds to Request | Buyer, Seller | Seller's Bank | |
| ValueDate | Corresponds to Request | Buyer, Seller | Seller's Bank | |
| ValueTerm | Corresponds to Request | Buyer, Seller | Seller's Bank | |
| Fees | Corresponds to Request | Buyer, Seller | Seller's Bank | |
| RecurringPaymentDuration | Corresponds to Request | Buyer, Seller | Seller's Bank | |
| RecurringPaymentModel | Corresponds to Request | Buyer, Seller | Seller's Bank | |

PayInstAck preferably includes the following attributes in Table 52:

TABLE 52

| Attribute | Type | Presence | Description |
| --- | --- | --- | --- |
| Status | CDATA | #REQUIRED | The status of the acknowledgement. The Status is either SUCCESS or FAIL. |
| ReasonCode | CDATA | #REQUIRED | Where STATUS is FAIL, a ReasonCode and associated ReasonText must be provided. (See Table 54.) |
| ReasonText | CDATA | #REQUIRED | Text associated with the ReasonCode above (See Table 54.) |

The following validation rules preferably apply to the PayInstAck attributes (Table 53):

TABLE 53

| Attribute | Validation Rule | Must Validate | May Validate | Error Code |
| --- | --- | --- | --- | --- |
| Status | Format is valid | Seller, Buyer | | |
| ReasonCode | Valid ReasonCode (See Table 54). | Seller, Buyer | | |
| ReasonText | Valid ReasonText (See Table 54). | Seller, Buyer | | |

The Reason Codes in Table 54 are used, in a preferred embodiment, with PayInstAck:

TABLE 54

| Status | ReasonCode | ReasonText |
|---|---|---|
| FAIL | 00ND01 | Contains a zero, negative or non numeric value |
| FAIL | 00ND02 | Amount exceeds maximum for Payment Channel |
| FAIL | 00ND03 | Amount exceeds Buyer's Limit |
| FAIL | 00ND04 | Amount format invalid for stated currency |
| FAIL | 00ND05 | CurCode is not valid |
| FAIL | 00ND06 | CurCode is not supported by the institution |
| FAIL | 00ND07 | Value Date is an invalid format |
| FAIL | 00ND08 | Value Date is the past |
| FAIL | 00ND09 | Value Date cannot be met |
| FAIL | 00ND10 | Value Date is not within XX days of current working date (where XX is the maximum number of days that an institution will allow instructions in the future). |
| FAIL | 00ND11 | The Value Term provided falls outside the parameters allowed by the financial institution. |
| FAIL | 00ND12 | Incorrect value provided. |
| FAIL | 00ND13 | Invalid Payment Duration Provided |
| FAIL | 00ND14 | Invalid Payment Model Provided |
| FAIL | 00BB01 | Buyer Reference does not exceed allowed length for field. |
| FAIL | 00BB02 | Buyer Reference does not exceed allowed length for field. |
| FAIL | 00BB03 | BuyerAccount is an invalid string |
| FAIL | 00BB04 | BuyerAccount provided is not assigned to certificate presented |
| FAIL | 00BB05 | Bank Identifier not recognized |
| FAIL | 00BB06 | Bank Identifier not provided |
| FAIL | 00BB07 | BuyerInstruction does not exceed allowed length for field. |
| FAIL | 00BB08 | Invalid format |
| FAIL | 00BB09 | Invalid format |
| FAIL | 00BB10 | FX Contract has expired |
| FAIL | 00SP01 | Does not exceed maximum length |
| FAIL | 00SP02 | SellerAccount is an invalid string |
| FAIL | 00SP03 | SellerAccount provided is not assigned to certificate presented |
| FAIL | 00SP04 | Bank Identifier not recognized |
| FAIL | 00SP05 | Bank Identifier not provided |
| FAIL | 00SP06 | SellerRelatedTransactionReference does not exceed maximum length |
| FAIL | 00SP07 | PaymentDetails does not exceed maximum length |
| FAIL | 00SP08 | DirectDebitSchemeIdentifier is a valid Identifier. |
| FAIL | 00OB01 | ObligationType: The value provided is invalid. |
| FAIL | 00OB02 | The NegotiatedData includes recurring payment instructions. (Obligations cannot be undertaken for recurring payments) |
| FAIL | 00OB03 | The Obligation date is not in the past. |
| FAIL | 00OB04 | The Obligation date is on or after the ValueDate. |
| FAIL | 00OB05 | Invalid Obligation Date Format |
| FAIL | 00BE01 | Sequence Format is valid |
| FAIL | 00BE02 | The sequence is incremental across BuyerSignature blocks in the BuyerSignatures entity |
| FAIL | 00BE03 | ReasonForSignature Format is valid |
| FAIL | 00BE04 | SignedPreviousSignature Format is valid |
| FAIL | 00BI01 | Sequence Format is valid |
| FAIL | 00BI02 | The sequence is incremental across BuyerSignature blocks in the BuyerSignatures entity |
| FAIL | 00SD01 | SellerAccount is an invalid string |
| FAIL | 00SD02 | SellerAccount provided is not assigned to certificate presented |
| FAIL | 00SD03 | Bank Identifier not recognized |
| FAIL | 00SD04 | Bank Identifier not provided |
| FAIL | 00SD05 | Seller Instruction Format is invalid |
| FAIL | 00SB01 | SellerBank Reference Format is invalid |
| FAIL | 00SB02 | SellerCorrespondentBank Format is an invalid SWIFT BIC |
| FAIL | 00SB03 | SellerAccount is an invalid string |
| FAIL | 00SB04 | SellerAccount Bank Identifier not recognized |
| FAIL | 00SB05 | SellerAccount Bank Identifier not provided |
| FAIL | 00SB06 | SellerBankUndertaking Format is Valid |
| FAIL | 00SB07 | The fee is a valid amount. |

The PayConf DTD is sent by the bank executing the payment to customers and correspondent banks and may be used by both the buyer's bank 102 and seller's bank 104 to inform correspondent banks of: the success or failure in execution of a system payment instruction, failure resulting from processing by the clearing and settlement network, and successful receipt of payment by the beneficiary's bank. The ReasonCode and ReasonText for successful PayConf qualify the successful event. PayConf includes the following attributes in a preferred embodiment (Table 55):

TABLE 55

| Attribute | Type | Presence | Description | Provided By |
|---|---|---|---|---|
| Status | CDATA | #REQUIRED | The status of the payment | Buyer's Bank/Seller's Bank |
| PaymentEffectiveDate | CDATA | #REQUIRED | The date on which payment will be executed. | Buyer's Bank/Seller's Bank |
| RegistryTransferFeeAmount | CDATA | #IMPLIED | The transfer fee. | Buyer's Bank/Seller's Bank |
| ReasonCode | CDATA | #REQUIRED | Where STATUS is FAIL, a ReasonCode and associated ReasonText are provided. (See Table 57.) | Buyer's Bank/Seller's Bank |
| ReasonText | CDATA | #REQUIRED | Text associated with the ReasonCode above. (See Table 57.) | Buyer's Bank/Seller'Bank |

The following validation rules in Table 56 preferably apply to the PayConf attributes:

TABLE 56

| Attribute | Validation Rule | Must Validate | May Validate | Error Code |
|---|---|---|---|---|
| Status | Format is valid | | | |
| PaymentEffectiveDate | Format is valid | | | |
| ReasonCode | Format is valid | | | |
| ReasonText | Format is valid | | | |

The following Reason Codes are preferably used with PayConf (Table 57):

TABLE 57

| Status | ReasonCode | ReasonText |
|---|---|---|
| SUCCESS | 00PR00 | Payment Executed |
| FAIL | 00PR08 | Payment Rejected By Payment Network |
| SUCCESS | 00PR09 | Payment Received |
| FAIL | 00PR10 | Payment Execution Failed |

The ObligationConf DTD block confirms the success or failure of a request for an obligation. An ObligationConf is only returned when a (Conditional) Payment Obligation or (Conditional) Certified Payment Obligation is requested. This block, depending on the SystemHeader, corresponds to the POb Acpt Conf or the CePOb Acpt Conf response messages listed in Table 3 above. ObligationConf preferably has the following attributes, listed in Table 58:

TABLE 58

| Attribute | Type | Presence | Description |
|---|---|---|---|
| Status | CDATA | #REQUIRED | The status of the acknowledgement. The Status is either SUCCESS or FAIL. |
| ObligationType | CDATA | #REQUIRED | The type of obligation requested (and issued if Status is SUCCESS) |
| ObligationEffectiveDate | CDATA | #REQUIRED | The date on which the obligation was created (if Status is SUCCESS). |
| ReasonCode | CDATA | #REQUIRED | Where STATUS is FAIL, a ReasonCode and associated ReasonText must be provided. (See Table 60.) |
| ReasonText | CDATA | #REQUIRED | Text associated with the ReasonCode above. (See Table 60.) |

The following validation rules in Table 59 preferably apply to the ObligationConf attributes:

TABLE 59

| Attribute | Validation Rule | Must Validate | May Validate | Error Code |
|---|---|---|---|---|
| Status | Format is valid | Seller | | |
| ObligationType | Value is Valid | Seller | | |
| ObligationEffectiveDate | Format is Valid | Seller | | |
| | Corresponds to Request | Seller | | |
| ReasonCode | Reason Code is Valid (See Table 60.) | Seller | | |
| ReasonText | Reason Text is Valid (See Table 60.) | Seller | | |

The following Reason Codes (in Table 60) are also preferably used with ObligationConf:

TABLE 60

| Status | ReasonCode | ReasonText |
|---|---|---|
| SUCCESS | 00OB00 | Obligation In Place |
| FAIL | 00OB01 | ObligationType: The value provided is invalid. |
| FAIL | 00OB02 | The NegotiatedData includes recurring payment instructions. (Obligations cannot be undertaken for recurring payments) |
| FAIL | 00OB03 | The Obligation date is not in the past. |

TABLE 60-continued

| Status | ReasonCode | ReasonText |
|---|---|---|
| FAIL | 00OB04 | The Obligation date is on or after the ValueDate. |
| FAIL | 00OB05 | Invalid Obligation Date Format |
| FAIL | 00OB06 | (Certified Obligation Only) Insufficient Credit |

The CancellationConf DTD block provides negative or positive confirmation of a cancellation request. This block may be used to implement the Por Cncl Conf response message describe above. In a preferred embodiment, CancellationConf has the attributes listed in Table 61:

TABLE 61

| Attribute | Type | Presence | Description |
|---|---|---|---|
| Status | CDATA | #REQUIRED | The status of the acknowledgement. The Status is either SUCCESS or FAIL. |
| CancellationEffectiveDate | CDATA | #REQUIRED | The date on which the transaction was cancelled. |
| ReasonCode | CDATA | #REQUIRED | Where STATUS is FAIL, a ReasonCode and associated ReasonText must be provided. (See Table 63.) |
| ReasonText | CDATA | #REQUIRED | Text associated with the ReasonCode above. (See Table 63.) |

The following validation rules (Table 62) preferably apply to the CancellationConf attributes:

TABLE 62

| Attribute | Validation Rule | Must Validate | May Validate | Error Code |
|---|---|---|---|---|
| Status | Value is valid | | | |
| CancellationEffectiveDate | Format is valid Cancellation date is before value date | | | |
| ReasonCode | Reason Code is Valid (See Table 63.) | | | |
| ReasonText | Reason Text is Valid (See Table 63.) | | | |

The following Reason Codes (Table 63) are also preferably used with CancellationConf:

TABLE 63

| Status | ReasonCode | ReasonText |
|---|---|---|
| SUCCESS | 00CR00 | Transaction Cancelled |
| FAIL | 00CR01 | Failed to Identify Transaction |
| FAIL | 00CR02 | Payment Has Been Already Executed |
| FAIL | 00CR03 | Payment Obligation - Requires Assent of Seller |
| FAIL | 00CR04 | Payment Has Already Been Cancelled |

The ConditionSetUpConf DTD block provides negative or positive confirmation of a request to set up conditions against payment. ConditionSetUpConf corresponds to the above described Cnd Update response messages listed in Table 3. The response indicates only that the conditions now exist within the domain of a TSS. All other communications about conditions use the document defined in the PayCondition DTD (described below). ConditionConf preferably includes the following attributes, listed in Table 64:

TABLE 64

| Attribute | Type | Presence | Description |
|---|---|---|---|
| Status | CDATA | #REQUIRED | The status of the acknowledgement. The Status is either SUCCESS or FAIL. |
| ReasonCode | CDATA | #REQUIRED | Where STATUS is FAIL, a ReasonCode and associated ReasonText must be provided. (See Table 66.) |

TABLE 64-continued

| Attribute | Type | Presence | Description |
|---|---|---|---|
| ReasonText | CDATA | #REQUIRED | Text associated with the ReasonCode above. (See Table 66.) |

The following validation rules preferably apply to the ConditionConf attributes included in the element (Table 65):

TABLE 65

| Attribute | Validation Rule | Must Validate | May Validate | Error Code |
|---|---|---|---|---|
| Status | Value is valid | | | |
| ReasonCode | Reason Code is Valid (See Table 66.) | | | |
| ReasonText | Reason Text is Valid (See Table 66.) | | | |

The following Reason Codes, in Table 66, are preferably used with ConditionConf:

TABLE 66

| Status | ReasonCode | ReasonText |
|---|---|---|
| FAIL | 00CS01 | ConditionCode not Valid |
| FAIL | 00CS02 | Invalid TPSP Contact Details |
| FAIL | 00CS03 | Expiry Date in the Past |
| FAIL | 00CS04 | Associated Obligation Not Accepted |

A RelatedAcknowledgement DTD element may optionally be used to support and carry other acknowledgements related to a transaction. For example, it may be used in seller bank 104-to-seller 108 communication to carry the acknowledgement provided by buyer's bank 102 to seller's bank 104. The RelatedAcknowledgement has three standardized attributes that allow for identification, decoding and interpretation of the contents. In a preferred embodiment, those attributes, listed in Table 67, are as follows:

TABLE 67

| Attribute | Type | Presence | Description |
|---|---|---|---|
| Name | CDATA | #IMPLIED | Optional |
| Content | NMTOKEN | #REQUIRED | This identifies how the acknowledgement is wrapped. Prefreable valid values for the Content attribute are as follows: PCDATA. The content of the RelatedAcknowledgement element can be treated as PCDATA (e.g., by default) with no further processing. MIME. The content of the RelatedAcknowledgement element is a complete MIME item. Processing should include looking for MIME headers inside the RelatedAcknowledgement Element. MIME: mimetype. The content of the RelatedAcknowledgement element is MIME content, with the following header "Content-Type: mimetype". (Although it is possible to have MIME: mimetype with the Transform attribute set to NONE, it is generally more likely to have the Transform attribute set to BASE64. If Transform is set to NONE, then the entire content must conform to PCDATA, and in that case some characters must be encoded either as the XML default entities or as numeric character entities.) XML. The content of the RelatedAcknowledgement element can be treated as an XML document. Entities and CDATA sections, or Transform set to BASE64, must be used to ensure that the RelatedAcknowledgement element contents are legitimate PCDATA. |
| Transform | (NONE\| BASE64) | #REQUIRED | This identifies the transformation that has been done to the data before it was placed in the content. Valid values are: NONE. The PCDATA content of the RelatedAcknowldgement element is the correct representation of the data. Note that entity expansion must occur first (i.e. replacement of & and 	) before the data is examined. CDATA sections may legitimately occur in a RelatedAcknowledgement element where the Transform attribute is set to NONE. BASE64. The PCDATA content of the RelatedAcknowledgement element represents a BASE64 encoding of the actual content. |

Suitable validation rules may be implemented for the RelatedAcknowledgement attributes, as appropriate.

Payment Condition

The PaymentCondition document is used to pass information about the status of conditions between parties involved in a transaction (the Cnd Decl response message described above and listed in Table 3 corresponds to a PaymentCondition document). Note that the document is only used when conditions have been successfully created in the TSS.

The PaymentCondition document is preferably used:

1. By the TSS to inform the TPSP that conditions have been created that require to be discharged.
2. By the TPSP to inform the TSS that a change has been made to the status of conditions assigned for discharge.
3. By the TSS to inform buyer's bank 102 that a change has been made to the status of the conditions attached to a payment made by buyer 106 (note that buyer's bank 102 may operate, i.e. may act as, the TSS).
4. By the TSS to inform (if required) buyer 106 or seller's bank 104 that a change has been made to the status of the conditions.
5. By seller's bank 104 to inform seller 108 that a change has been made to the status of the conditions.

The contents of the PaymentCondition DTD are preferably given in Table 68 below:

TABLE 68

| | |
|---|---|
| NIB | Network Information Block |
| Signature | XMLDSig Signature Block |
| CertBundle | Certificate Bundle Block |
| SystemPayCondition | PayCondition Transaction Block (see Table 69 |
| Response | Response Block (This block must be included with any response containing signed certificate of the organization making the reponse.) |

The SystemPayCondition DTD contains, in a preferred embodiment, the following elements or blocks (as indicated in Table 69):

TABLE 69

| Contains | Relationship Description |
| --- | --- |
| SystemHeader | Contain product type and message type information for the transaction in progress. |
| References | Contains references to the commercial transaction being used by those parties involved in the transaction. |
| ConditionSet | Contains information about the conditions being processed. |

The attributes of the SystemHeader, in a preferred embodiment, for conditional payment products are included in Table 20 above. The preferable associated validation rules are also provided in Table 21 above and, for a conditional payment, also preferably include the validation rule in Table 70 for the Product attribute:

TABLE 70

| Attribute | Validation Rule | Must Validate | May Validate | Error Code |
| --- | --- | --- | --- | --- |
| Product | The product code is for a conditional product. | | | 00EH05 |

The References block is used to identify the commercial payment transaction to which the conditions are attached. The attributes and associated validation rules for the Reference block in a preferred embodiment are provided above in Tables 43 and 44 respectively.

The ConditionSet block contains a description of the conditions that attach to a payment. The ConditionSet block is an imported element and, as indicated, is used in a number of the system payment blocks. A preferred description of this block is given in more detail below.

As also indicated above, the Contact block contains contact details that may be used to provide contact information for the parties involved in a transaction. The Contact block is preferably an imported element and also used in a number of the system payment blocks that import it (as described above and also including ConditionSet). The Contact data element in a preferred embodiment is also described in more detail below.

Payment Cancellation

The PaymentCancellation document is used to request the cancellation of a payment. The POr Cncl request message described above and listed in Table 2 is implemented in a PaymentCancellation document. Generally, "irrevocable" payments—where a buyer or bank obligation has been undertaken—can only be cancelled with the assent of seller 108. In a preferred embodiment, the contents of the PaymentCancellation DTD are defined in Table 71:

TABLE 71

| | |
| --- | --- |
| NIB | Network Information Block |
| Signature | XMLDSig Signature Block |
| CertBundle | Certificate Bundle Block |
| SystemPayCancellation | Payment Cancellation Block. (See Table 72.) |
| Request | Request Block |

The SystemPayCancellation DTD preferably contains the following blocks, listed in Table 72:

TABLE 72

| Contains | Relationship Description |
| --- | --- |
| SystemHeader | The System Header contains information about the product type and message type. |
| CancBuyerSignedData | The CancBuyerSignedData contains data signed by the Buyer to authorize cancellation. |
| BuyerSignatures | The BuyerSignatures block contains the signature(s) authorizing cancellation of the payment. |

The SystemHeader block is a component common to all messages, as indicated above. Tables 20 and 21 above provide the attributes and validation rules of this block according to a preferred embodiment. In addition, in the context of payment cancellation, for the MessageType, valid values in the request structure are: Cancellation Request and Query.

The CancBuyerSignedData block preferably includes the following elements (Table 73):

TABLE 73

| Contains | Relationship Description |
| --- | --- |
| References | References for the payment transaction which is being requested to be cancelled. |
| CancellationData | Additional instructions provided by the buyer to the buyer's bank. |
| BuyerSignatureDetails | Information about the buyer's signature(s) authorizing cancellation. |

The References block contains references to the transaction that is being requested to be cancelled. The attributes and associated validation rules for the Reference block in a preferred embodiment are provided above in Tables 43 and 44 respectively. The CancellationData block contains additional data provided by buyer 106 and relayed to buyer's bank 102 regarding the cancellation. Preferably, this block has attributes and associated validation rules for carrying out cancellation instructions.

The BuyersSignatures block (in the CancBuyerSignedData block) contains signatures created by actors in the buying organization authorizing the cancellation of the transaction. Approval cycles may require a number of signatures to be provided against any given instruction. The BuyersSignatureDetails block can contain one or more BuyerSignatureDetail blocks. A BuyerSignatureDetail block contains the information about a signature created by buyer 106, and, in a preferred embodiment, its attributes are given in Table 31 and associated validation rules in Table 32. As also indicated above, a related BuyersSignature block (included in the SystemPayCancellation DTD) preferably contains a PCDATA block in which the signature is included in the BuyerSignature element as PCDATA (see Table 33). The attribute and associated validation rules for that block are given in Tables 34-36 for a preferred embodiment.

Payment Challenge

A Payment Challenge document allows a financial institution that requires proof of identity of a third party financial institution prior to exchanging application data to establish the identity of that institution and confirm that the payment product is supported. The response to a PaymentChallenge is a PayResponse with a ChallengeAck included. The PaymentChallenge DTD has the following elements in a preferred embodiment (Table 74):

TABLE 74

| | |
|---|---|
| NIB | Network Information Block |
| Signature | XMLDSig Signature Block |
| CertBundle | Certificate Bundle Block |
| SystemPayChallenge | Payment Challenge Block |
| Request | Request Block |

Condition Set

The ConditionsSet element DTD is used in a number of transactions to carry information about the conditions which can attach to payments. The ConditionSet DTD preferably contains the following elements, listed in Table 75:

TABLE 75

| Contains | Relationship Description |
|---|---|
| Condition | The condition block contains a description of each of the conditions within the transaction. |
| Contact | These are variously as follows:<br>buyer/seller to bank - Contact details of TPSP where a single TPSP is being used to discharge conditions<br>TSS to TPSP - Contact details of the TSS.<br>TPSP to TSS - Contact details of the TPSP for further communication. |

ConditionSet preferably has the following attributes, listed in Table 76:

TABLE 76

| Attribute | Type | Presence | Description | Provided By |
|---|---|---|---|---|
| TransactionDescription | CDATA | #REQUIRED | A text description of the commercial transaction being undertaken. | Seller |
| Status | CDATA | #REQUIRED | The Status of the Condition Set:<br>Requested The status when the conditions are created - before registration with a TSS.<br>Incomplete Conditions which are registered with a TSS and remain to be discharged.<br>Discharged Conditions which have been discharged by a TPSP<br>Expired Conditions which have expired. Condition Sets which contain conditions which have expired.<br>Cancelled Conditions which attach to a payment that has been cancelled. | |

Suitable validation rules may be applied to the ConditionSet attributes.

The Condition block may contain a Contact block. If conditions within a payment are to be discharged by different TPSPs, then contact information is preferably appended against each condition rather than against the ConditionSet. Preferably, this element is only present when buyer 106 or seller 108 informs a financial institution of the conditions in the PayRequest document. The Condition block has the following attributes in a preferred embodiment (Table 77):

TABLE 77

| Attribute | Type | Presence | Description |
|---|---|---|---|
| ConditionReferenceNumber | CDATA | #REQUIRED | A unique numeric string that identified the condition within the condition set. |
| ConditionCode | CDATA | #REQUIRED | A code for the standard system condition as defined by the system |
| ConditionDescription | CDATA | #REQUIRED | A description of the standard system condition as defined by the system |
| XMLlang | CDATA | #REQUIRED | The ISO Code for the language used to describe a condition. |

TABLE 77-continued

| Attribute | Type | Presence | Description |
|---|---|---|---|
| ConditionStatus | CDATA | #REQUIRED | The Status of the Condition Set: Requested The status when the conditions are created - before registration with a TSS. Incomplete Conditions which are registered with a TSS and remain to be discharged. Discharged Conditions which have been discharged by a TPSP Expired Conditions which have expired. Condition Sets which contain conditions which have expired. Cancelled Conditions which attach to a payment which has been cancelled. |
| ConditionStatusDescription | CDATA | #IMPLIED | A text description that accompanies the status information. |
| ConditionTransactionDescription | CDATA | #IMPLIED | A description of the transaction as required to sign off the condition. |
| ConditionExpiryDate | CDATA | #IMPLIED | The expiry date for the condition. If reached, the condition expires and cannot be discharged —payment will not be made. |

The following validation rules, listed in Table 78, preferably apply to the Condition block attributes:

TABLE 78

| Attribute | Validation Rule | Must Validate | May Validate | Error Code |
|---|---|---|---|---|
| ConditionReferenceNumber | ConditionReference in unique | | | 00CT01 |
| ConditionCode | ConditionCode is a valid system payment condition code | | | 00CT02 |
| ConditionDescription | ConditionDescription is a valid system payment condition description | | | 00CT03 |
| XMLlang | The language is a valid ISO code. | | | 00CT04 |
| ConditionStatus | The Condition Status is a valid status. | | | 00CT05 |
| ConditionTransactionDescription | The ConditionTransactionDescription is invalid | | | 00CT06 |
| ConditionExpiryDate | The ConditionExpiryDate has not expired | Buyer's Bank | | 00CT07 |

The system may define conditions to be used with the payment products.

Another element that may be used in connection with payment conditions is PackagedContent. The PackagedContent element supports the concept of an embedded data stream, transformed to both protect it against misinterpretation by transporting systems and to ensure XML compatibility. It may be used within the system to allow the TPSP to provide supporting documentation when discharging conditions. The documentation, carried as PCData, is preferably forwarded to the seller once all conditions have been discharged. The PackagedContent data stream preferably has three standardized attributes that allow for identification, decoding and interpretation of the contents, and these attributes are preferably defined as follows in Table 79 below:

TABLE 79

| Attribute | Type | Presence | Description |
|---|---|---|---|
| Name | CDATA | #IMPLIED | Optional. Distinguishes between multiple occurrences of Packaged Content Elements. For example: <ABCD> <PackagedContent Name='FirstPiece'> snroasdfnas934k </PackagedContent> <PackagedContent Name='SecondPiece'> dvdsjn15poidsdsflkjnw45 |

TABLE 79-continued

| Attribute | Type | Presence | Description |
|---|---|---|---|
| | | | </PackagedContent><br></ABCD><br>The name attribute may be omitted, for example if there is only one PackagedContent element. |
| Content | NMTOKEN | #REQUIRED | This identifies what type of data is contained within the Content attribute of the PackagedContent element. The valid values for the Content attribute are as follows:<br>PCDATA. The content of the PackagedContent element can be treated as PCDATA (e.g., by default) with no further processing.<br>MIME. The content of the PackagedContent element is a complete MIME item. Processing should include looking for MIME headers inside the PackagedContent Element.<br>MIME: mimetype. The content of the PackagedContent element is MIME content, with the following header "Content-Type: mimetype".<br>Although it is possible to have MIME: mimetype with the Transform attribute set to NONE, it is more likely to have the Transform attribute set to BASE64. Note that if Transform is NONE is used, then the entire content should still conform to PCDATA. Some characters will need to be encoded either as the XML default entities, or as numeric character entities.<br>XML. The content of the PackagedContent element can be treated as an XML document. Entities and CDATA sections, or Transform set to BASE64, must be used to ensure that the Packaged Content Element contents are legitimate PCDATA. |
| Transform | (NONE\|BASE64) | #REQUIRED | This identifies the transformation that has been done to the data before it was placed in the content. Valid values are:<br>NONE. The PCDATA content of the PackagedContent element is the correct representation of the data. Note that entity expansion must occur first (i.e. replacement of &amp; and &#9;) before the data is examined. CDATA sections may legitimately occur in a PackagedContent element where the Transform attribute is set to NONE.<br>BASE64. The PCDATA content of the Packaged Content Element represents a BASE64 encoding of the actual content. |

Again, suitable validation rules may be applied to the PackagedContent attributes.

Contact

The Contact DTD is used in a number of document definitions and so is preferably defined in a separate DTD for re-use. The structure contains generic contact data, connected with the element that it is being used in conjunction with. Generally, this data contains the names and contact details of one or more individuals dealing with any given transaction. Thus, the Contact block may have the following attributes (the descriptions of which are self-explanatory in Table 80):

TABLE 80

| Attribute | Type | Presence |
|---|---|---|
| OrganizationName | CDATA | #IMPLIED |
| OrganizationUnitName | CDATA | #IMPLIED |
| Address1 | CDATA | #IMPLIED |
| Address2 | CDATA | #IMPLIED |

TABLE 80-continued

| Attribute | Type | Presence |
|---|---|---|
| Address3 | CDATA | #IMPLIED |
| Address4 | CDATA | #IMPLIED |

Suitable validation rules may be applied to the Contact attributes, as appropriate. The ContactData block may also include the following attributes (again, for these attributes, the descriptions in Table 81 are self-explanatory):

TABLE 81

| Attribute | Type | Presence |
|---|---|---|
| ContactName | CDATA | #IMPLIED |
| ContactTitle | CDATA | #IMPLIED |
| Telephone | CDATA | #IMPLIED |
| Fax | CDATA | #IMPLIED |

TABLE 81-continued

| Attribute | Type | Presence |
|---|---|---|
| Email | CDATA | #IMPLIED |
| PreferredLanguage | CDATA | #IMPLIED |

Validation rules are also applied to these attributes, as appropriate.

Field Lengths and Formats

Table 82 summarizes the field lengths and formats for many of the payment system data fields in a preferred embodiment:

TABLE 82

| Field Description | Content Definition |
|---|---|
| TransactionReference | 35 alphanumeric |
| Product | 3 alphanumeric |
| MessageType | 20 alphanumeric |
| SellerBankReference | 30 alphanumeric |
| BuyerBankReference | 30 alphanumeric |
| BuyerReference | 35 alphanumeric |
| SellerReference | 35 alphanumeric |
| BuyerRelatedTransactionReference | 35 alphanumeric |
| SellerRelatedTransactionReference | 35 alphanumeric |
| Rejection Code | 6 alphanumeric (ssxxnn) |
| Rejection Reason | 35 alphanumeric |
| BuyerAccount | 30 numeric |
| BuyerInstruction | 4 * 35 alphanumeric |
| SellerAccount | 30 numeric |
| SellerInstruction | 4 * 35 alphanumeric |
| PaymentDetails | 4 * 35 alphanumeric |
| DirectDebitSchemeIdentifier | 35 alphanumeric |
| Amt | 17 digits plus a decimal point (Where no decimal point is specified, it may be assumed that the decimal place is right justified, i.e. the amount is expressed in units of the currency in question) |
| CurCode | 3 alphabetic - ISO 4217 |
| ValueDate | 8 numeric [YYYYMMDD] |
| ValueTerm | 3 numeric |
| OrganisationalName | 35 alphanumeric |
| OrganisationalUnit | 35 alphanumeric |
| Address1 | 35 alphanumeric |
| Address2 | 35 alphanumeric |
| Address3 | 35 alphanumeric |
| Address 4 | 35 alphanumeric |
| ContactName | 35 alphanumeric |
| ContactTitle | 35 alphanumeric |
| Telephone | 35 alphanumeric |
| Fax | 35 alphanumeric |
| Email | 35 alphanumeric |
| PreferredLanguage | 35 alphanumeric |
| ObligationType | Values 'buyer' or 'bank' |
| ObligationEffectiveDate | 8 numeric [YYYYMMDD] |
| PaymentDetails | 4 * 35 alphanumeric |
| ConditionSetTransactionDescription | 4 * 35 alphanumeric |
| ConditionReferenceNumber | 3 numeric |
| ConditionCode | 6 alphanumeric |
| ConditionDescription | 4 * 35 alphanumeric |
| ConditionStatusDescription | 4 * 35 alphanumeric |
| ConditionTransactionDescription | 4 * 35 alphanumeric |

TABLE 82-continued

| Field Description | Content Definition |
|---|---|
| Sequence (BuyerSignature) | 3 numeric |
| ReasonForSignature | 4 * 35 alphanumeric |
| SignedPreviousSignature | Values 'true' or 'false' |
| SellerCorrespondentBank | 8 alphanumberic |
| SellerBankUndertaking | 4 * 35 alphanumeric |
| CustomerServiceReference | Values 'SellerBankReference', 'BuyerBankReference', 'TransactionReference', 'BuyerReference' or 'SellerReference' |
| PaymentEffectiveDate | 8 numeric [YYYYMMDD] |
| CancellationEffectiveDate | 8 numeric [YYYYMMDD] |
| CancellationInstruction | 4 * 35 alphanumeric |

Error Codes and Error Texts

Reason Codes may be used within the payment system to provide more detail as to the reason for success or failure of any particular event. A preferred structure of the reason code is ssbbnn, where ss=the identifier of the scheme who owns the error code (e.g. 00), bb=indicates the DTD block within the scheme, and nn=number of the error.

The following bb block codes in Table 83 may, for example, be used with respect to the DTDs given above:

TABLE 83

| BB | BuyerData |
|---|---|
| BD | BuyerSignatureDetails |
| BE | BuyerSignatureDetail |
| BI | BuyerSignature |
| BS | BuyerSignatures |
| BA | BuyerSignedData |
| CA | CancellationData |
| CB | CancBuyerSignedData |
| CC | CancellationConf |
| CD | ContactData |
| CH | ChallengeRequest |
| CO | Contact |
| CR | CancellationRequest |
| CS | ConditionSet |
| CT | Condition |
| CU | ConditionSetUpConf |
| EH | System Header |
| ND | NegotiatedData |
| OB | Obligation |
| OC | ObligationConf |
| PC | PayConf |
| PI | PayInstAck |
| PR | PayRequest |
| RA | RelatedAcknowledgement |
| RE | References |
| SA | ServiceAck |
| SB | SellerBankData |
| SD | SellerPrivateData |
| SP | SellerPublicData |

Table 84 below also summarizes a set of preferred Reason Codes.

TABLE 84

| Code | Description |
|---|---|
| 00EH01 | Invalid Product Code |
| 00EH02 | The Originator is Not Authorized to Use Product |
| 00EH03 | Invalid MessageType Provided |
| 00EH04 | Product Not Supported By Institution |

TABLE 84-continued

| Code | Description |
| --- | --- |
| 00EH05 | Product code not for a conditional product. |
| 00ND01 | Contains a zero, negative or non numeric value |
| 00ND02 | Amount exceeds maximum for Payment Channel |
| 00ND03 | Amount exceeds Buyer's Limit |
| 00ND04 | Amount format invalid for stated currency |
| 00ND05 | CurCode is not valid |
| 00ND06 | CurCode is not supported by the institution |
| 00ND07 | Value Date is an invalid format |
| 00ND08 | Value Date is the past |
| 00ND09 | Value Date cannot be met |
| 00ND10 | Value Date is not within XX days of current working date (where XX is the maximum number of days that an institution will allow instructions in the future). |
| 00ND11 | The Value Term provided falls outside the parameters allowed by the financial institution. |
| 00ND12 | Incorrect value provided. |
| 00ND13 | Invalid Payment Duration Provided |
| 00ND14 | Invalid Payment Model Provided |
| 00BB01 | Buyer Reference does not exceed allowed length for field. |
| 00BB02 | Buyer Reference does not exceed allowed length for field. |
| 00BB03 | BuyerAccount is an invalid string |
| 00BB04 | BuyerAccount provided is not assigned to certificate presented |
| 00BB05 | Bank Identifier not recognized |
| 00BB06 | Bank Identifier not provided |
| 00BB07 | BuyerInstruction does not exceed allowed length for field. |
| 00BB08 | Invalid format |
| 00BB09 | Invalid format |
| 00BB10 | FX Contract has expired |
| 00SP01 | Does not exceed maximum length |
| 00SP02 | SellerAccount is an invalid string |
| 00SP03 | SellerAccount provided is not assigned to certificate presented |
| 00SP04 | Bank Identifier not recognized |
| 00SP05 | Bank Identifier not provided |
| 00SP06 | SellerRelatedTransactionReference does not exceed maximum length |
| 00SP07 | PaymentDetails does not exceed maximum length |
| 00SP08 | DirectDebitSchemeIdentifier is a valid Identifier. |
| 00OB00 | Obligation Request Successful |
| 00OB01 | ObligationType: The value provided is invalid. |
| 00OB02 | The NegotiatedData includes recurring payment instructions. (Obligations cannot be undertaken for recurring payments) |
| 00OB03 | The Obligation date is not in the past. |
| 00OB04 | The Obligation date is on or after the ValueDate. |
| 00OB05 | Invalid Obligation Date Format |
| 00OB06 | (Certified Obligation Only) Insufficient Credit |
| 00BE01 | Sequence Format is valid |
| 00BE02 | The sequence is incremental across BuyerSignature blocks in the BuyerSignatures entity |
| 00BE03 | ReasonForSignature Format is valid |
| 00BE04 | SignedPreviousSignature Format is valid |
| 00BI01 | The Buyer's Signature is invalid. |
| 00BI02 | The Buyer's Signatures do not have the prerequisite level of authority. |
| 00BI03 | Sequence Format is valid |
| 00BI02 | The sequence is incremental across BuyerSignature blocks in the BuyerSignatures entity |
| 00SD01 | SellerAccount is an invalid string |
| 00SD02 | SellerAccount provided is not assigned to certificate presented |
| 00SD03 | Bank Identifier not recognized |
| 00SD04 | Bank Identifier not provided |
| 00SD05 | Seller Instruction Format is invalid |
| 00SB01 | SellerBank Reference Format is invalid |
| 00SB02 | SellerCorrespondentBank Format is a invalid SWIFT BIC |
| 00SB03 | SellerAccount is an invalid string |
| 00SB04 | SellerAccount Bank Identifier not recognized |
| 00SB05 | SellerAccount Bank Identifier not provided |
| 00SB06 | SellerBankUndertaking Format is Valid |
| 00SB07 | The fee is a valid amount. |
| 00RE01 | The Transaction Reference cannot be reconciled. |
| 00RE02 | The BuyerBank Reference cannot be reconciled. |
| 00RE03 | The SellerBank Reference cannot be reconciled. |
| 00RE04 | The BuyerReference cannot be reconciled |
| 00RE05 | The SellerReference cannot be reconciled |
| 00RE06 | The BuyerRelatedTransactionReference cannot be reconciled |
| 00RE07 | The SellerRelatedTransactionReference cannot be reconciled |
| 00CH00 | Product Supported and Requesting Institution Authenticated |
| 00CH01 | Failed to Authenticate Requesting Party |
| 00PR00 | Payment Executed |
| 00PR01 | Seller's Bank Certificate is Invalid |

TABLE 84-continued

| Code | Description |
| --- | --- |
| 00PR02 | Seller's Bank Signature is Invalid |
| 00PR03 | Seller's Bank is not Authorized to Request Service |
| 00PR04 | Buyer's Bank Certificate is Invalid |
| 00PR05 | Buyer's Bank Signature is Invalid |
| 00PR06 | Buyer Mandate has Incorrect Authorization |
| 00PR07 | Request has Incorrect Syntax |
| 00PR08 | Payment Rejected By Payment Network |
| 00PR09 | Payment Received |
| 00PR10 | Payment Execution Failed |
| 00PR11 | Seller's Certificate is Invalid |
| 00PR12 | Seller's Signature is Invalid |
| 00PR13 | Seller's is not Authorized to Request Service |
| 00PR14 | Valid Request |
| 00CR00 | Transaction Cancelled |
| 00CR01 | Failed to Identify Transaction |
| 00CR02 | Payment Has Been Already Executed |
| 00CR03 | Payment Obligation - Requires Assent of Seller |
| 00CR04 | Payment Has Already Been Cancelled |
| 00CS01 | ConditionCode not Valid |
| 00CS02 | Invalid TPSP Contact Details |
| 00CS03 | Expiry Date in the Past |
| 00CS04 | Associated Obligation Not Accepted |
| 00CT01 | ConditionReference is not unique |
| 00CT02 | ConditionCode is an invalid payments Condition Code |
| 00CT03 | ConditionDescription is an invalid payments Condition Description |
| 00CT04 | The language is not valid ISO code. |
| 00CT05 | The Condition Status is invalid. |
| 00CT06 | The ConditionTransactionDescription is invalid |
| 00CT07 | The ConditionExpiryDate has expired |

Preferred general message flows for particular payment processes, and typical transaction steps exemplifying those message flows in different transaction models, are now described in connection with FIGS. 6-8.

Payment Order Message Flow

Figure 6:
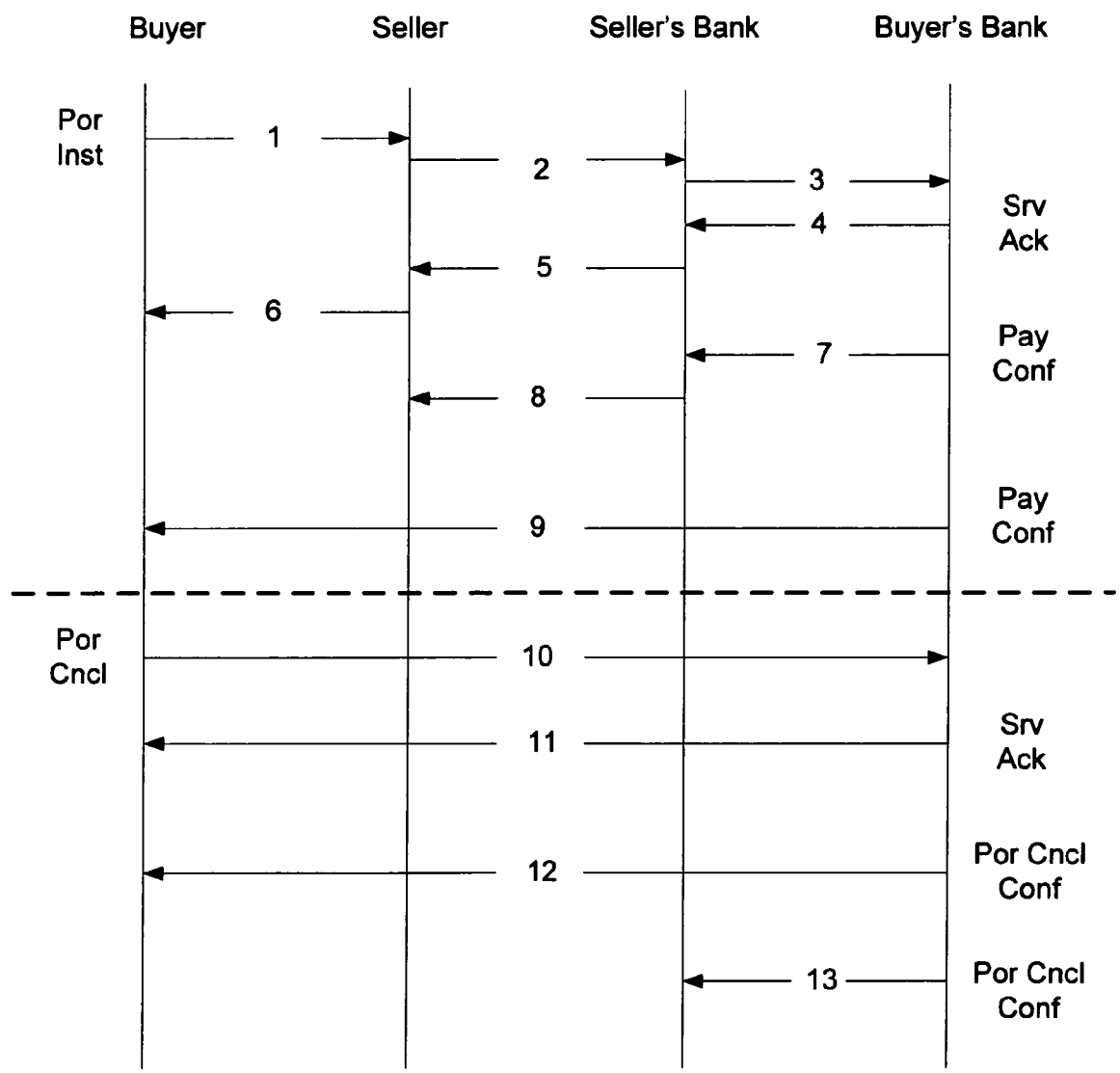
FIG. 6 is a diagram illustrating a preferred embodiment of the message flow for processing a payment order.

A preferred general message flow for processing a payment order is shown in FIG. 6. Before the first message in the process, buyer 106 and seller 108 identify each other through their respective certificates and agree on the purchase and sales agreement. Buyer 106 agrees to pay for the transaction with a payment order from buyer 106 to buyer's bank 102.

Buyer 106 then reviews the payment order for acceptability, completes the buyer's section in the payment order instruction (see Table 4 above), and signs the payment order instruction. Then, as shown in message 1 of FIG. 6, buyer 106 forwards the payment order instruction to seller 108.

Seller 108 reviews the received payment order instruction for acceptability, completes the seller's section of the payment order instruction (see Table 4 above), and signs the amended payment order instruction. Then, as shown in message 2 of FIG. 6, seller 108 forwards the payment order instruction to seller's bank 104.

Seller's bank 104 reviews the payment order instruction for acceptability, verifies the seller's certificate, completes its section of the order (see Table 4 above), and signs the amended payment order instruction. Then, as shown in message 3 of FIG. 6, seller's bank 104 forwards the payment order instruction to buyer's bank 102.

Buyer's bank 102 reviews the payment order instruction for acceptability and verifies the message syntax, the validity of the certificate and signature, and the authority of the signer. Buyer's bank 102 then creates a service acknowledgment message (see Table 9 above) with the results of these checks, and signs and sends the service acknowledgment to seller's bank 104 as shown in message 4 of FIG. 6.

Seller's bank 104 reviews the service acknowledgment, amends it with its details if necessary, and signs the amended message. The message is then sent to seller 108, as shown in message 5 of FIG. 6.

Seller 108 reviews the service acknowledgment, amends it with its details if necessary, and signs it. The amended service acknowledgment is then sent to buyer 106 as shown in message 6 of FIG. 6.

When the payment execution date/time specified in the payment order instruction is reached, the payment order instruction is executed, preferably utilizing the banks' existing payment infrastructure.

Buyer's bank 102 creates a confirmation of a payment execution (see Table 11 above) to signify that the payment order has been executed. Buyer's bank 102 then signs and sends this message to seller's bank 104 as shown in message 7 of FIG. 6. The confirmation of a payment execution indicates whether the payment order has been executed successfully or not. The confirmation of a payment execution message is preferably sent no later than the close of the following business day.

Seller's bank 104 reviews the confirmation of a payment execution, amends the confirmation of a payment execution with its details if necessary, signs the amended message, and sends it to seller 108 as shown in message 8 of FIG. 6.

Buyer's bank 102 creates a confirmation of a payment execution to indicate whether this payment order has been executed successfully or not. Buyer's bank 102 then signs this message and sends it to the buyer as shown in message 9 of FIG. 6. If payment execution fails, a more detailed description of the reasons is sent to the buyer than would have been sent to seller 108 and seller's bank 104. At a minimum, the confirmation of a payment execution message is preferably sent no later than the close of the following business day.

In a preferred embodiment, if buyer's bank 102 has not yet sent a confirmation of a payment execution message stating that the payment order has been executed and passed into the bank's payment infrastructure, then buyer 106 has the ability to cancel the payment order. To cancel a payment order, buyer 106 creates a payment order cancellation (see Table 7 above). The buyer signs the payment order cancellation and sends it to buyer's bank 102 as shown in message 10 of FIG. 6.

In a preferred embodiment, because revocation of a payment request by buyer 106 is permitted, the payment service preferably stores revocation requests even if a corresponding payment request has not been obtained. This permits a delayed payment request, which already has been revoked, to be identified and prevented from execution.

Buyer's bank 102 reviews the payment order cancellation for acceptability and verifies the message syntax, the validity of the certificate and signature, and the authority of the signer. Buyer's bank 102 then creates a service acknowledgment message (see Table 9 above) with the results of these checks. Buyer's bank 102 then signs and sends the service acknowledgment to buyer 106 as shown in message 11 of FIG. 6.

Buyer's bank 102 creates a confirmation of a payment order cancellation (see Table 15 above) to signify that the payment order cancellation request has been accepted. Buyer's bank 102 then signs and sends the confirmation of a payment order cancellation to buyer 106 as shown in message 12 of FIG. 6. The confirmation of a payment order cancellation should preferably be sent no later than the close of the following business day.

Buyer's bank 102 creates a confirmation of a payment order cancellation to signify that the payment order cancellation request has been accepted. Buyer's bank 102 signs and sends the confirmation of a payment order cancellation to seller's bank 104 as shown in message 13 of FIG. 6. The confirmation of a payment order cancellation message should preferably be sent no later than the close of the following business day.

The payment order may be presented in the three models described above: in the four corner model; as an instruction from the buyer to a buyer's bank; or as a direct debit style instruction that is placed by the seller's bank into the clearing and settlement system.

Payment Order Transaction in the Four Corner Model

A typical payment order transaction in the four corner model occurs as follows.

1. Buyer 106 and seller 108 interact through the seller's online systems.
2. At the point of purchase, the seller software presents the payment form for completion by buyer 106.
3. Buyer 106 signs the BuyerSignedData blocks. The block includes the BuyerData block, the SellerPublicData block, the NegotiatedData block and BuyerSignatureDetail block. For a payment order, the BuyerSignedData block may also include an Obligation block with the ObligationType set to NONE.

Note that the buyer role (internally or through facilities provided through seller 108's systems) may require a number of signatures to authorize payment. Subsequent signatures may sign the only the data blocks set out above or additionally sign the BuyerSignature blocks already created.
4. Optionally, seller 108 can check the signature of buyer 106 contained in a PKCS#7 package from the buyer. This step may be optional, since there is generally a requirement for buyer's bank 102 to check the signature of buyer 106 before processing the buyer's mandate.
5. Seller 108 appends SellerPrivateData where appropriate, signs the message and sends the signed message to seller's bank 104.
6. Seller's bank 104 checks seller 108's signature, the status of seller 108's certificate, and the authority and rights assigned to seller 108's certificate. If these checks fail, seller's bank 104 sends a negative service acknowledgement to seller 108
7. If seller 108 has provided account details in either the SellerPublicData or SellerPrivateData blocks, seller's bank 104 validates these account details. Seller's bank 104 may append account details to the message in the SellerbankData block. Seller's bank 104 may also append a correspondent bank code based on the currency of the transaction. Seller's bank 104 removes the SellerPrivateData block from the message.
8. Seller's bank 104 may optionally choose to initiate a challenge-response transaction with buyer's bank 102 dependent on the seller's bank 104's own risk model. If so, seller's bank 104 signs a message that consists of the PayChallenge that contains the SystemHeader and includes seller's bank 104's credentials timestamped and validated by the root.

Buyer's bank 102 then checks the credentials of seller's bank 104, checks that it can process the payment product being requested, and signs a response to seller 108 that includes the validated credentials of buyer's bank 102.

Seller's bank 104 validates the credentials presented by buyer's bank 102. If validation fails, seller's bank 104 sends a service acknowledgement to seller 108 advising of the failure.
9. Seller's bank 104 signs the message and sends it to buyer's bank 102.
10. Buyer's bank 102 checks buyer 106's signature, the status of buyer 106's certificate, and the authority and rights assigned to the buyer's certificate. For payment requests with more than one signature, buyer's bank 102 must ensure that the request contains the correct authority.

If these checks fail, buyer's bank 102 sends a negative service acknowledgement to seller's bank 104. If these checks are successful, buyer's bank 102 sends a positive service acknowledgement including an indication of which reference should be used for customer service issues.

Seller's bank 104 re-signs the service acknowledgement and sends it to seller 108. All acknowledgements include a freshness proof of the acknowledging organization's signing certificate.
11. Buyer's bank 102 also validates account related details. Note that this validation can take place synchronously. If the validation fails, buyer's bank 102 sends a negative PayInstAck. Where account related details are validated synchronously, the PayInstAck may be returned in the same document as the service acknowledgement.
12. On execution of the payment, buyer's bank 102 may send a PayConf to buyer 106 and to seller's bank 104 advising that execution has taken place. A negative PayConf may be produced where the clearing and settlement system fails to process the payment transaction successfully. Seller's bank 104 may send a PayConf to confirm that funds have been successfully received from buyer's bank 102.

Cancellation of a Payment Order Using the Four Corner Model

For revocable payment orders, the payment can be cancelled using a four corner model. Buyer's bank 102 should inform buyer 106 asynchronously as to the success of the cancellation request. A typical cancellation of a payment order in this type of transaction occurs as follows.

1. Buyer 106 and seller 108 arrange cancellation through seller's systems.
2. At the point of purchase, seller 108 presents the cancellation form for completion by buyer 106.
3. Buyer 106 signs the CancBuyerSignedData block. Note that the buyer role (internally or through facilities provided through seller's systems) may require a number of signatures to cancel payment. Subsequent signatures may sign the data blocks set out above and optionally sign previous BuyerSignature blocks.
4. Optionally, seller can check the signature of buyer 106.
5. Seller 108 sends the signed document to seller's bank 104.
6. Seller's bank 104 checks seller 108's signature, the status of seller 108's certificate, and the authority and rights assigned to seller 108's certificate. If these checks fail, seller's bank 104 sends a negative Service Acknowledgement to seller 108.
7. Seller's bank 104 may optionally choose to initiate a challenge-response transaction with buyer's bank 102 dependent on seller's banks own risk model. Seller's bank 104 will sign a message that consists of the PayChallenge which contains the SystemHeader and will include seller's bank 104's credentials timestamped and validated by the root.
   Buyer's bank 102 will check the credentials of seller's bank 104, check that it can process the payment product being requested and sign a response to seller 108 that includes the validated credentials of buyer's bank 102.
   Seller's bank 104 will validate the credentials presented by buyer's bank 102. If validation fails, seller's bank 104 will send a Service Acknowledgement to seller advising of the failure.
8. Seller's bank 104 signs the cancellation message and sends it to buyer's bank 102.
9. Buyer's bank 102 checks buyer 106's signature, the status of buyer 106's certificate, and the authority and rights assigned to buyer 106's certificate. For payment requests with more than one signature, buyer's bank 102 ensures that the CancellationRequest contains the correct authority.
   If these checks fail, buyer's bank 102 sends a negative Service Acknowledgement to seller's bank 104. If these checks are successful, buyer's bank 102 sends a positive Service Acknowledgement including an indication of which reference should be used for customer service issues.
   Seller's bank 104 re-signs the service acknowledgement and sends it to seller 108. All acknowledgements include a freshness proof of the acknowledging organizations signing certificate.
10. Buyer's bank 102 will then process the Cancellation Request. Buyer's bank 102 may send a positive CancellationConf to seller's bank 104 and to buyer 106 if the cancellation is successfully executed. If the cancellation cannot be executed a negative CancellationConf will be generated. Where the Cancellation Request can be processed synchronously, the CancellationConf can be provided with the Service Acknowledgement.

Payment Order Transaction in the Buyer to Buyer's Bank Model

Buyer to buyer's bank transactions ensure that the payment products can be delivered in procurement and other buyer technologies. A typical buyer to buyer bank transaction for a payment order occurs as follows.
1. Buyer 106 and seller 108 interact through seller's online systems.
2. Buyer 106 places the payment order directly with buyer's bank 102.
3. Buyer 106 signs buyerSignedData blocks. The block includes buyerData block, sellerPublicData block, the NegotiatedData block and BuyerSignatureDetail block. For a payment order buyerSignedData block will also include an Obligation block with the ObligationType set to NONE.
   Note that the buyer role (internally or through facilities provided through seller's systems) may require a number of signatures to authorize payment. Subsequent signatures may sign the only the data blocks set out above or additionally sign buyerSignature blocks already created.
4. Buyer 106 signs the document and sends it to buyer's bank 102.
5. Buyer's bank 102 checks buyer 106's signature, the status of buyer 106's certificate, and the authority and rights assigned to buyer 106's certificate. For payment requests with more than one signature, buyer's bank 102 must ensure that the request contains the correct authority.
   If these checks fail, buyer's bank 102 sends a negative Service Acknowledgement to buyer. If these checks are successful, buyer's bank 102 will send a positive Service Acknowledgement including an indication of which reference should be used for customer service issues.
6. Buyer's bank 102 validates account related details. Note that this validation can take place synchronously. If the validation fails, buyer's bank 102 will send a negative PayInstAck. Where account related details are validated synchronously, the PayInstAck may be returned in the same document as the Service Acknowledgement.
7. On execution of the payment, buyer's bank 102 may send a PayConf to buyer 106 advising that payment has taken place. A negative PayConf may be produced where the clearing and settlement system fails to process the payment transaction successfully.

Cancellation of a Payment Order Using the Buyer to Buyer's Bank Model

For revocable payment orders, the payment can be cancelled using the buyer to buyer's bank model. The following describes a typical payment order cancellation through this model.
1. Buyer 106 through its own internal systems or through the systems of its financial institutions looks to cancel a payment order.
2. Buyer 106 signs the SystemHeader and References blocks. Note that the buyer role may require a number of signatures to cancel payment. Subsequent signatures may sign the data blocks set out above and optionally sign previous BuyerSignature blocks.
3. Buyer 106 sends it to buyer's bank 102.
4. Buyer's bank 102 checks buyer 106's signature, the status of buyer 106's certificate, and the authority and rights assigned to buyer 106's certificate. For payment requests with more than one signature, buyer's bank 102 must ensure that the CancellationRequest contains the correct authority.
   If these checks fail, buyer's bank 102 sends a negative Service Acknowledgement to buyer. If these checks are successful, buyer's bank 102 will send a positive Service Acknowledgement including an indication of which reference should be used for customer service issues.
5. Buyer's bank 102 will then process the Cancellation Request. Buyer's bank 102 may send a positive CancellationConf to buyer 106 if the cancellation is successfully executed. If the cancellation cannot be executed a negative CancellationConf will be generated. Where the Cancellation Request can be processed synchronously, the CancellationConf can be provided with the Service Acknowledgement.

Payment Order Transaction in the Direct Debit Model

Use of the direct debit model in the present invention allows payment products to be used in conjunction with clearing and settlement networks that allow direct debit style payments. This type of transaction may be used in accordance with the rules of individual clearing houses. A typical payment order transaction using the direct debit model occurs as follows.

1. Buyer 106 and seller 108 interact through seller's online service. The commercial transaction is to be settled through a direct debit style network with the instruction being placed into the clearing and settlement system by seller's bank 104.
2. Buyer 106 signs buyerSignedData block which contains BuyerData, SellerPublicData and Negotiated Data which constitute the mandate authorizing seller to debit buyer's account.
3. Seller 108 optionally checks buyer 106's signature. Although this is recommended, this is not mandatory. It is preferable that buyer's bank 102 checks buyer 106's signature prior to authorizing a debit from buyer 106's account.
4. Seller 108 appends to buyerSignedData sellerPrivateData block as required and signs and sends to seller's bank 104.
5. Seller's bank 104 checks the signature of seller, the syntax of the message and the authority of seller 108. If any of these checks fail, seller's bank 104 sends a negative ServiceAck to seller 108.
6. Seller's bank 104 signs and sends to buyer's signed mandate to buyer's bank 102. Note that seller's bank 104 can optionally initiate a system challenge-response if required to positively validate the identity of the corresponding institution prior to submitting application data.

Buyer's bank 102 checks the signature(s) of buyer 106, the syntax of the message and the authority of buyer 106. If any of these checks fail, buyer's bank 102 sends a negative ServiceAck to seller's bank 104 who includes this as a RelatedAcknowledgement in a ServiceAck to seller. Buyer's bank 102 authorizes debiting of buyer 106's account on confirmation of buyer's mandate.
7. On receiving a positive SvrAck, seller's bank 104 creates the payment [debit] instruction in the appropriate back end payment system. A positive SvrAck is passed to seller 108.
8. On executing the payment instruction, seller's bank 104 can optionally inform seller 108 and buyer's bank 102 that the debit instruction has been executed.
9. On receiving funds in seller 108's account, seller's bank 104 can optionally send a Payment Confirmation to seller 108 and to buyer's bank 102 advising of the receipt of funds.

Cancellation of a Payment Order Using the Direct Debit Model

Depending on the rules of the Direct Debit network and/or policy of member banks, Direct Debit instructions may also be cancelled in a two party (buyer to buyer's bank and seller to seller's bank) or four party model. The following describes a typical cancellation in the four party model.

1. Buyer 106 and seller 108 arrange cancellation through seller 108's systems.
2. At the point of purchase, seller 108 presents the cancellation form for completion by buyer 106.
3. Buyer 106 signs the CancBuyerSignedData block which includes the reference information of the commercial transaction to be cancelled. Note that the buyer role (internally or through facilities provided through seller's systems) may require a number of signatures to cancel payment. Subsequent signatures may sign the data blocks set out above and optionally sign previous BuyerSignature blocks.
4. Optionally, seller 108 can check the signature of buyer 106.
5. Seller 108 sends the signed document to seller's bank 104.
6. Seller's bank 104 checks seller 108's signature, the status of seller 108's certificate, and the authority and rights assigned to seller 108's certificate. If these checks fail, seller's bank 104 sends a negative Service Acknowledgement to seller 108.
7. If the scheme rules require seller's bank 104 to check the validity of buyer 106's signature before cancelling the payment, seller's bank 104 initiates Step 8 otherwise seller's bank cancels the payment and optionally advises buyer's bank 102 and seller with a Cancellation Confirmation.
8. Seller's bank 104 signs the cancellation message and sends it to buyer's bank 102.
9. Buyer's bank 102 checks buyer 106's signature, the status of buyer 106's certificate, and the authority and rights assigned to buyer 106's certificate. For payment requests with more than one signature, buyer's bank must ensure that the CancellationRequest contains the correct authority.

If these checks fail, buyer's bank 102 sends a negative Service Acknowledgement to seller's bank 104. If these checks are successful, buyer's bank 102 will send a positive Service Acknowledgement including an indication of which reference should be used for customer service issues. Seller 108 will then cancel payment. Note that the response to the Cancellation Request from buyer's bank 102 in this instance is a ServiceAck. It is seller's bank 104 which initiates the CancellationConf.

Seller's bank 104 re-signs the service acknowledgement and sends it to seller 108. All acknowledgements include a freshness proof of the acknowledging organizations signing certificate.

Payment Obligation Message Flow

Figure 7:
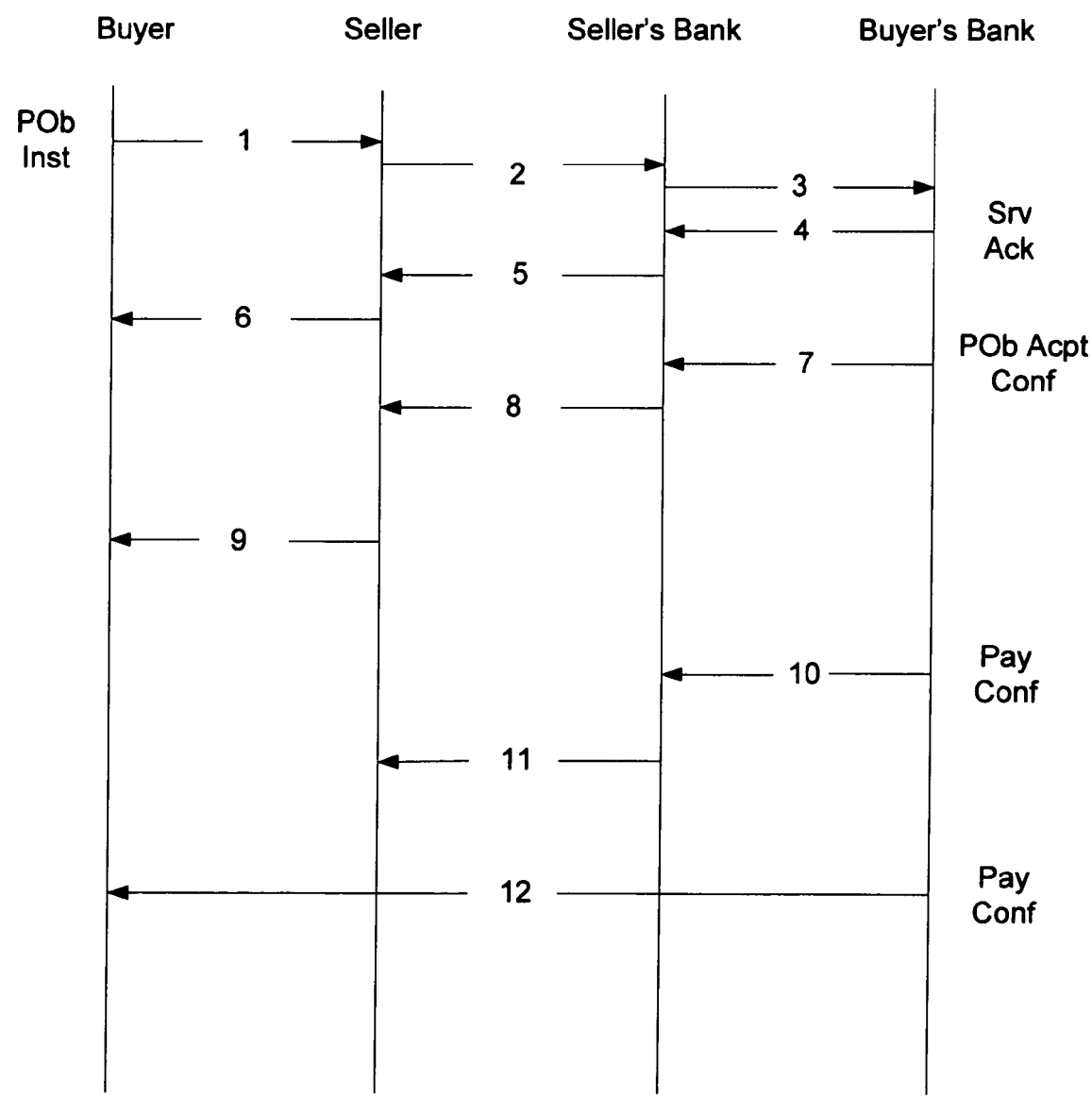
FIG. 7 is a diagram illustrating a preferred embodiment of the message flow for processing a payment obligation.

A preferred general message flow for processing a payment obligation is shown in FIG. 7. Before the first message in the process, buyer 106 and seller 108 identify each other through their respective certificates and agree on the purchase and sales agreement. Buyer 106 then agrees to pay for the transaction with a payment obligation (see Tables 4 and 5 above) from buyer 106 to buyer's bank 102.

Buyer 106 accepts the payment method, reviews the payment obligation instruction for acceptability, completes the buyer section of the payment obligation instruction, and then signs the payment obligation instruction. The payment obligation instruction is then sent to seller 108 as shown in message 1 of FIG. 7.

Seller 108 reviews the payment obligation instruction for acceptability, completes its section of the order (see Tables 4 and 5 above), signs the amended message, and sends it to seller's bank 104 as shown in message 2 of FIG. 7.

Seller's bank 104 reviews the payment obligation instruction for acceptability, verifies seller's certificate, completes its section of the order (see Tables 4 and 5 above), and signs the amended message. The message is then sent to buyer's bank 102 as shown in message 3 of FIG. 7.

Buyer's bank 102 reviews the payment obligation instruction for acceptability and verifies the message syntax, the validity of certificate and signature, and the authority of the signer. Buyer's bank 102 then creates a service acknowledgment message (see Table 9 above) with the results of these checks. Buyer's bank 102 then signs and sends the service acknowledgment to seller's bank 104 as shown in message 4 of FIG. 7.

Seller's bank 104 reviews the service acknowledgment, amends it with its details if necessary, and signs the amended message. The amended service acknowledgment message is then sent to seller 108 as shown in message 5 of FIG. 7.

Seller reviews the service acknowledgment, amends it with details if necessary, and signs the amended message. The amended service acknowledgment is then sent to buyer 106 as shown in message 6 of FIG. 7.

Buyer's bank 102 creates a payment obligation acceptance confirmation message (see Table 13 above) to signify whether the payment obligation has been accepted. Buyer's bank 102 then signs the payment obligation acceptance confirmation and sends it to seller's bank 104 as shown in message 7 of FIG. 7.

Seller's bank 104 reviews the payment obligation acceptance confirmation, amends with its details if necessary, signs the amended message, and sends it to seller 108 as shown in message 8 of FIG. 7.

Buyer's bank 102 reviews the confirmation of a payment execution, amends it with its details if necessary, signs the amended message, and sends it to seller 108 as shown in message 9 of FIG. 7.

When the date and time specified in the payment obligation instruction has been reached, the payment obligation is executed, preferably utilizing the bank's existing payment infrastructure.

Buyer's bank 102 creates confirmation of a payment execution (see FIG. 11 above) to signify that the payment obligation has been executed. Buyer's bank 102 then signs this message and sends it to seller's bank 104, as shown in message 10 of FIG. 7. The confirmation of a payment execution indicates whether this payment obligation has been executed successfully or not. At a minimum, the confirmation of a payment execution message should preferably be sent no later than the close of the following business day.

Seller's bank 104 reviews the confirmation of a payment execution, amends the confirmation of a payment execution information with its details, signs the amended message, and sends it to seller 108 as shown in message 111 of FIG. 7.

Buyer's bank 102 creates a confirmation of a payment execution message to signify that the payment order has been executed. Buyer's bank 102 then signs this message and sends it to buyer 106 as shown in message 12 of FIG. 7. The confirmation of a payment execution indicates whether this payment obligation has been executed successfully or not. If the payment execution has failed, a more detailed description of the reasons is sent to buyer 106 than would have been sent to seller's bank 104 and to seller 108. At a minimum, the confirmation of a payment execution message is preferably sent no later than the close of the following business day.

Payment Obligation Transaction in the Four Corner Model

A payment obligation may be used in either the four corner or buyer to buyer's bank model. A typical payment obligation transaction in the four corner model occurs as follows.

1. Buyer 106 and seller 108 interact through seller's online systems.
2. At the point of purchase, seller software presents the payment form for completion by buyer 106.
3. Buyer 106 signs buyerSignedData blocks. The block includes buyerData block, sellerPublicData block, the NegotiatedData block and BuyerSignatureDetail block. For a Payment Obligation buyerSignedData block will also include an Obligation block with the ObligationType set to BUYER.

Note that the buyer role (internally or through facilities provided through seller's systems) may require a number of signatures to authorize payment. Subsequent signatures may sign the only the data blocks set out above or additionally sign buyerSignature blocks already created. Optionally, seller 108 can check the signature of buyer 106. It is generally a requirement that in processing payment, buyer's bank 102 validates the certificate of buyer 106.

4. Seller 108 appends SellerPrivateData where appropriate, signs the message and sends the signed message to seller's bank 104.
5. Seller's bank 104 checks seller 108's signature, the status of seller 108's certificate, and the authority and rights assigned to seller 108's certificate. If these checks fail, seller's bank 104 sends a negative Service Acknowledgement to seller 108.
6. If seller 108 has provided account details in either sellerPublicData or SellerPrivateData blocks, seller's bank 104 will validate these account details. Seller's bank 104 will append account details to the message in sellerbankData block. Seller's bank 104 will also append a correspondent bank code based on the currency of the transaction. Seller's bank 104 removes sellerPrivateData block from the message.
7. Seller's bank 104 may optionally choose to initiate a challenge-response transaction with buyer's bank 102 dependent on seller's bank 104's own risk model. Seller's bank 104 will sign a message that consists of the PayChallenge which contains the SystemHeader and will include seller's bank credentials timestamped and validated by the root.

Buyer's bank 102 will check the credentials of seller's bank 104, check that it can process the payment product being requested and sign a response to seller 108 that includes the validated credentials of buyer's bank 102.

Seller's bank 104 will validate the credentials presented by buyer's bank 102. If validation fails, seller's bank 104 will send a Service Acknowledgement to seller 108 advising of the failure.

8. Seller's bank 104 signs the message and sends it to buyer's bank 102.
9. Buyer's bank 102 checks buyer 106's signature, the status of buyer 106's certificate, and the authority and rights assigned to buyer 106's certificate. For payment requests with more than one signature, buyer's bank 102 must ensure that the request contains the correct authority.

If these checks fail, buyer's bank 102 sends a negative Service Acknowledgement to seller's bank 104. If these checks are successful, buyer's bank 102 will send a positive Service Acknowledgement including an indication of which reference should be used for customer service issues.

Seller's bank 104 re-signs the service acknowledgement and sends it to seller 108. All acknowledgements include a freshness proof of the acknowledging organizations signing certificate.

10. Buyer's bank 102 validates account related details. Note that this validation can take place synchronously. If the validation fails, buyer's bank 102 will send a negative PayInstAck. Where account related details are validated synchronously, the PayInstAck may be returned in the same document as the Service Acknowledgement.

11. On execution of the payment, buyer's bank 102 may send a PayConf to buyer 106 and to seller's bank 104 advising that execution has taken place. A negative PayConf may be produced where the clearing and settlement system fails to process the payment transaction successfully. Seller's bank 104 may send a PayConf to confirm that funds have been successfully received from buyer's bank 102.

Cancellation of a Payment Obligation Using the Four Corner Model

For payment obligations, the payment can be cancelled using the following four corner model process or an out of band process that includes positive assent to the cancellation by seller.

1. Buyer 106 and seller 108 arrange cancellation through seller's systems.
2. At the point of purchase, seller 108 presents the cancellation form for completion by buyer 106.
3. Buyer 106 signs the CancBuyerSignedData block. Note that the buyer role (internally or through facilities provided through seller's systems) may require a number of signatures to cancel payment. Subsequent signatures may sign the data blocks set out above and optionally sign previous BuyerSignature blocks.
4. Optionally, seller 108 can check the signature of buyer 106.
5. Seller 108 sends the signed document to seller's bank 104.
6. Seller's bank 104 checks seller 108's signature, the status of seller 108's certificate, and the authority and rights assigned to seller 108's certificate. If these checks fail, seller's bank 104 sends a negative Service Acknowledgement to seller 108.
7. Seller's bank 104 may optionally choose to initiate a challenge-response transaction with buyer's bank dependent on seller's bank 104's own risk model. If so, seller's bank 104 will sign a message that consists of the PayChallenge that contains the SystemHeader and will include seller's bank 104's credentials timestamped and validated by the root.

Buyer's bank 102 will check the credentials of seller's bank 104, check that it can process the payment product being requested and sign a response to seller 108 that includes the validated credentials of buyer's bank 102.

Seller's bank 104 will validate the credentials presented by buyer's bank 102. If validation fails, seller's bank 104 will send a Service Acknowledgement to seller advising of the failure.
8. Seller's bank 104 signs the cancellation message and sends it to buyer's bank 102.
9. Buyer's bank 102 checks buyer 106's signature, the status of buyer 106's certificate, and the authority and rights assigned to buyer 106's certificate. For Payment Requests with more than one signature, buyer's bank 102 must ensure that the CancellationRequest contains the correct authority.

If these checks fail, buyer's bank 102 sends a negative Service Acknowledgement to seller's bank. If these checks are successful, buyer's bank 102 will send a positive Service Acknowledgement including an indication of which reference should be used for customer service issues.

Seller's bank 104 re-signs the service acknowledgement and sends it to seller 108. All acknowledgements include a freshness proof of the acknowledging organizations signing certificate.
10. Buyer's bank 102 will then process the Cancellation Request. Buyer's bank 102 may send a positive CancellationConf to seller's bank 104 and to buyer 106 if the cancellation is successfully executed. If the cancellation cannot be executed a negative CancellationConf will be generated. Where the Cancellation Request can be processed synchronously, the CancellationConf can be provided with the Service Acknowledgement. If the transaction cannot be identified, a negative Cancellation Request document will be generated Payment Obligation Transaction in the Buyer to Buyer's Bank Model A typical payment obligation transaction in the buyer to buyer's bank model occurs as follows.

1. Buyer 106 and seller 108 interact through seller's online systems.
2. Buyer 106 requests the payment obligation directly with buyer's bank 102.
3. Buyer 106 signs buyerSignedData block. Buyer 106 will complete sellerPublicData including provision of seller 108's account details and indicating that buyer 106 is undertaking an obligation to seller 108 to pay that can only be revoked with the agreement of seller 108. For a payment obligation, the ObligationType attribute of the Obligation block is set to BUYER.

Note that the buyer role may require a number of signatures to authorize payment. Subsequent signatures may sign the only the data blocks set out above or additionally sign buyerSignature blocks already created.
4. Buyer 106 signs the document and sends it to buyer's bank.
5. Buyer's bank 102 checks buyer 106's signature, the status of buyer 106's certificate, and the authority and rights assigned to buyer 106's certificate. For payment obligation requests with more than one signature, buyer's bank 102 must ensure that the request contains the correct authority.

If these checks fail, buyer's bank 102 sends a negative Service Acknowledgement to buyer 106. If these checks are successful, buyer's bank 102 will send a positive Service Acknowledgement including an indication of which reference should be used for customer service issues.

For payment obligations, buyer's bank 102 will include an ObligationConf Block with the ServiceAck that indicates buyer 106 has undertaken that obligation.
6. Buyer's bank 102 validates account related details. Note that this validation can take place synchronously. If the validation fails, buyer's bank 102 will send a negative PayInstAck. Where account related details are validated synchronously, the PayInstAck may be returned in the same document as the Service Acknowledgement.
7. On execution of the payment, buyer's bank 102 may send a PayConf to buyer 106 and advising that payment has taken place. A negative PayConf may be produced where the clearing and settlement system fails to process the payment transaction successfully.

Payment obligations generally cannot be cancelled using the buyer to buyer's bank model.

Certified Payment Obligation Message Flow

In a preferred embodiment, the certified payment obligation product may employ the same general message flow as shown in FIG. 7 except that a CePOb Inst message is substituted for POb Inst and a CePOb Acpt Conf message is substituted for POb Acpt Conf.

Certified Payment Obligation Transaction in the Four Corner Model

In the four corner model, a certified payment obligation transaction typically occurs as follows.

1. Buyer 106 and seller 108 interact through seller's online systems.
2. At the point of purchase, seller software presents the payment form for completion by buyer. This includes the requirement that a Certified Payment Obligation be put in place with seller.
3. Buyer 106 signs buyerSignedData block. Note that the buyer role (internally or through facilities provided through seller's systems) may require a number of signatures to authorize payment. For a Certified Payment Obligation, the ObligationType attribute of the Obligation block is set to BANK.
4. Optionally, seller 108 can check the signature of buyer 106. It is generally a strong requirement that in processing payment buyer's bank 102 validates the certificate of buyer 106.
5. Seller 108 appends SellerPrivateData where appropriate, signs the message and sends the signed message to seller's bank 104.
6. Seller's bank 104 checks seller 108's signature, the status of seller 108's certificate, and the authority and rights assigned to seller 108's certificate. If these checks fail, seller's bank 104 sends a negative Service Acknowledgement to seller 108.
7. If seller 108 has provided account details in either sellerPublicData or SellerPrivateData blocks, seller's bank 104 will validate these account details. Seller's bank 104 will append account details to the message in sellerbankData block. Seller's bank 104 will also append a correspondent bank code based on the currency of the transaction. Seller's bank 104 removes sellerPrivateData block from the message.
8. Seller's bank 104 may optionally choose to initiate a challenge-response transaction with buyer's bank dependent on seller's banks own risk model. If so, seller's bank 104 will sign a message that consists of the PayChallenge which contains the SystemHeader and will include seller's bank 104's credentials timestamped and validated by the root.

Buyer's bank 102 will check the credentials of seller's bank 104, check that it can process the payment product being requested and sign a response to seller that includes the validated credentials of buyer's bank 102.

Seller's bank 104 will validate the credentials presented by buyer's bank 102. If validation fails, seller's bank 104 will send a Service Acknowledgement to seller 108 advising of the failure.
9. Seller's bank 104 signs the message and sends it to buyer's bank 102.
10. Buyer's bank 102 checks buyer 106's signature, the status of buyer 106's certificate, and the authority and rights assigned to buyer 106's certificate. For payment requests with more than one signature, buyer's bank must ensure that the request contains the correct authority.

If these checks fail, buyer's bank 102 sends a negative Service Acknowledgement to seller's bank 104. If these checks are successful, buyer's bank 102 will send a positive Service Acknowledgement including an indication of which reference should be used for customer service issues. Seller's bank 104 re-signs the service acknowledgement and sends it to seller 108. All acknowledgements include a freshness proof of the acknowledging organizations signing certificate.
11. Buyer's bank 102 validates account related details. Note that this validation can take place synchronously. If the validation fails, buyer's bank 102 will send a negative PayInstAck. Where account related details are validated synchronously, the PayInstAck may be returned in the same document as the Service Acknowledgement.
12. Buyer's bank 102 will check the check the limit currently assigned against the card/corporate in line with internal risk policy. If buyer's bank 102 accepts the liability and certifies an obligation, a positive ObligationConf is sent from buyer's bank 102 to seller's bank 104. If buyer's bank 102 does not agree to the obligation, a negative Obligation Conf response is sent from buyer's bank 102 to seller's bank 104. The response should be sent by the end of the next working day and can be sent synchronously with the ServiceAck where a financial institutions systems support synchronous acceptance of such risks.
13. On execution of the payment, buyer's bank 102 may send a PayConf to buyer 106 and to seller's bank 104 advising that execution has taken place. A negative PayConf may be produced where the clearing and settlement system fails to process the payment transaction successfully. Seller's bank 104 may send a PayConf to confirm that funds have been successfully received from buyer's bank 102.

Cancellation of a Certified Payment Obligation Using the Four Corner Model

For Certified Payment Obligations, the payment can be cancelled using the following four corner model process or an out of band process that includes positive assent to the cancellation by seller.

1. Buyer 106 and seller 108 arrange cancellation through seller's systems.
2. At the point of purchase, seller 108 presents the cancellation form for completion by buyer 106.
3. Buyer 106 signs the CancBuyerSignedData blocks. Note that the buyer role (internally or through facilities provided through seller's systems) may require a number of signatures to cancel payment. Subsequent signatures may sign the data blocks set out above and optionally sign previous BuyerSignature blocks.
4. Optionally, seller 108 can check the signature of buyer 106.
5. Seller 108 sends the signed document to seller's bank 104.
6. Seller's bank 104 checks seller 108's signature, the status of seller 108's certificate, and the authority and rights assigned to seller 108's certificate. If these checks fail, seller's bank 104 sends a negative Service Acknowledgement to seller 108.
7. Seller's bank 104 may optionally choose to initiate a challenge-response transaction with buyer's bank 102 dependent on seller's bank 104's own risk model. Seller's bank 104 will sign a message that consists of the PayChallenge which contains the SystemHeader and will include seller's bank 104's credentials timestamped and validated by the root. Buyer's bank 102 will check the credentials of seller's bank 104 and check that it can process the payment product being requested. Seller's bank 104 will validate the credentials presented by buyer's bank 102. If validation fails, seller's bank 104 will send a Service Acknowledgement to seller 108 advising of the failure.
8. Seller's bank 104 signs the cancellation message and sends it to buyer's bank 102.

9. Buyer's bank 102 checks buyer 106's signature, the status of buyer 106's certificate, and the authority and rights assigned to buyer 106's certificate. For payment requests with more than one signature, buyer's bank 102 must ensure that the CancellationRequest contains the correct authority.

If these checks fail, buyer's bank 102 sends a negative Service Acknowledgement to seller's bank 104. If these checks are successful, buyer's bank 102 will send a positive Service Acknowledgement including an indication of which reference should be used for customer service issues.

Seller's bank 104 re-signs the service acknowledgement and sends it to seller 108. All acknowledgements include a freshness proof of the acknowledging organizations signing certificate.

10. Buyer's bank 102 will then process the Cancellation Request. Buyer's bank 102 may send a positive CancellationConf to seller's bank 104 and to buyer 106 if the cancellation is successfully executed. If the cancellation cannot be executed a negative CancellationConf will be generated. Where the Cancellation Request can be processed synchronously, the CancellationConf can be provided with the Service Acknowledgement. If the transaction cannot be identified, a negative Cancellation Request document will be generated.

Certified Payment Obligation Transaction in the Buyer to Buyer's Bank Model

In the buyer to buyer's bank model, a certified payment obligation transaction typically occurs as follows.

1. Buyer 106 and seller 108 interact through seller's online systems.
2. Buyer 106 requests the payment obligation directly with buyer's bank 102.
3. Buyer 106 signs buyerSignedData blocks. Buyer 106 will complete sellerPublicData including provision of seller 108's account details and indicating that buyer 106 is undertaking an obligation to seller 108 to pay that can only be revoked with the agreement of seller 108. For certified payment obligations, the ObligationType attribute in the Obligation element is set to the value BANK.

Note that the buyer role may require a number of signatures to authorize payment. Subsequent signatures may sign the only the data blocks set out above or additionally sign buyerSignature blocks already created.
4. Buyer 106 signs the document and sends it to buyer's bank 102.
5. Buyer's bank 102 checks buyer 106's signature, the status of buyer 106's certificate, and the authority and rights assigned to buyer 106's certificate. For payment obligation requests with more than one signature, buyer's bank 102 must ensure that the request contains the correct authority.

If these checks fail, buyer's bank 102 sends a negative Service Acknowledgement to buyer 106. If these checks are successful, buyer's bank 102 will send a positive Service Acknowledgement including an indication of which reference should be used for customer service issues.

For payment obligations, buyer's bank 102 will provide an ObligationConf Block that indicates buyer 106 has undertaken that obligation. Where an institution can synchronously process the obligation request, the ObligationConf may be included with the ServiceAck. The ObligationConf should again be provided no later than at the end of the next working day to the day on which the request was made.
6. Buyer's bank 102 validates account related details. Note that this validation can take place synchronously. If the validation fails, buyer's bank 102 will send a negative PayInstAck. Where account related details are validated synchronously, the PayInstAck may be returned in the same document as the Service Acknowledgement.
7. On execution of the payment, buyer's bank 102 may send a PayConf to buyer 106 and advising that payment has taken place. A negative PayConf may be produced where the clearing and settlement system fails to process the payment transaction successfully.

Certified Payment Obligations generally cannot be cancelled using the buyer to buyer's bank model.

Conditional Payments

As indicated, conditions may be attached to all three payment products described above to form three conditional payment products.

Management of Conditions in Conditional Payments

Ground rules may be applied in the present invention to govern the relationship between the creation and management of conditions and obligations. In a preferred embodiment, the following ground rules for the use of conditions with payment instructions apply:

1. All conditions will initially be defined by a payments group and published centrally. A preferred set of condition codes and descriptions are described above.
2. The conditions are managed by a Trusted Service Supplier (TSS).
3. The Third Party Service Provider will discharge the condition—signing a statement with a system token that the condition has been met. Once the conditions which attach to a payment have been discharged, the instruction will be executed.
4. The conditions may be offered by seller 108 or entered by buyer 106.
5. The condition has two parts: the generic statement of the condition (as defined by the system) and details that pertain to the particular transaction.
6. Each condition within a payment must be assigned a Third Party Service Provider—an authority who will sign to confirm that the condition has been discharged. The authority may be a corporate entity, a group within that entity, or an individual. TSPS organizations preferably implement appropriate control on the authority to sign. The TPSP should be identified by at least an email address.
7. Condition management remains independent of the transaction.
8. Validation of TPSP certificate must be included in processing the response from the TPSP. The TPSP may have been issued with a certificate by a third party institution.
9. The TPSP should be able to perform a certificate status check on the certificate presented by the financial institution with his institution.
10. Attachments can be attached by the TPSP when discharging the condition. This should not be processed by buyer bank 102 but included in the acknowledgement to buyer 106's system. All attachments are forwarded once all conditions which apply to a payment ("the condition set") have been discharged.
11. The payment-condition relationship is a one-to-many relationship. One payment may have a number of conditions that must be met before payment is executed. Conditions do not apply to more than a single payment.
12. The rules for cancellation of conditional payment products follow the rules for cancellation of the non-conditional products. The condition management system should be informed if a conditional payment is cancelled. The TPSP will receive a message from the financial institution indicating that the conditions have been cancelled.

Lifecycle of Conditions in Conditional Payments

Preferably, the lifecycle of the conditions is determined as follows:

1. The conditions that attach to a payment are agreed between buyer 106 and seller 108 as part of the payment negotiation. The status of each condition and the condition set prior to acceptance into the condition management system (TSS) is: Requested.
2. In the four corner model, the conditions are signed by buyer 106 and resigned by seller 108. In the buyer to buyer's bank model, buyer 106 provides details of the conditions that apply to seller 108.
3. Seller's bank 104 logs the conditions locally before processing the document.
4. The conditions that attach to a payment are lodged in the Condition Management System at buyer's bank 102.
5. A ConditionSetUpConf document is generated and sent to seller's bank 104 (or to buyer 106 in the buyer to buyer's bank model) confirming that the conditions exist in the Condition Management System (TSS). The Status of the conditions is: Incomplete.
6. The Condition Management System informs the Third Party Service Provider (TPSP) that the conditions attached to the payment exist.
7. The TPSP may send an update message to the Condition Management System to update the status of any one of the conditions attached to the payment of which the TPSP is assigned signoff. The PayCondition document is used to inform all parties in the transaction of a change in status of the condition.
8. The status of any condition attached to a payment, once signed off, is: Discharged. Once all conditions have been discharged, the ConditionSet has the status Discharged.
9. Any attachments assigned to a condition on discharge by a TPSP should not be forwarded to seller 108 until all conditions have been discharged and the payment instruction released.
10. Each condition has an expiry date. Where a condition expires, the ConditionSet cannot be discharged and should be marked as: Expired. A PayCondition document should be sent to the participants in the transaction to inform them that the condition has expired.
11. Where a conditional payment is cancelled, all conditions that attach to a payment are marked as cancelled. The TPSP should be informed using a PayCondition document with all Status fields set to: Cancelled.

Rules Governing Conditions in Conditional Payments

In addition, the following rules preferably govern the processing of conditional obligations in the present invention:

1. Obligations should be accepted even if conditions are attached.
2. Conditions should not be registered until the obligation has been registered successfully. Where an obligation is refused, a negative ConditionSetUpConf should be sent to buyer 106 (in the buyer to buyer's bank model) or to seller's bank 104 (in the four corner model).
3. The ownership of an obligation cannot be transferred until the conditions have been discharged.
4. If the conditions expire or are cancelled, the Obligation Management function must be informed to release the limit reserved against that conditional payment.

Conditional Payment Order Message Flow

In a preferred embodiment, much of the message flow for the conditional payment order product is the same as for the payment order product described above except that a CPOr Inst is substituted for a POr Inst in message 1 of FIG. 6. Additional processes, however, are added to subject execution of the payment order to occurrence of a condition. Conditions are preferably set by a TSS and must be met by one or more TPSPs before payment is made. One embodiment of these additional processes is shown in FIG. 8.

The condition details may be supplied to the TSS by buyer's bank 102. In this case, the TSS may inform buyer's bank 102 when a condition has been met so that buyer's bank 102 may respond accordingly. Alternatively, buyer's bank 102 may act as the TSS.

Figure 8:
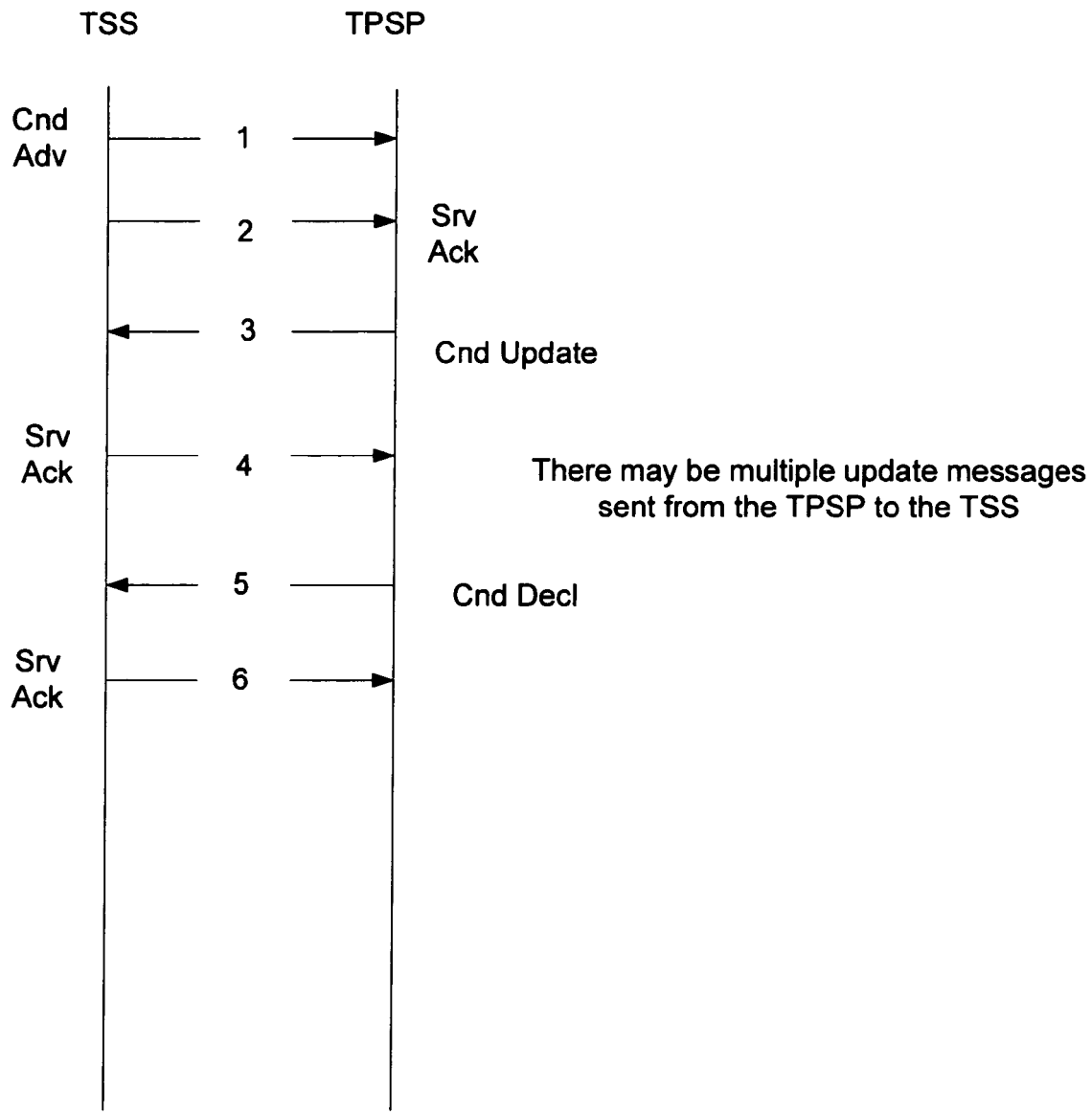
FIG. 8 is a diagram illustrating a preferred embodiment of the message flow for processing payment conditions.

Turning to FIG. 8, the trusted service supplier creates a condition advice message (see Table 8 above) which specifies a condition that must be met by the third party service provider before a payment can be executed. The trusted service supplier then signs the condition advice message and sends it to the third party service provider as shown in message 1 of FIG. 8.

The third party service supplier reviews the condition advice for acceptability, verifies the message syntax, the validity of certificate and signature, and authority of the signer. The third party service supplier then creates a service acknowledgment message with the results of these checks. The third party service provider then signs the service acknowledgment and sends it to the trusted service supplier as shown in message 2 of FIG. 8.

The third party service provider creates a condition update message to inform the trusted service supplier of a completed step in the condition fulfillment process. The third party service provider signs the message and sends it to the trusted service supplier as shown in message 3 of FIG. 8. It should be noted that multiple update messages may be sent for each condition.

The trusted service supplier reviews the condition update message for acceptability, verifies the message syntax, the validity of the certificate and the signature, and the authority of the signer. The trusted service supplier then creates a service acknowledgment (see Table 9 above) with the results of these checks. The trusted service supplier then signs and sends the service acknowledgment to the third party service supplier as shown in message 4 of FIG. 8.

The third party service provider creates a condition declaration message (see Table 16 above) in order to inform the trusted service supplier of a fulfillment of the condition process. This message may be either positive or negative. The third party service provider signs the message and sends it to the trusted service supplier as shown in message 5 of FIG. 8.

The trusted service supplier reviews the conditional declaration message for acceptability, and verifies the message syntax, the validity of the certificate and signature, and the authority of the signer. The trusted service supplier then creates a service acknowledgment message (see Table 9 above) with the results of these checks. The trusted service supplier signs the service acknowledgment and sends it to the third party service provider as shown in message 6 of FIG. 8.

Conditional Payment Obligation Message Flow

In a preferred embodiment, much of the message flow for the conditional payment obligation product is the same as for the payment obligation product described above except that a CPOb Inst is substituted for a POb Inst in message 1 of FIG. 7. Additional processes, however, are added to subject execution of the payment obligation to occurrence of a condition.

Conditions are preferably set by the trusted service supplier and must be met by one or more third party service providers before payment is made. In a preferred embodiment, the condition process may be the same as that described above in connection with FIG. 8.

Certified Conditional Payment Obligation Message Flow

In a preferred embodiment, the certified conditional payment obligation product may employ the same message flow outlined in connection with the conditional payment obligation above (with the additional condition process included), except that a CePOb Inst message is substituted for CPOb Inst and a CePOb Acpt Conf message is substituted for CPOb Acpt Conf.

As described in detail above, message formats preferably adhere to open standards to ensure compatibility across national boundaries due to the global nature of the payments system. For example, the use of multi-byte character sets in order to accommodate different languages is preferred.

Also preferably, payment transactions are date and time stamped by each of the parties involved in the payment system. In a preferred embodiment, time stamps are based on Universal Time Code (U.T.C.) format, and produced by a third party trusted time server.

In a preferred embodiment, all payment related messages are secured through the use of certificates issued from trusted certification authorities. In a preferred embodiment, these certificates are used to digitally sign messages, providing message authentication, integrity, and non-repudiation.

In a preferred embodiment, the confidentiality of all information exchanged between parties in the payments system is maintained and that information is protected from unauthorized access. Encryption of at least 128-bit strength is preferably employed, using SSLv3/TLS.

In a preferred embodiment, the present payments system provides comprehensive error handling which preferably covers the following areas: message related errors including but not limited to message syntax, message signature verification/authentication, message data such as incorrect bank identification codes, and payment authorization; message specific errors including but not limited to failing to meet set conditions; and payment systems infrastructure errors including but not limited to transmission problems and time-out problems.

In a preferred embodiment, all payment initiation messages are idempotent. For example, when a payment order instruction is sent and no service acknowledgment is received within a specified time limit, the payment order instruction may be sent again, without the intended recipient of this message acting upon this request message twice.

Also, while the system of the present invention preferably includes the automatic processing of acknowledgements as described, participants may also choose to provide acknowledgements through many channels, such as: traditional cash management systems; web-based banking services; voice, fax and other telephony services; or SMS, WAP and other mobile services.

While the invention has been described in connection with specific embodiments, it is evident that numerous alternatives, modifications, and variations will be apparent to those skilled in the art in light of the foregoing description.

What is claimed is:

1. A method for providing payment services in electronic commerce within the context of a four-corner trust model, the method comprising the steps of:
   a second participant electronically transmitting a payment order instruction to a first participant via a communications network, said payment order instruction having been electronically received over the communications network from a customer of the second participant (COSP), wherein the four-corner trust model comprises the first participant, the second participant and a root entity, said root entity being separately disposed from said first participant and said second participant, and comprising a root certification authority that issues digital certificates to the first participant and the second participant, said payment order instructions comprising:
   a buyer's portion, completed by a customer of the first participant (COFP), specifying a payment date, digitally signed by a private key of the COFP, and transmitted to the COSP;
   a seller's portion, completed by the COSP and digitally signed by a private key of said COSP;
   a participant's portion completed by the second participant and digitally signed by a private key of said second participant; and
   instructions to the first participant to execute the payment order instruction on the payment date;
   wherein
   at least one of the private key of the first participant and the private key of the second participant is used to produce a digital signature required by the root entity as evidence of an entity's contractual commitment to the contents of the payment order instructions.

2. The method of claim 1, wherein the payment order instruction is a payment obligation instruction.

3. The method of claim 1, wherein the payment order instruction is a conditional payment order instruction.

4. The method of claim 1, wherein the payment order instruction is a conditional payment obligation instruction.

5. The method of claim 1, wherein the payment order instruction is a certified payment obligation instruction.

6. The method of claim 1, wherein the payment order instruction is a certified conditional payment obligation instruction.

7. The method of claim 1 wherein the first customer has executed a legal contract with the first participant defining roles and responsibilities in connection with the payment order instruction.

8. The method of claim 1 wherein the second customer has executed a legal contract with the second participant defining roles and responsibilities in connection with the payment order instruction.

9. The method of claim 1 wherein the payment order instruction is a payment obligation instruction pertaining to a payment obligation that is sold in a secondary market.

10. The method of claim 9 wherein the payment obligation is sold through use of a holder registry service.

11. A method for providing payment services in electronic commerce within the context of a four-corner trust model, the method comprising the steps of:
   a financial institution electronically receiving, via a communications network, a digitally signed payment order document, said digitally signed payment order document comprising a payment order instruction message specifying a payment date, said payment order instruction message being digitally signed by a first customer associated with a buyer, using a private key corresponding to a digital certificate of the buyer, and having at least a first portion completed by the buyer; and
   the financial institution executing the payment order instruction on the payment date;

wherein
- the four-corner trust model comprises the financial institution, the first customer, and a root entity, said root entity being separately disposed from said financial institution and said first customer, and comprising a root certification authority that issues digital certificates to the financial institution and the first customer; and
- the private key is used to produce a digital signature required by the root entity as evidence of the buyer's contractual commitment to the contents of the payment order document.

12. The method of claim 11, wherein the selected payment order document is a payment obligation.

13. The method of claim 11, wherein the selected payment order document is a conditional payment order.

14. The method of claim 11, wherein the selected payment order document is a conditional payment obligation.

15. The method of claim 11, wherein the selected payment order document is a certified payment obligation.

16. The method of claim 11, wherein the selected payment order document is a certified conditional payment obligation.

17. The method of claim 11, wherein the payment order document is negotiable.

18. A method for providing payment services in electronic commerce within the context of a four-corner trust model, the method comprising the steps of a participant:
- electronically receiving from a first customer, via a communications network, a payment order instruction specifying a payment date, said payment order instruction being digitally signed by the first customer with a private key of said first customer, and comprising a buyer's portion completed by said first customer wherein the four-corner trust model comprises the participant, the first customer and a root entity, said root entity being separately disposed from said participant and said customer, and comprising a root certification authority that issues digital certificates to first participant and the first customer;
- completing a participant portion of the payment order instruction;
- digitally signing the payment order instruction with a private key of the participant; and
- executing the payment order instruction on the payment date wherein,
  - the private key is used to produce a digital signature required by the root entity as evidence of the buyer's contractual commitment to the contents of the payment order instruction.

19. The method of claim 1 further comprising the step of the first customer issuing a payment cancellation instruction digitally signed by the first customer.

20. The method of claim 19 wherein the payment cancellation instruction contains a plurality of digital signatures corresponding to individuals in an organization associated with the first customer whose authorizations are required to cancel a payment transaction.

21. The method of claim 19 further comprising the step of the first participant storing the payment cancellation instruction for subsequent comparison with the payment order instruction.

* * * * *